United States Patent [19]

Capps et al.

[11] Patent Number: 5,204,969
[45] Date of Patent: * Apr. 20, 1993

[54] SOUND EDITING SYSTEM USING VISUALLY DISPLAYED CONTROL LINE FOR ALTERING SPECIFIED CHARACTERISTIC OF ADJACENT SEGMENT OF STORED WAVEFORM

[75] Inventors: Stephen P. Capps, San Carlos; Samuel M. Roberts, Berkeley, both of Calif.; Michael P. Lamoureux, Halifax, Canada; Josef Sensendorf, Belmont, Calif.

[73] Assignee: Macromedia, Inc., San Francisco, Calif.

[ * ] Notice: The portion of the term of this patent subsequent to Sep. 29, 2009 has been disclaimed.

[21] Appl. No.: 857,079

[22] Filed: Mar. 19, 1992

Related U.S. Application Data

[63] Continuation of Ser. No. 302,510, Jan. 26, 1989, abandoned, which is a continuation-in-part of Ser. No. 292,299, Dec. 30, 1988, Pat. No. 5,151,998.

[51] Int. Cl.⁵ .............................................. G06F 3/16
[52] U.S. Cl. .................................... 395/800; 395/375; 395/161; 395/118; 84/625; 360/13; 381/48
[58] Field of Search ........................ 395/800; 381/48; 395/375; 84/675; 360/13

[56] References Cited

U.S. PATENT DOCUMENTS

| | | | |
|---|---|---|---|
| 4,215,343 | 7/1980 | Ejiri et al. | 340/711 |
| 4,378,466 | 3/1983 | Esser | 381/48 |
| 4,401,850 | 8/1983 | Harbeson | 381/48 |
| 4,627,001 | 12/1986 | Stapleford et al. | 364/513.5 |
| 4,641,343 | 2/1987 | Holland et al. | 381/48 |
| 4,646,256 | 2/1987 | Bracewell | 364/725 |
| 4,868,687 | 9/1989 | Penn et al. | 364/13 |
| 4,881,440 | 11/1989 | Kakizaki | 84/609 |
| 4,974,178 | 11/1990 | Izeki et al. | 364/523 |

FOREIGN PATENT DOCUMENTS 63-124290 5/1988 Japan.

OTHER PUBLICATIONS

Gosch "Voice Synthesizer editor displays speech as curves easily alterable by keyboard", Electronic, vol. 55, No. 17, Aug. 1982, pp. 68, 70.
"High Resolution Graphics Teleconferencing", Defense Communications Agency, dated Jan. 1988, pp. 45–60.

Primary Examiner—Thomas C. Lee
Assistant Examiner—L. Donaghue
Attorney, Agent, or Firm—Skjerven, Morrill, MacPherson, Franklin, & Friel

[57] ABSTRACT

A hardware and software system and method for a personal computer such as the Macintosh allows recording, editing, and playback of sound. The system includes a sound editor which displays sound waveforms, and permits the user to mix together several simultaneously displayed waveforms, and to change the pitch and amplitude of one part of each waveform by means of a novel screen display.

35 Claims, 12 Drawing Sheets

SOUND EDITING SYSTEM USING VISUALLY DISPLAYED CONTROL LINE FOR ALTERING SPECIFIED CHARACTERISTIC OF ADJACENT SEGMENT OF STORED WAVEFORM

This application is a continuation of application Ser. No. 07/302,510, filed Jan. 26, 1989 now abandoned, which is a continuation-in-part of Ser. No. 07/292,299, filed Dec. 30, 1988, now U.S. Pat. No. 5,151,998.

BACKGROUND OF THE INVENTION

1. Field of the Invention

This invention relates to a computer sound editing system, and especially to the means by which the system visually displays and edits the sound and to the method for displaying and editing the sound.

2. Description of the Prior Art

Sound editing by means of computers is well known. However, those computer sound editors known in the art typically employ cumbersome methods for displaying and manipulating waveforms. The known sound editing systems, such as are typically used for editing sounds for recordings, movies, etc., are especially difficult to use for the common sound editing functions of mixing, adjusting volume for parts of a sound, and for adjusting pitch for parts of a sound. The prior art does not provide a convenient user interface to give the user sufficient control to easily align the waveforms and adjust their characteristics to achieve a desired result.

SUMMARY OF THE INVENTION

In accordance with the present invention, a novel sound editing system and method is provided. While the sound editing system and method of this invention are preferably used with the Macintosh computer, this invention also may be used with other computers. The system of this invention provides means for entering and storing sound waveforms in a computer memory, for visually displaying the waveform on a computer screen, and for altering the stored waveform by making changes in the appearance of the waveform on the screen, which changes are translated by the computer into changes in the stored waveform.

The system includes means for simultaneously displaying several sound waveforms on the screen for purposes of mixing them (i.e., combining several sound waveforms into one) by moving their locations on the screen so as to synchronize selected parts of the waveforms in time. Also, the system provides means to alter the pitch (i.e., frequency) or amplitude of a particular part of any waveform by moving a segment of a line adjacent to the waveform on the screen, which line corresponds to the pitch or amplitude for the adjacent part of the waveform.

The system and method of the present invention are applicable to any time domain sampled data. That is, video or other waveforms can also be edited in accordance with the invention in the same manner as are sound waveforms.

Appendix A is the actual computer program of the preferred embodiment of the present invention.

DETAILED DESCRIPTION OF THE INVENTION

Figure 1:
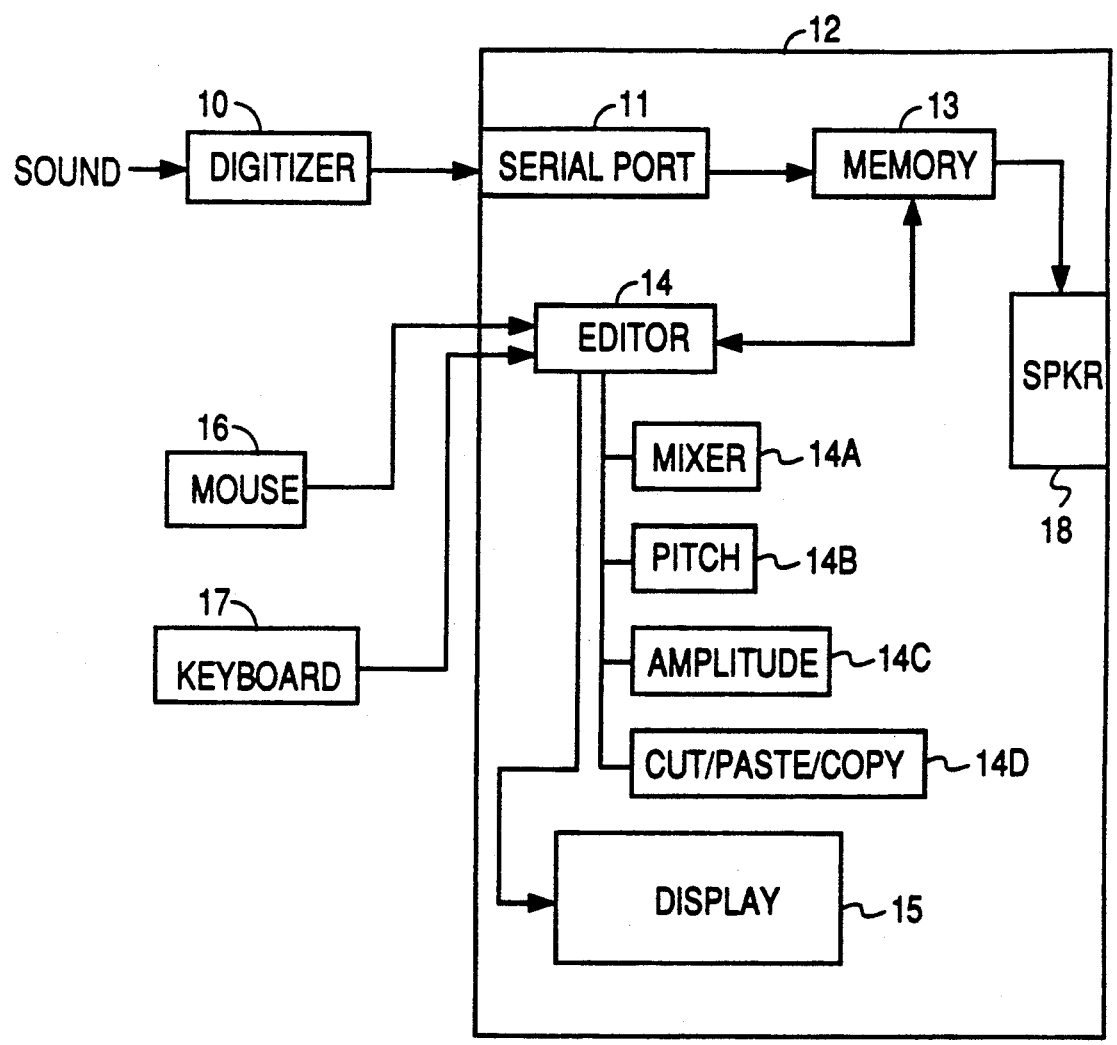
FIG. 1 shows a block diagram of the device of the present invention.

The preferred embodiment of the present invention is a hardware and software system as shown in FIG. 1 for the Apple Macintosh family of computers, that allows the user to record, edit, and play back sound such as speech, noise, or music. The system includes a sound input device (a digitizer 10) described in copending application Ser. No. 07/291,808, entitled Self Powered Analog to Digital Converter, filed Dec. 29, 1988, (now abandoned), and assigned to Macromedia Inc., the assignee of this application, and several application programs, one of which is a sound editor program. This copending application is hereby incorporated by reference. The system allows sound to be recorded live or from other audio sources. The system is then used to edit the sounds.

The digitizer 10 described in application Ser. No. 07/291,808 is a sound input device that allows one to record and store sound when used with the sound editor application program. The digitizer 10 has a built-in microphone, microphone jack, line jack, and an input level control knob (not shown). It includes a separate 10-foot audio cable to record from a stereo, tape deck, compact disk, or any similar sound system.

The digitizer 10 preferably plugs into a serial port 11 (modem or printer port) of the Macintosh computer 12, derives its power from this port through the Macintosh computer, and provides the digitized electric signals representing the sound waveform to the computer. These digitized signals representing the waveform are conventionally stored in the computer memory 13.

FIG. 1 also shows the sound editor 14 with its subelements the mixer 14A, pitch control 14B, amplitude control 14C, and cut/paste/copy functions 14D, all described below. The computer display 15 and mouse 16 and keyboard 17 are conventional.

Figure 2:
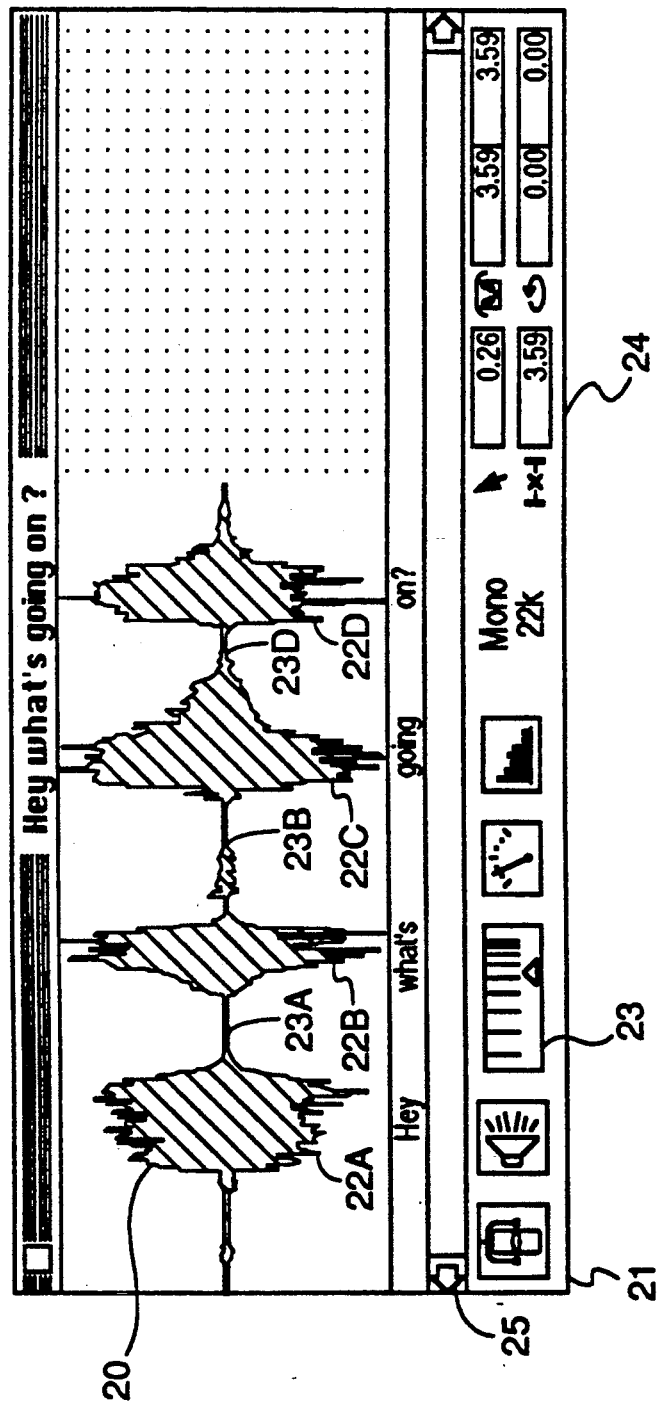
FIG. 2 shows a screen display of a waveform representing monaural sound in the preferred embodiment of the present invention.

FIG. 2 is a typical display of a waveform 20 representing sound as it appears in a sound editor "window" 21 (i.e., computer screen display). When viewing a sound waveform 20 on the screen of the display associated with the Macintosh Computer, the user typically adjusts the resolution by means of the resolution control 23 (third box from left at the bottom of the window 21)

so as not to see the individual cycles of the waveform; the user then sees only the envelope of the waveform 20. This envelope information is useful because it identifies the loud portions of the sound. In the FIG. 2 waveform 20 of a spoken sentence, the large dark regions 22A, 22B, 22C, 22D indicate the location of each word in the sentence and the spaces 23A, 23B, 23C between these dark regions indicate silences between words.

In the sound editor, the user preferably employs a mouse or similar device to select a part of the waveform (the large dark regions 22A, 22B, 22C, 22D) in order to play them or to cut, copy, or paste them as is done conventionally with words in a text document. The user can also select part of a waveform 20 and apply one or more special effects to it.

The sound editor (which is preferably an application program) lets the user record, edit, store, and play back monaural and stereo sound. The sound editor has the capability to: enhance a sound by adding special effects, such as smoothing, silence, an echo, or a filter; generate new sounds; mix up to four sounds at once to create a new sound; alter pitch or volume of part of a sound; and select a portion of the sound and delete, move (i.e., cut and paste) or copy it to another place in the waveform.

Sounds are displayed graphically as a waveform in the sound editor window. FIG. 2 shows a monaural sound.

Figure 3:
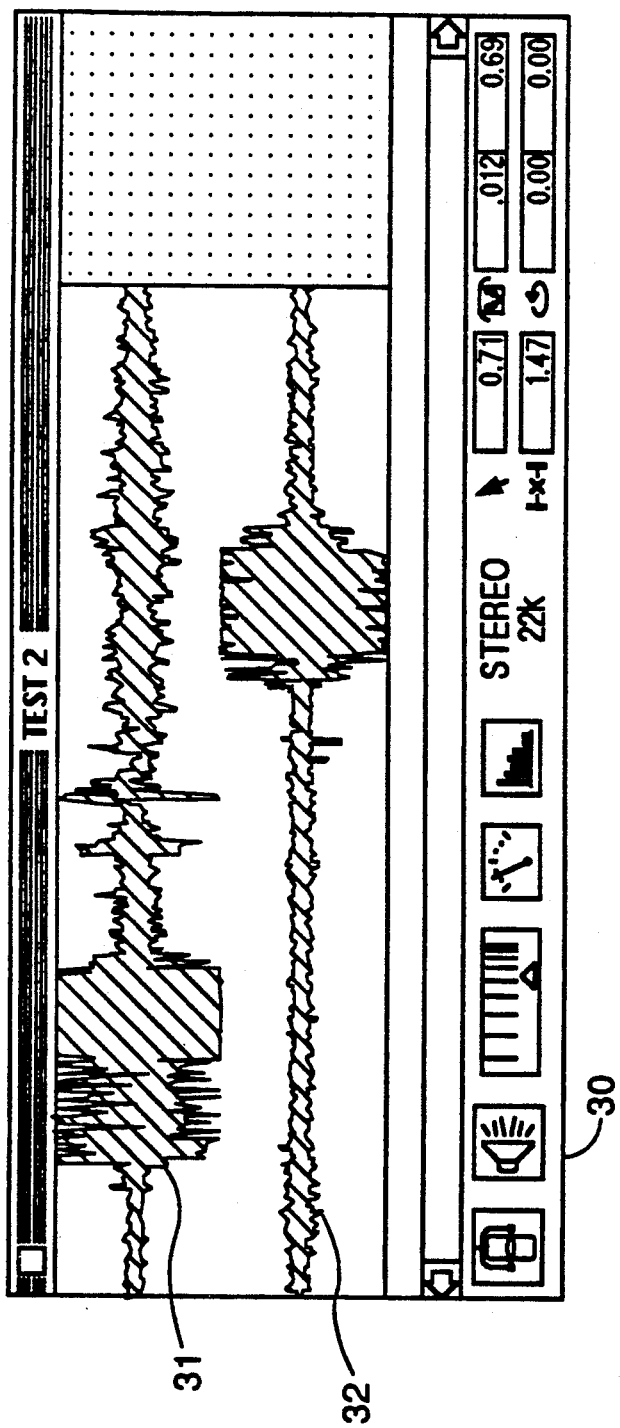
FIG. 3 shows a screen display of two waveforms representing stereo sound in the preferred embodiment of the present invention.

The sound editor displays the waveforms for both channels of a stereophonic (or other multichannel such as quadraphonic) sound. The left channel is preferably displayed in the top half of the window and the right channel is displayed in the bottom half of the window. FIG. 3 shows how the two waveforms 31, 32 representing the two channels of stereo sound appear in a window 30.

If a sound is too long to fit into the sound editor window, the user employs the horizontal scroll bar (located at the bottom of the window) to scroll the waveform in the window, just as one scrolls additional information in other well-known Macintosh windows.

The object of the mixer of the present invention is conventional in that several separate sounds, each represented by one or more waveforms, can be combined by a user into a single sound. For instance, when making the soundtrack for a movie, the director may wish to mix a section of background music with someone's voice, some footsteps and a gun shot. These four sounds would be recorded separately, then the mixer is used in accordance with the present invention to align properly the waveforms representing these sounds properly, adjust the amplitudes of each of these waveforms, and then mix them for the final result. Aligning means "placing" a particular sound, such as the gun shot sound, so it occurs at a particular point in time; for instance, between two footsteps. Amplitude means loudness, so the music fades in or out, the gun shot is adjusted to be loud, and the footsteps are soft.

Figure 4A:
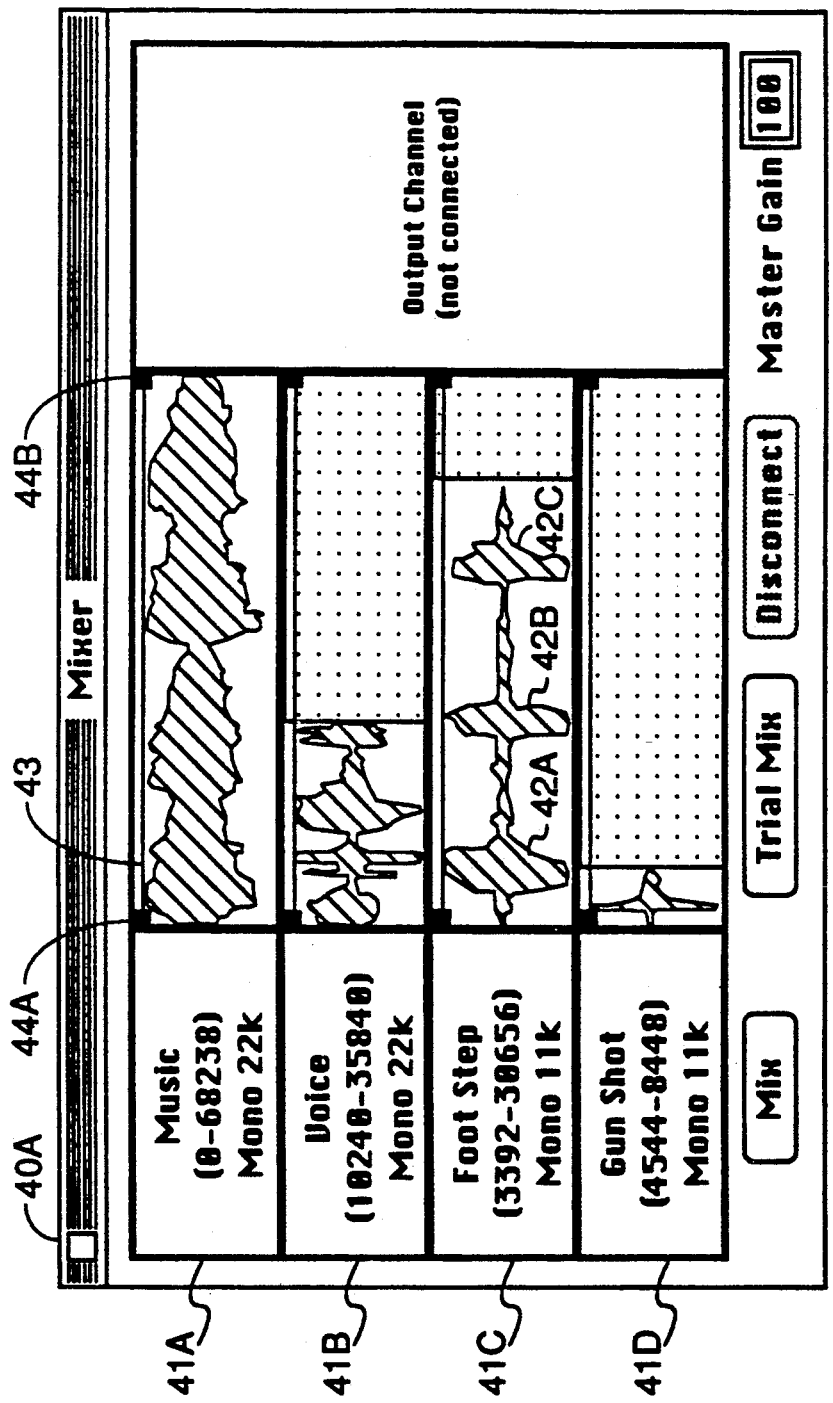
FIGS. 4A and 4B shows screen displays of several sound waveforms for mixing in the preferred embodiment of the present invention.
Figure 4B:
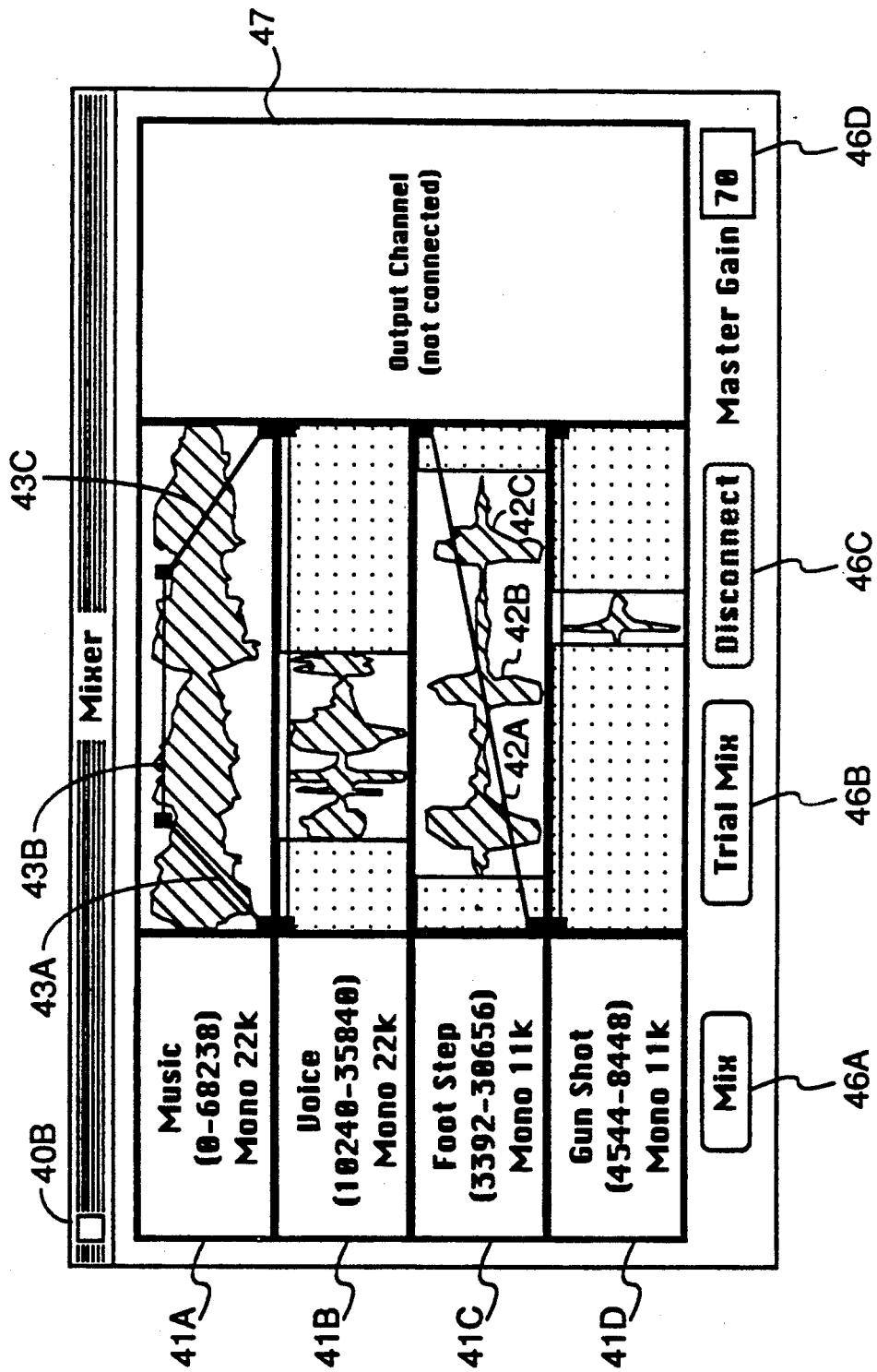

FIGS. 4A and 4B show, respectively, two Mixer windows (i.e., screen displays) 40A, 40B of the sound editor. In each window there are four rows, one for each of the recorded sounds (i.e., waveforms which are shown in grey) mentioned above (Music 41A, Voice 41B, Foot Steps 41C and Gun Shot 41D). When the user inputs the waveform representative a sound to the Mixer, the waveform is automatically inserted into the next available row. To display the Mixer window, the user selects Show Mixer in a conventional way using a menu (not shown). In the left column in FIGS. 4A and 4B is displayed some information about each sound, including its length and its sampling rate. The larger grey regions in each row indicate where the sound is loud; for instance, in Foot Steps 41B, there are three clearly distinguishable regions 42A, 42B, 42C, suggesting that three footsteps are heard. Near the top of each of the four rows in FIG. 4A, there is a solid horizontal dark line (such as line 43A in the Music row 41A) terminated by a solid square 44A, 44B (a "knot") at each end. This dark line 43 is the amplitude control line.

By pointing and clicking with the mouse, the user can slide the amplitude control line 43 up and down in linear segments; the effect is that of a rubber band that the user grabs at any point and pegs down with a square (i.e., a knot 43B). The user clicks on the amplitude control line 43 to create additional knots, so as to create a new line segment in the amplitude control line. Knots such as 44A, 44B are deleted by dragging them off the window 40A. For instance, in FIG. 4B in the Music waveform, the amplitude control line 43 has three line segments 43A, 43B, 43C. The amplitude control line 43 has been adjusted by the user so that it starts low, sweeps up, stays level, then sweeps low again. Upon mixing, the Music will correspondingly start soft, fade in, play at a constant volume for a while, then fade out. Similarly, in Foot Steps, in FIG. 4B, the amplitude control line 45 starts low and sweeps high, which will cause the mixed result to slowly fade in the footsteps. Thus, the user has detailed and easy-to-use control of the amplitude of the sounds to be mixed.

To control the alignment of the sounds, the user simply conventionally clicks on the waveform using the mouse and slides the waveform left or right until it is positioned correctly. For instance, in FIG. 4B the Voice 41B is now shifted to the right, so it will start to play some time after the Music 41A has started. Also, the Gun Shot 41D will sound between the second 42B and third 42C Foot Step.

By clicking on the "Trial Mix" button 46B, the user can hear what the mixed sound will sound like in rough form without actually performing the mix. "Mix" 46A actually does the mixing. The mixed sound (not shown) is output to the destination specified by the user in the output box 47 on the right side of window 40B as shown in FIG. 4B. If no mixer output destination is specified, the mixed sound will be inserted into a new untitled window (not shown). "Disconnect" 46C removes a selected waveform from the mixer window. "Master Gain" 46D allows the user to adjust the final amplitude of the result. Stereo sounds (and other multichannel sounds such as quadraphonic) and sounds of different sampling rates may all be mixed. Stereo sounds are displayed as two waveforms (one for each channel) in each row. Each waveform of a stereo sound can be edited independently. Stereo sounds may be output as monaural, and sounds input as monaural may be output as two identical stereo channels.

The "Bender" effect (see FIG. 5) adjusts the pitch of a sound by an amount that can vary along the length of the sound. When the user chooses the Bender effect, the sound selected appears as a waveform 51 in the screen display dialog box 50 as shown in FIG. 5.

Figure 5:
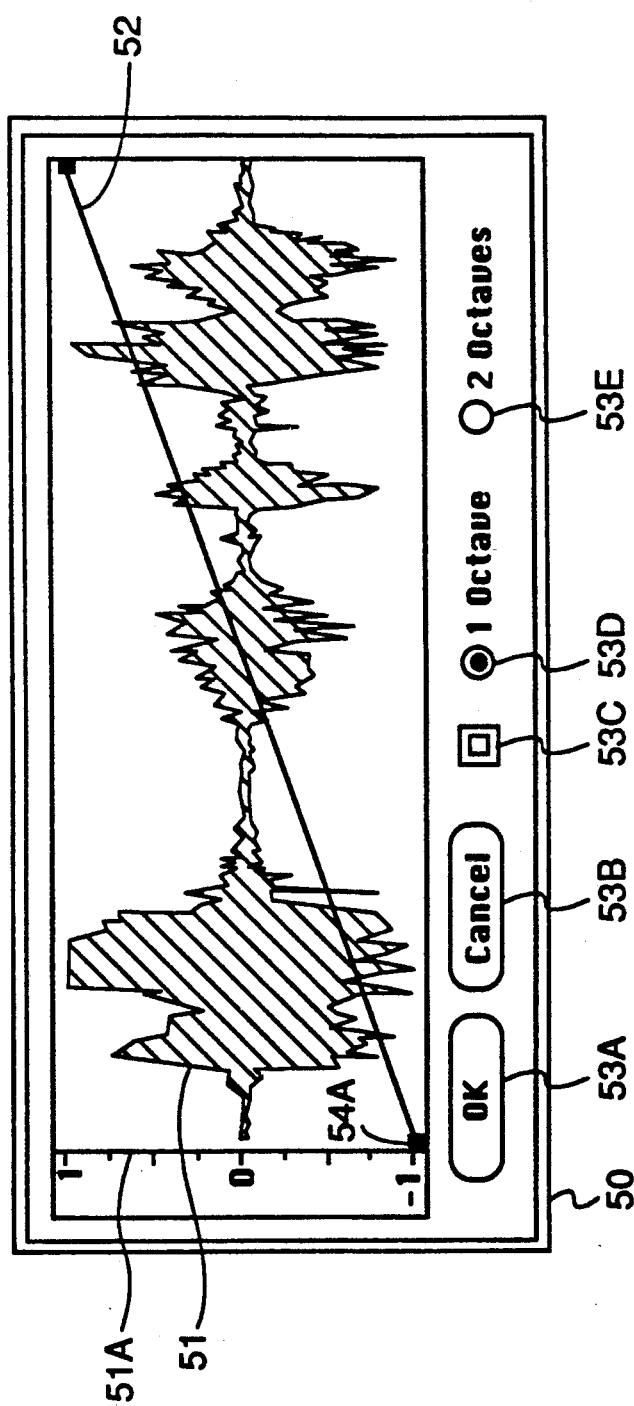
FIGS. 5 and 6 show screen displays useful in adjusting pitch in the preferred embodiment of the present invention.

The waveform 51 is shown in grey in FIG. 5. The solid horizontal dark pitch control line 52 indicates how the pitch is to be edited at each point along the waveform 51. In this example, the first part (left-hand portion) of the waveform 51 will have its pitch lowered by an octave while the last part (right-hand portion) of the waveform 51 will have its pitch raised by an octave with everything in between adjusted proportionately. The buttons 53A, 53B, 53C, 53D, 53E located at the bottom of the window 50 adjust the scale 51A to the left of the waveform. If the user checks the button 53E labeled "2 Octaves," this action raises or lowers the pitch by as much as two octaves instead of only one.

The user moves (i.e., displaces) the pitch control line 52 with the mouse by clicking the mouse on a knot such as 54A (as described above) and dragging the knot on the window. Clicking the mouse on the pitch control line 52 creates additional knots (not shown). The square 53C with a knot in it to the right of the Cancel button 53B is a knot "well." One can also click in the knot well 53C and drag new knots onto the pitch control line 52. The user drags knots off the window 50 to remove them.

Figure 6:
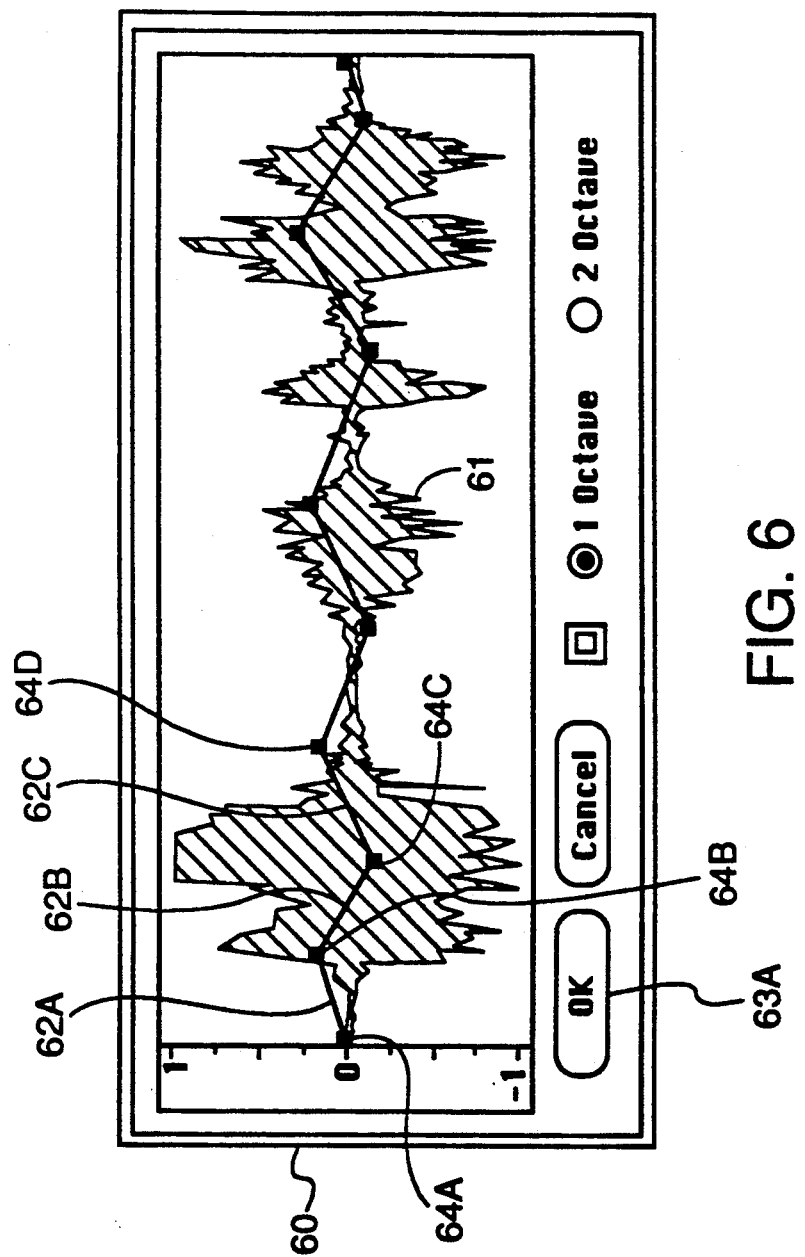

To add a tremolo (i.e., a varying pitch) to a sound, (see FIG. 6) the user adds knots such as 64A, 64B, 64C, 64D, etc. and then displaces line segments 62A, 62B, 62C, 62D, etc. of the pitch control line 62 (as described above) as shown in FIG. 6 so that the pitch control line varies in up and down fashion.

The user clicks the OK button 63A to adjust the pitch of the waveform 61 in computer memory, as indicated on the window 60.

The "Envelope" effect (see FIG. 7) adjusts the volume of a sound by an amount that varies over the length of the waveform, somewhat similarly to the amplitude control method described above in connection with the Mixer window in FIG. 4B. The user employs the Envelope effect together with the conventional noise or tone generator effects to make bursts of sound that fade in or die out slowly. The Envelope effect also is used to change portions of musical sounds. For example, one can gradually increase the volume of the percussive strike of a piano key resulting in a "bowed" piano sound.

Figure 7:
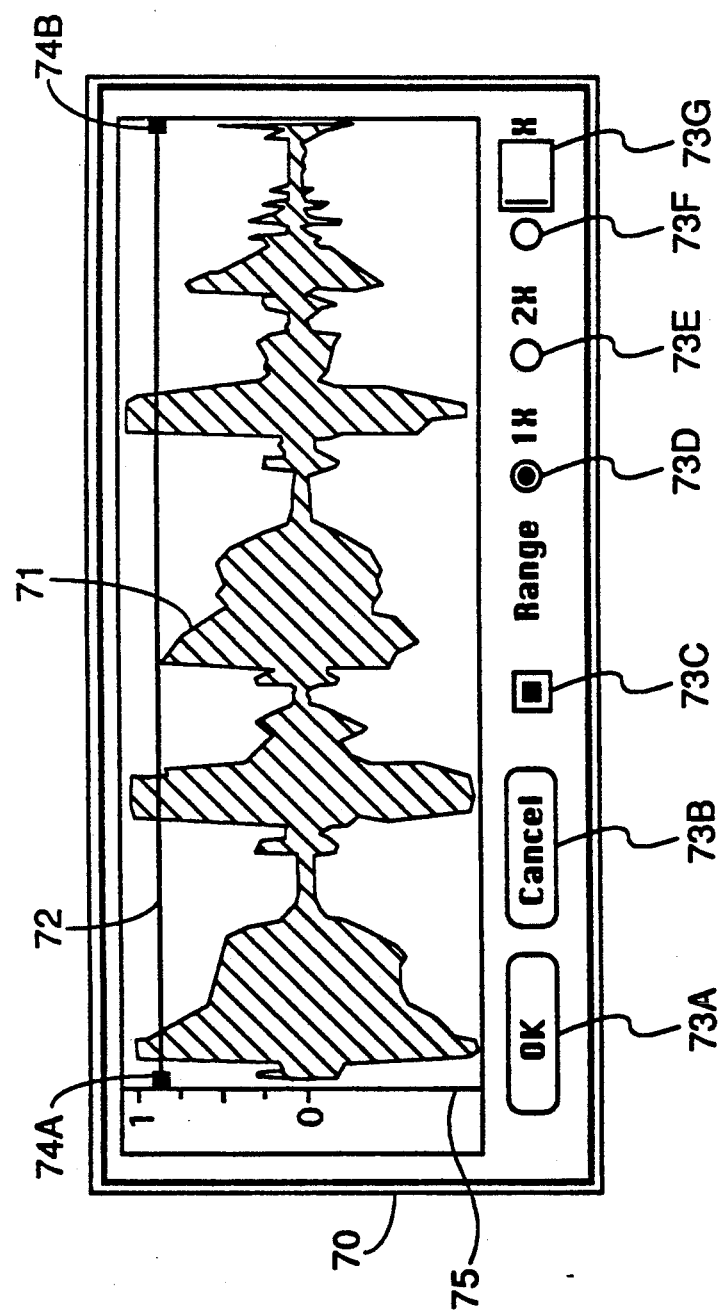
FIG. 7 shows a screen display useful in adjusting volume in the preferred embodiment of the present invention.

Selecting the Envelope effect displays the screen display dialog box 70 (i.e., window) as shown in FIG. 7.

The window 70 of FIG. 7 is similar to the Bender window described above. The waveform 71 is drawn in grey on the background, and there is a solid horizontal dark amplitude control line 72 with knots 74A, 74B on the line. The amplitude control line 72 indicates how the volume will be altered at each point in the waveform 71. The user moves the amplitude control line 72 with the mouse by clicking on a knot such as 74A and dragging it. The user clicks on the amplitude control line 72 to create additional knots. The square 73C with a knot in it to the right of the Cancel button 73B is a knot "well." The user can also click in the knot well 73C and drag new knots onto the amplitude control line 72. Dragging knots off the window 70 removes them.

The vertical scale 75 along the left side of the dialog box 70 indicates the factor by which the amplitude of the sound will be adjusted. Scaling the amplitude by 1 leaves the volume unchanged, scaling it by 2 doubles the volume of the sound, etc. The scale is adjusted using the buttons at the bottom of the dialog box. If the user checks the "1×" button 73D, the scale ranges between zero (silence) and 1 (100% amplitude). If the user checks the "2×" button 73E, the scale ranges between zero and 2 (200% amplitude). This setting permits the user to make a sound up to twice as loud. The user can also check the rightmost button 73F and enter an integral scaling factor in the edit box 73G. This makes a sound arbitrarily louder.

The amplitude control line 72 and the knots 74A, 74B preferably do not move below the middle of the window, which corresponds to zero amplitude, or silence. The amplitude control line 72 preferably represents the top half of a symmetrical envelope curve.

The above description of the invention is in the context of the well known Macintosh computer. The sound editor as described above is implemented as a conventional application program installed in the computer. In its preferred embodiment, the sound editor is written partly in the C-language and partly in assembly language. The sound editor operates conventionally insofar as mouse and keyboard manipulations by the user of the displayed waveforms and other sound characteristics are captured by the computer and used to modify the digitized data stored in the computer memory representing the waveform. A copy of the actual program is attached as an appendix, Appendix A.

The operation of the preferred embodiment of the present invention is described in greater detail as follows.

MIXER

Figure 8A:
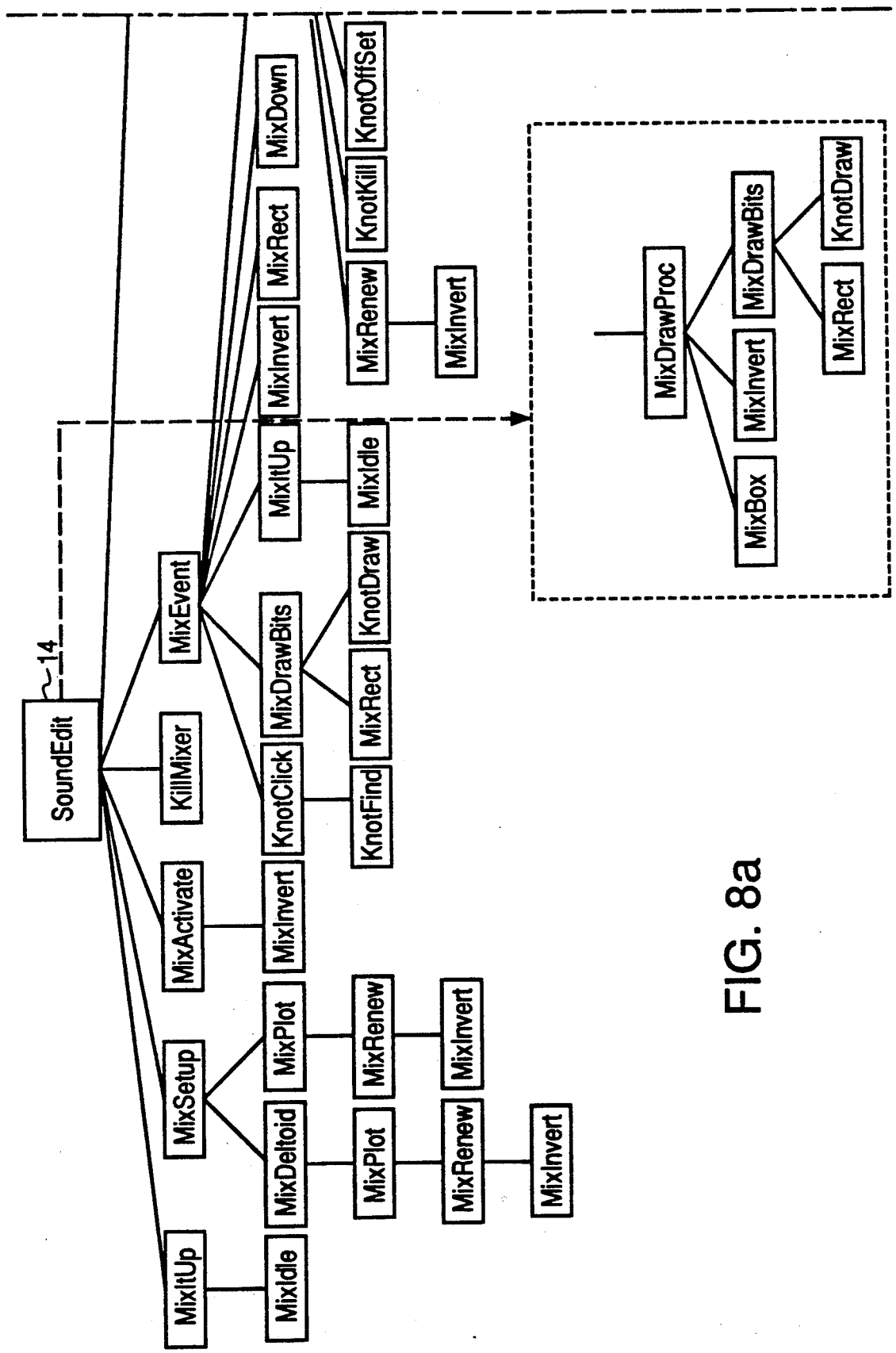
FIGS. 8A and 8B show the various subroutines that implement the mixing of sounds in the preferred embodiment of the present invention.
Figure 8B:
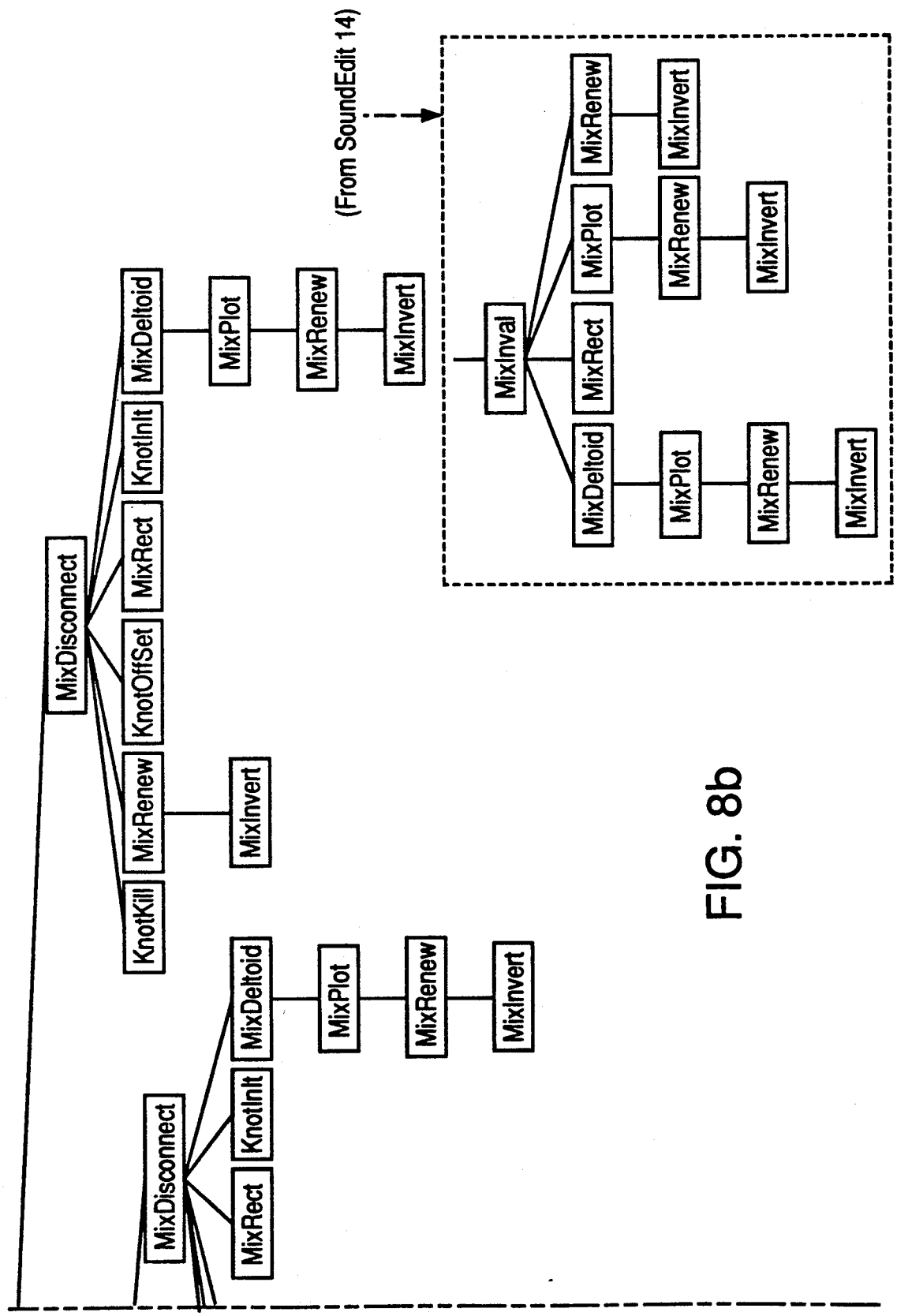

FIGS. 8A and 8B depict the mixer 14A of FIG. 1 (which is part of the Sound Editor 14 of FIG. 1) and are intended to be viewed side-by-side, with FIG. 8A on the left and FIG. 8B on the right, so that the lines on the right side of FIG. 8A connect with the lines on the left side of FIG. 8B. FIGS. 8A and 8B show the main subroutines which carry out the mixing of sounds in the mixer 14A of FIG. 1. The code for each of the subroutines shown in FIGS. 8A and 8B is shown in detail in Appendix A. The subroutines are written in the well known "C" language, with some assembly language.

FIGS. 8A and 8B show how each subroutine calls other subroutines; for instance, subroutine MixSetup in the second row from the top in FIG. 8A calls MixDeltoid and MixPlot; MixPlot calls MixRenew, which calls MixInvert.

The following describes how the mixing of sounds is carried out in the preferred embodiment of the invention.

Each of the named subroutines in FIGS. 8A and 8B is shown in Appendix A as mentioned above. After the first occurrence of the name of each subroutine in the following text, the location of the subroutine in terms of a page number in Appendix A is shown. All those subroutines of FIGS. 8A and 8B except those with the prefix "Knot_", such as "KnotClick," are in the section of Appendix A labelled "AudioMix.c"; the other subroutines of FIGS. 8A and 8B are found in the section of Appendix A labelled "MiscRtns.c". Each page of Appendix A has the name of the section of Appendix A to which it belongs printed at the top of the page.

The Sound Editor 14 (see FIG. 1) directly calls subroutines MixItUp, KillMixer, MixActivate, MixSetup, MixPlot, MixDrawProc, MixEvent, MixDisconnect, MixDown, and MixInval, each of which subroutines thus is shown set apart on the left side of the following text.

MixItUp (pg. 11)     called when user selects Show Mixer from the Windows menu or Set Mixer Input from the Settings menu. Creates the Mixer window if it doesn't already exist. Shows the Mixer window and makes it the frontmost window.

| | |
|---|---|
| MixIdle (pg. 10) | enables the Mix and Trial Mix buttons if the user has specified at least one mixer input. Enables the Disconnect button if the user has selected a mixer input. |
| KillMixer (pg. 1) | called when user selects Hide Mixer from the Windows menu. Hides the Mixer window. |
| MixActivate (pg. 1) | called when the Sound Editor 14 gets an activate or deactivate event for the Mixer window. (This routine is called indirectly as a result of a call to MixItUp since making a window visible and bringing it to the front of the window list generates an activate event.) Calls MixInvert (pg. 10) to select (activate event) or deselect (deactivate event) the currently selected mixer input, if any. Activates (activate event) or deactivates (deactivate event) the Master Gain editable text item. |
| MixSetup (pg. 13-14) | called when the user selects Set Mixer Input from the Settings menu. Associates the waveform in the frontmost window with the first unused mixer input. |
| MixDeltoid (pg. 2-3) | rescales the waveforms associated with all mixer inputs so that the longest input occupies the entire width of the mixer display. This permits the user to slide waveforms corresponding to shorter inputs left and right to position them in time relative to the start of the longest input. Calls MixPlot (pg. 12) to replot the rescaled waveforms. |
| MixPlot (pg. 12) | plots the waveform associated with a mixer input in gray in an offscreen buffer. |
| MixRenew (pg. 12-13) | deselects the currently selected mixer input if any. Adds the area in the Mixer window corresponding to a mixer input to the update region. (This will cause an update event for the Mixer window which will cause MixDrawProc (pg. 7-8) to be called for each mixer input.) |
| MixDrawProc | called indirectly for each userItem in the Mixer window when the Sound Editor 14 gets an update event for the Mixer window. Calls MixBox (pg. 2) if the userItem is an information item or MixDrawBits (pg. 7) if the userItem is a waveform item. |
| MixBox (pg. 2) | draws the sound name and other information for a mixer input. |
| MixDrawBits (pg. 7) | draws the waveform plotted by MixPlot in the Mixer window. Draws the amplitude adjustment line. |
| MixEvent | called when the Sound Editor 14 gets an event involving the Mixer window. Calls MixDown (pg. 4-7) for a mouseDown on the Mix button. Calls MixInvert twice for a mouseDown on an information userItem (once to deselect the previously selected mixer input if any, and once to select the new userItem). Calls MixInvert once for a mouseDown on the waveform corresponding to a mixer input (to deselect the corresponding information userItem), then calls KnotClick (pg. 1-2) to handle mouseDowns on the amplitude adjustment line. If the mouseDown was elsewhere on the waveform, calls MixDrawBits to move the waveform to the left or right while tracking the mouse. For mouseDown on Trial Mix button starts four-channel playback of the Mixer inputs. Calls MixDisconnect (pg. 3) to remove the currently selected mixer input from the mixer. |
| MixDisconnect | called by the Sound Editor 14 when the user closes a window containing a sound that is a mixer input and by MixEvent when the user clicks on the Disconnect button in the Mixer window. Removes the specified input from the mixer, moves higher numbered inputs (if any) up one row in the Mixer window. Calls KnotKill (pg. 3) to dispose of the amplitude adjustment information for the input being deleted. Calls KnotOffset (pg. 3) to move the amplitude adjustment lines for higher numbered mixer inputs up one row. Calls MixRenew to add mixer inputs whose position has changed to the update region. (This will cause an update event for the Mixer window which will cause MixDrawProc to be called for each mixer input.) Calls KnotInit (pg. 3) to reinitialize the amplitude adjustment line for the mixer input below the highest numbered mixer input. Calls MixDeltoid to rescale waveforms for the remaining mixer inputs (in case the mixer input being deleted was the longest one). |
| MixDown (Pg. 4-7) | called when the user clicks on the Mix button in the Mixer window. Causes the mixer inputs to be mixed together. The result of the mix replaces the selected portion of the sound in the window that was specified to be the mixer output. If no mixer output was specified, the result of the mix is placed in a new, untitled window. |
| MixInval (pg. 10) | called by the Sound Editor 14 when the user changes something in a window containing a sound that is a mixer input. Calls MixDeltoid to rescale the waveforms in the Mixer window in case the input that was the longest is no longer the longest. Calls MixPlot and MixRenew for each mixer input to redraw any waveforms in the mixer window that correspond to the window that was changed. |

BENDER EFFECT

Figure 9:
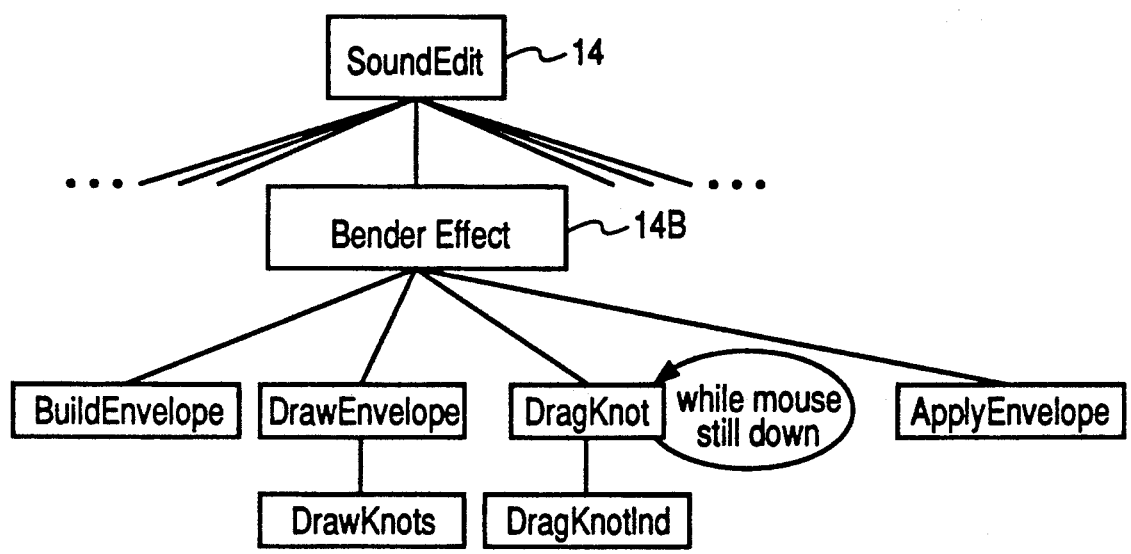
FIG. 9 shows the various subroutines that implement the adjusting of pitch in the preferred embodiment of the present invention.

FIG. 9 shows the main subroutines which implement the Bender effect (i.e., adjusting of pitch) in the preferred embodiment of the present invention. The Bender effect as described above is the same as the pitch control 14B in FIG. 1. Each of the subroutines in FIG. 9 is shown in detail in Appendix A, in the section labelled "Bender.c". Thus the page numbers following each subroutine name in the following description of the bender effect refer to pages in the "Bender.c" section in Appendix A.

The Bender effect (14B in FIG. 1, which is called by the Sound Editor 14 of FIG. 1) includes the following subroutines as shown in FIG. 9.

| | |
|---|---|
| BuildEnvelope (pg. 4–5) | plots the selected portion of the waveform in gray in an offscreen buffer. |
| DrawEnvelope (pg. 7) | copies the waveform from the offscreen buffer to the screen. |
| DrawKnots (pg. 6–7) | draws the pitch adjustment line with knots. |
| DragKnot (pg. 5–6) | if mousedown on pitch adjustment line but not on an existing knot, creates a new knot. Drags knot up or down while tracking mouse. |
| DragKnotInd (pg. 6) | erases existing and draws a new pitch indicator on the pitch scale at left of window to correspond to current knot position while tracking mouse. |
| ApplyEnvelope (pg. 3–4) | resamples (adjusts the pitch of) the selected portion of the waveform according to the pitch adjustment line. |

The subroutines called by the Bender effect have the same names as the subroutines that are called by the Envelope effect (see below). However, some of the code that makes up the routines is different. Most of the differences are in ApplyEnvelope, which is the routine that actually modifies the pitch of the underlying sound.

ENVELOPE EFFECT

Figure 10:
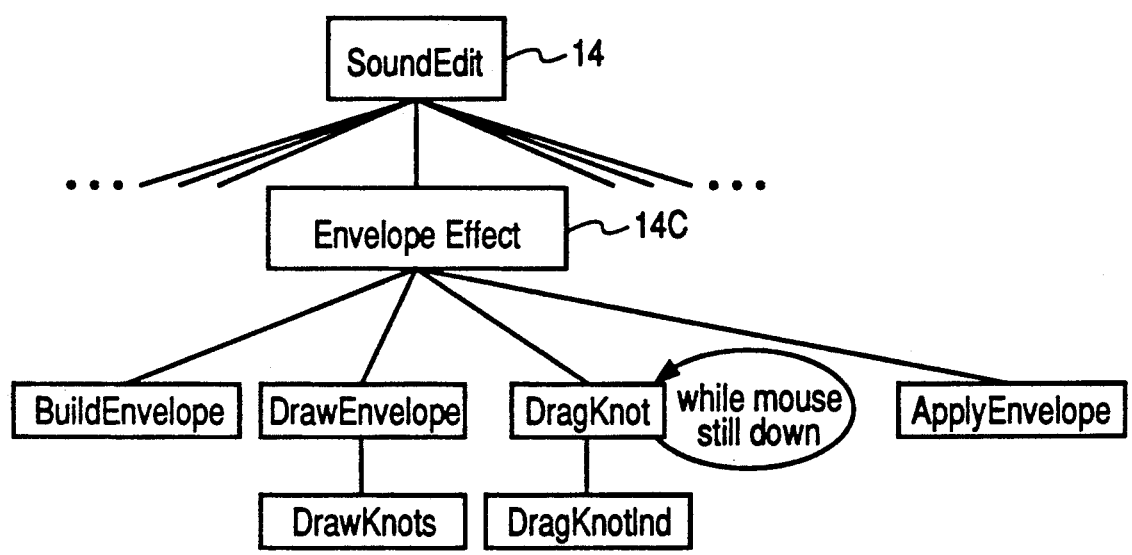
FIG. 10 shows the various subroutines that implement the volume adjustment in the preferred embodiment of the present invention.

FIG. 10 shows the main subroutines which implement the Envelope effect (i.e., adjusting the amplitude) in the preferred embodiment of the present invention. The Envelope effect, as described above, is the same as the amplitude control 14C in FIG. 1. Each of the subroutines in FIG. 10 is show in detail in Appendix A, in the section labelled "Envelope.c".

The Envelope effect (14C of FIG. 1, which is called by the Sound Editor 14 of FIG. 1) thus includes the following subroutines as shown in FIG. 10:

| | |
|---|---|
| BuildEnvelope (pg. 4–5) | plots the selected portion of the waveform in gray in an offscreen buffer. |
| DrawEnvelope (pg. 6–7) | copies the waveform from the offscreen buffer to the screen. |
| DrawKnots (pg. 6) | draws the amplitude adjustment line with knots. |
| DragKnot (pg. 5–6) | if mouseDown on amplitude adjustment line but not on an existing knot, creates a new knot. Drags knot up or down while tracking mouse. |
| DragKnotInd (pg. 6) | erases existing and draws new amplitude indicator on the amplitude scale at left of window to correspond to current knot position while tracking mouse. |
| ApplyEnvelope (pg. 3–4) | adjusts amplitude of each sound sample according to amplitude line. |

The subroutines called by the Envelope effect have the same names as the subroutines that are called by the Bender effect as described above. However, some of the code that makes up the routines is different. Most of the differences are in ApplyEnvelope, which is the routine that actually modifies the amplitude of the underlying sound.

As discussed above, waveforms other than sound can also be edited in accordance with the present invention. For instance, a video waveform would be input to the computer by means of an appropriate analog to digital digitizer, and then edited as described above with regard to sound waveforms. In this case, the "Bender" effect instead of altering pitch would alter some other desired sampling state, such as a color.

The present invention is implementable in other embodiments on computers other than the Macintosh, and is also implementable in a special purpose sound editing device embodiment. Other modifications to the invention will be apparent to one of ordinary skill in the art in light of the above description.

APPENDIX A

AudioMix.c

```
/*
 SoundTrack source (AudioMix.c)
 ©1987 Farallon

Written by Steve Capps with a lot of help from:
     Mike Lamoureux, Sam Roberts & Joe Sensendorf Modification History:
 ------------------

<JS  05/18/88>  Moved MixRect to AudioMisc.c so Mixer segment isn't loaded during
                 initialization.
 <SC  05/31/88>  Trial Mix bug fix.
 <SMR 09/09/88>  If the right channel of a stereo wave is a monophonic mixer input,
                 point the Play4List entry to the right channel, not the left channel,
                 in MixEvent.
 <SMR 09/11/88>  Initialize Play4List delays to the largest positive 32-bit integer
                 in MixEvent so empty channels never start playing. If the beginning
                 of the selection is past the end of the channel to be played by a
                 trial mix, set the Play4List delay to the largest positive 32-bit
                 integer in MixEvent so that the channel doesn't play. Pin the end of
```

```
                         the selection if it is past the end of the channel to be played by
                         a trial mix.
    <SMR 09/27/88>   Added MixLabel to tell if a label is associated with the mixer and
                         MixLabelKill to disassociate a label from the mixer.
    <SMR 10/01/88>   If w->activeLabel2B is -1 in MixSetup, try to match selection to
                         a label. Replaced MixLabel with MixLabelRenew since more than one
                         channel of the mixer may reference the same label. MixLabelRenew
                         calls MixRenew for each channel that references a label.

*/ include "AudioDefs"

define fudge 6

/*Procedures*/

MixBox( GWindPeek, short, Rect * );
                MixDeltoid( void );
                MixDown( void );
                MixDrawBits( short );
pascal void     MixDrawProc( DialogPtr, short );
                MixInvert( short );
                MixPlot( GWindPeek, short );

KillMixer( )
{
    #if 0
    DisposDialog( mixer );
    /* knots, bits etc. */
    mixer = NIL;
    mixActive = False;
    mixSelect = 0;
    /*nMixed = 0;*/
    #endif
    HideWindow( mixer );
    mixVisible = False;
}

MixActivate( act )
short   act;
{
    if ((mixer) && (mixActive != act)) {
        mixActive = act;
        MixInvert( mixSelect );

if (act)
            TEActivate( ((DialogPeek)mixer)->textH );
        else
            TEDeactivate( ((DialogPeek)mixer)->textH );
    }
}

MixBox( w, mix, r )
register GWindPeek  w;
short               mix;
Rect                *r;
{
    char    str[64], num[32];
    short   index;

EraseRect( r );

if (w /*&& ((mix < nMixed) || mix == mixOut)*/) {
        TextFont( 0 );              /* title in Chicago */
        TextSize( 0 );

InsetRect( r, 2, 6 );

r->bottom = r->top + 16;
        TextBox( &w->name[1], w->name[0], r, teJustCenter );

TextFont( 1 );              /* rest in app font */
        TextSize( 9 );
        str[0] = 1;
        str[1] = '(';
        if (mixes[mix].label >= 0) {
            AddStr( str, (*w->labels + mixes[mix].label)->text );
        }
        else {
            Number( w, mixes[mix].beg, num );
            AddStr( str, num );
            AddChar( str, '-' );
            Number( w, mixes[mix].end, num );
            AddStr( str, num );
        }
```

```
    AddChar( str, ')' );
    OffsetRect( r, 0, 18 );
    TextBox( &str[1], str[0], r, teJustCenter );

index = 39;                /* assume MONO */
    if (w->info[mode]) {
        index = 40;            /* assume Stereo */
        if (mixes[mix].chanFirst == mixes[mix].chanLast)
            index = mixes[mix].chanFirst ? 38 : 13;    /* right or left */
    }
    GetIndString (str, 100, index );

NumToString( maxFactor/w->info[rate]/1000, num );
    AddChar( str, ' ' );
    AddStr( str, num );
    AddChar( str, 'K' );

OffsetRect( r, 0, 12 );
    TextBox( &str[1], str[0], r, teJustCenter );

}
  else {
    TextFont( 1 );             /* rest in app font */
    TextSize( 9 );
    if (mix == mixOut)
        GetIndString (str, 100, 49 );   /* Output channel */
    else {
        GetIndString (str, 100, 48 );   /* Input channel */
        NumToString( mix+1, num );
        AddStr( str, num );
    }
    GetIndString (num, 100, 50 );   /* Not connected */
    AddStr( str, num );
    InsetRect( r, 0, 14 );
    TextBox( &str[1], str[0], r, teJustCenter );
  }
  TextFont( 0 );               /* title in Chicago */
  TextSize( 0 );
} short MixDeltoid()
{
    register short  mix, skip;
    Fixed           delta, minDelta;
    short           minSkip;
    long            diff;

if (nMixed == 0) {
        mixDelta = 0x7FFFFFFF;
        mixSkip = 1;
    }
    else {
        mixes[mix].end = mixes[mix].end;
        minDelta = 0x7FFFFFFF;
        for (mix=0;mix<nMixed;mix++) if (diff = (mixes[mix].end - mixes[mix].beg)) {
            skip = 1;
            delta = (((long)mixWidth+1) << (16+fudge)) / (diff * mixes[mix].sRate);
            while (True) {
                if (delta*skip > 0x00004000) break;
                skip <<= 1;
            } if (delta < minDelta) {
                minDelta = delta;
                minSkip = skip;
            }
        }
        if (mixDelta != minDelta) {
            mixDelta = minDelta;
            mixSkip = minSkip;

for (mix=0;mix<nMixed;mix++) {
                skip = ((mixes[mix].end - mixes[mix].beg) * mixDelta * mixes[mix].sRate) >> (16+fudge);
                skip = mixWidth+mixH - (mixes[mix].wave.left + skip);
                if (skip < 0) OffsetRect( &mixes[mix].wave, skip, 0 );
                /*OffsetRect( &mixes[mix].wave, -mixes[mix].wave.left+mixH, 0 );*/
                MixPlot( mixes[mix].wind, mix );
            } return(True);
        }
    }
    return(False);
}

MixDisconnect( mix )
```

```
register short    mix;
{
    register short    i;
    Rect              r;

if (mix == mixOut) {
        MixRenew( mixOut );
        mixes[mixOut].wind = NIL;
    }
    if (mix<nMixed) {
        nMixed--;

DisposHandle( mixes[mix].bits );
        KnotKill( &mixes[mix].knots );

BlockMove( &mixes[mix+1], &mixes[mix], (nMixed - mix)*sizeof(MixTrack) );

for (i=mix;i<nMixed;i++) {
            OffsetRect( &mixes[i].wave, 0, -mixSpacing );
            KnotOffset( &mixes[i].knots, 0, -mixSpacing );
            MixRenew( i );
        }
        MixRect( nMixed, &r );
        InsetRect( &r, 0, knotIndent );
        KnotInit( &mixes[nMixed].knots, &r );
        MixRenew( nMixed );

mixes[nMixed].wind = NIL;
        mixes[nMixed].bits = NIL;

MixDeltoid();              /* in case minDelta was disconnected */
    }
}
MixDown()
{
    register long     samp, destAdd;
    register short    value;
    long              start[nMixers], count[nMixers], offset[nMixers];
    unsigned char     *waveA[nMixers], *waveB[nMixers], c, cB;
    short             knot[nMixers], monoMix[nMixers], ampStart[nMixers];
    Point             prevPt[nMixers], knotPt[nMixers];
    Fixed             slope[nMixers], horz;
    register short    mix;
    register GWindPeek w;
    Ptr               dest;
    GWindPeek         destWind;
    short             amp;
    long              l, destCut, countless, destMode, amt;
    short             i, x, selfMix;
    short             virgin;
    short             incs[nMixers];
    short             destInc, destRate, destStereo;
    long              realBeg[2];
    Handle            reserve;

WatchCursor();

x = GetNumItem( mixer, 13, 0, 1000 );
    SetNumItem( mixer, 13, x );
    SelIText( mixer, 13, 0, 1111 );
    mixMaster = x * 128L / 100;

virgin = False;
    destWind = mixes[mixOut].wind;
    if (!destWind) {                     /* if no dest specified create one */
        destWind = mixes[mixOut].wind = NewDocument( "\p", 0, "\p" );
        if (!destWind) return;

destWind->info[compress] = 0;    /* can't be compressed */

MixSetup( destWind, mixOut );    /* dest is last one */
        virgin = True;
    } destMode = destWind->chanFirst != destWind->chanLast;    /* what kind of dest ? */
    destRate = destWind->info[rate];

destAdd = 0;
    selfMix = -1;
    for (mix=0;mix<nMixed;mix++) {
        w = mixes[mix].wind;

if (w == destWind) selfMix = mix;

start[mix] = (((long)(mixes[mix].wave.left - mixH)) << (16+fudge)) / mixDelta;
        count[mix] = mixes[mix].end - mixes[mix].beg;
        l = count[mix] * mixes[mix].sRate;
        if (l > destAdd) destAdd = l;
```

```
    offset[mix] = 0;
} destCut = mixes[mixOut].end - mixes[mixOut].beg;
destAdd /= destRate;        /* destAdd should be rate adjusted */ amt = destAdd - destCut;
if (destMode) amt *= 2;

if (CheckMemory( amt, 16 )) { reserve = NewHandle( amt );

if (UndoPrep( destWind, 16, mixes[mixOut].beg, mixes[mixOut].end, False )) {
        virgin = False;
        WatchCursor();

DisposHandle( reserve );

for (i=mixes[mixOut].chanFirst;i<=mixes[mixOut].chanLast;i++) {
            realBeg[i] = mixes[mixOut].beg;
            l = GetHandleSize( destWind->data[i] );
            if (l < mixes[mixOut].beg) realBeg[i] = l;

if (selfMix >= 0) {
                UndoModify( mixes[mixOut].beg, destAdd );
                /*UndoInsert( mixes[mixOut].beg, destAdd );*/ l = destAdd - (l - realBeg[i]);
                if (l > 0) {
                    InsertFill( destWind->data[i], realBeg[i], l, 0x80 );

/* if source is dest, bump over */
                    for (mix=0;mix<nMixed;mix++) if (mixes[mix].wind == destWind) {
                        offset[mix] = l;
                    }
                }
            }
            else {
                UndoInsert( mixes[mixOut].beg, destAdd );
                SafeReplace( destWind->data[i], mixes[mixOut].beg, destCut, (Ptr)l, destAdd );
            } countless = destAdd * destRate;

dest = *destWind->data[i] + realBeg[i];
            destInc = destRate;

for (mix=0;mix<nMixed;mix++) {
                w = mixes[mix].wind;
                /* see if stereo->mono mix */
                if (monoMix[mix] = ((mixes[mix].chanFirst != mixes[mix].chanLast) && !destMode) )
                    x = 0;
                else
                    x = (i == destWind->chanFirst) ? mixes[mix].chanFirst : mixes[mix].chanLast;

waveA[mix] = (unsigned char *)(*w->data[x] + mixes[mix].beg + offset[mix]);
                waveB[mix] = (unsigned char *)(*w->data[1] + mixes[mix].beg + offset[mix]);

/* assume conversion rate is max */
                incs[mix] = mixes[mix].sRate;

/* set count again in case we go around 2x */
                count[mix] = mixes[mix].end - mixes[mix].beg;

/* adjust count if wave is too short */
                l = GetHandleSize( w->data[x] ) - mixes[mix].beg;
                if (l < 0) l = 0;
                if (l < count[mix]) count[mix] = l;

knot[mix] = 1;
                knotPt[mix] = *(*mixes[mix].knots.pts);

} samp = 0;
            horz = 0;

value = 0;
            while (countless--) {
                for (mix=0;mix<nMixed;mix++) {
                    if ((samp >= start[mix]) && count[mix]) {
                        if ((horz >> (16+fudge)) >= knotPt[mix].h) {
                            if (knot[mix] < mixes[mix].knots.nKnots) {
                                prevPt[mix] = knotPt[mix];
                                while (True) {
                                    knotPt[mix] = *(*mixes[mix].knots.pts + knot[mix]++);
```

```
                if (knotPt[mix].h != prevPt[mix].h) break;
            } slope[mix] = (((long)(prevPt[mix].v - knotPt[mix].v)) << 16) /
                        (knotPt[mix].h - prevPt[mix].h);
            amp = ((((horz >> (16+fudge)) - prevPt[mix].h) * slope[mix]) >> 16);
            amp += mixHeight - (prevPt[mix].v);
            ampStart[mix] = amp;
        }
    }
    if (slope[mix]) {           /* is there slope ? */
        amp = ((((horz >> (16+fudge)) - prevPt[mix].h) * slope[mix]) >> 16);
        amp += mixHeight - (prevPt[mix].v);
    }
    else
        amp = ampStart[mix];

if (monoMix[mix]) {
        c = *waveA[mix];
        cB = *waveB[mix];
        if (--incs[mix] == 0) {
            incs[mix] = mixes[mix].sRate;
            waveA[mix]++;
            waveB[mix]++;

count[mix]--;
        }
        asm {
            MOVEQ    #0,D0
            MOVE.B   c(A6),D0
            MOVEQ    #0,D1
            MOVE.B   cB(A6),D1
            ADD      D1,D0
            SUB      #256,D0
            ;ASR     #1,D0       /* no auto divide */

MULS     amp(A6),D0
            DIVS     #48,D0
            ADD      D0,value
        }
    }
    else {
        c = *waveA[mix];
        if (--incs[mix] == 0) {
            incs[mix] = mixes[mix].sRate;
            waveA[mix]++;

count[mix]--;
        }
        asm {
            MOVEQ    #0,D0
            MOVE.B   c(A6),D0
            SUB      #128,D0
            MULS     amp(A6),D0
            DIVS     #48,D0
            ADD      D0,value
        }
    }

}
}
if (--destInc == 0) {
    /*
    value = ((value * (long)mixMaster) / 100 ) + 128;
    if (value > 255) value = 255;
    if (value < 0) value = 0;
    */
    asm {
        MULS     mixMaster(A5),value
        ASR.L    #7,value
        DIVS     destRate(A6),value
        ADD      #128,value
        BPL.S    @pinLo
        MOVEQ    #0,value
    @pinLo
        CMP      #255,value
        BLE.S    @pinHi
        ST       value
    @pinHi
        MOVE.L   dest,A0       ; *dest++ = value;
        MOVE.B   value,(A0)
        ADDQ.L   #1,dest
    } destInc = destRate;
    value = 0;
}
```

```
                        samp++;
                        horz += mixDelta;
                } /* sample loop */ if (selfMix >= 0) {
                    SetHandleSize( w->data[i], realBeg[i] + destAdd );
                }
            } /* each dest channel */

/* cleanup mix ranges, for incestuous mixes, reset to 0 */
            if (selfMix >= 0) for (mix=0;mix<nMixed;mix++) if (mixes[mix].wind == destWind) {
                l = destAdd - mixes[mix].end;
                if (l < 0) {
                    mixes[mix].beg += l;
                    mixes[mix].end += l;
                }
            }
            destWind->reports[repSelBeg] = mixes[mixOut].beg;
            destWind->reports[repSelEnd] = mixes[mixOut].end - mixes[mixOut].beg+destAdd;
            destWind->reports[repLength] += destAdd-destCut;

FitZoom( destWind );

} /* if undo prep */
        else
            DisposHandle( reserve );

} /* end if memory */
    else
        UndoNone();

if (virgin)                         /* kill it if nothing ever was put in it */
        KillDocument( destWind );
    else {
        ShowWindow( (GrafPtr)destWind );
        SelectWindow( (GrafPtr)destWind );
        InvalDoc( destWind );
        MixRenew( mixOut );
    }
}

MixDrawBits( mix )
short       mix;
{
    BitMap  bm;
    Rect    rSrc, rDst;

MixRect( mix, &rSrc );
    if ((mix < nMixed) && mixes[mix].bits) {
        FillRect( &rSrc, <Gray );

PenNormal();
        bm.rowBytes = mixRowBytes;
        SetRect( &bm.bounds, 0, 0, mixWidth, mixRealHite );
        bm.baseAddr = *mixes[mix].bits;
        rSrc = rDst = mixes[mix].wave;
        OffsetRect( &rSrc, -rSrc.left, -rSrc.top );
        CopyBits( &bm, &thePort->portBits, &rSrc, &rDst, srcCopy, NIL );

KnotDraw( &mixes[mix].knots );
    }
    else
        EraseRect( &rSrc );
} pascal void MixDrawProc( dlg, item )
DialogPtr   dlg;
short       item;
{
    Rect    r, copy;
    short   mix;

mix = (item - 2) / 2;               /* derive mixer number */

GetItemRect( dlg, item, &r );
    copy = r;
    if (item == 10) {
        InsetRect( ©, 2, 2 );
        EraseRect( © );
        InsetRect( ©, 0, 80 );
        MixBox( mixes[mixOut].wind, mixOut, © );

if (mixActive) MixInvert( mixSelect );  /* hilite on this one */
    }
    else switch ((item-2) % 2) {
        case 0:                         /* do source name */
            MixBox( mixes[mix].wind, mix, © );
            break;
```

```
        case 1:                             /* Draw Bits */
            MixDrawBits( mix );
            break;
    }
    InsetRect( &r, -1, -1 );
    PenSize( 2, 2 );
    FrameRect( &r );                        /* frame it */
    PenNormal();
}

MixEvent( itemHit, evt )
short       itemHit;
EventRecord *evt;
{
    short       mix;
    Point       pt, lastPt;
    Rect        r;
    short       deltaH;
    long        delta;
    BitMap      bm;
    Handle      off;
    short       i;
    long        x;
    long        maxLen, len, offset;
    long        beg, end;
    short       chanToPlay;
    Play4List   mixList;
    register GWindPeek  w;
    char        str[64];

SetPort( mixer );
    pt = evt->where;
    GlobalToLocal( &pt );

mix = (itemHit-2) / 2;

if (itemHit == 1) {
        MixDown();
    }
    else if (((((itemHit-3) % 2) != 0) && (mix < nMixed)) || ((itemHit == 10) && (mixes[mixOut].wind != NIL))) {
        MixInvert( mixSelect );
        MixInvert( mixSelect = itemHit );
    }
    else if ((((itemHit-3) % 2) == 0) && (mix < nMixed)) {
        MixInvert( mixSelect );
        mixSelect = 0;

if (!KnotClick( &mixes[mix].knots, &MixDrawBits, mix, pt ) && PtInRect( pt, &mixes[mix].wave)) {

MixRect( mix, &bm.bounds );
            bm.rowBytes = ((bm.bounds.right - bm.bounds.left + 15) >> 4) << 1;
            off = NewHandle( bm.rowBytes * (long)(bm.bounds.bottom - bm.bounds.top) );

lastPt = pt;
            while (True) {
                GetMouse( &pt );
                deltaH = pt.h - lastPt.h;

while ((mixes[mix].wave.right + deltaH) > (mixH + mixWidth)) deltaH--;
                while ((mixes[mix].wave.left + deltaH) < mixH) deltaH++;

if (deltaH) {
                    OffsetRect( &mixes[mix].wave, deltaH, 0 );
                    lastPt = pt;

SetPort( &offPort );
                    HLock( off );
                    bm.baseAddr = *off;
                    SetPortBits( &bm );

MixDrawBits( mix );

SetPort( mixer );
                    CopyBits( &bm, &mixer->portBits, &bm.bounds, &bm.bounds, srcCopy, NIL );
                    HUnlock( off );

}
                if (!StillDown()) break;
            }
            DisposHandle( off );

} /* in rect */
    }
    else if (itemHit == 11) {
        WatchCursor();
        mixList.null = 0x8080;
```

```
        for (i=0;i<4;i++) {
            mixList.delta[i] = 0;
            mixList.wave[i] = (Ptr)&mixList.null;
            mixList.delay[i] = 0x7FFFFFFF;  /* long delay for empty channels  */  /* <SMR 09/11/88>  */
        }
        maxLen = 0;
        for (i=0;i<nMixed;i++) {
            w = mixes[i].wind;
            chanToPlay = mixes[i].chanFirst;                                      /* <SMR 09/09/88>  */
            beg = mixes[i].beg;                                                   /* <SMR 09/11/88>  */
            end = mixes[i].end;                                                   /* <SMR 09/11/88>  */
            len = GetHandleSize( w->data[chanToPlay] );                           /* <SMR 09/11/88>  */
            if (end > len) end = len;                                             /* <SMR 09/11/88>  */ if (beg <= len) {
                delta = -1;
                if (w->info[rate] == 2) delta = 0x55555555;
                else if (w->info[rate] == 3) delta = 0x24924924;
                else if (w->info[rate] == 4) delta = 0x11111111;
                mixList.delta2B[i] = delta;

/* ok to point into the unlocked wave since no
                     calls that may move memory are made between
                     here and the sound finishing
                */
                mixList.wave2B[i] = *w->data[chanToPlay] + beg;                   /* <SMR 09/09/88>  */ offset = (((long)(mixes[i].wave.left - mixH)) << (16+fudge)) / mixDelta;
                mixList.delay[i] = 1 + offset * 60 /* * w->info[rate] */ / maxFactor;  /* delay 1 60th */  /* <SC 05/31/88:

len = (end - beg) * 60 * w->info[rate] / maxFactor;/* delay 1 60th */  /* <SMR 09/11/88>  */
                mixList.ticks[i] = mixList.delay[i] + len;
                if (len > maxLen) maxLen = len;
            }
        }
        mixList.count = (maxLen == 0) ? 1 : maxLen; /* stop VBL from waiting forever  */  /* <SMR 09/11/88>  */

Zound4Start( &mixList );

while (soundVBL.isSound)
            if (Button()) {
                mixList.count = 1;
                while (mixList.count > 0) ;
                soundVBL.wave = NIL;
                break;
            }
        KillSound();
        FlushEvents( everyEvent, 0 );

InitCursor();
    }
    else if (itemHit == 14) {
        i = (mixSelect == 10) ? mixOut : ((mixSelect-2) / 2);
        MixDisconnect( i );
        mixSelect = 0;
    }
}

MixIdle()
{
    short  ok;

EnableCtlItem( mixer, 1, nMixed > 0 );       /* enable buttons if something there */
    EnableCtlItem( mixer, 11, nMixed > 0 );

ok = mixSelect > 0;
    if (((mixSelect-2) & 2) == 2) ok = (mixes[mixOut].wind != NIL);
    EnableCtlItem( mixer, 14, ok );              /* something to disconnect */
}

MixInval( w )
register GWindPeek  w;
{
    register short  mix;
    register long   max;
    GrafPtr         save;
    Rect            r;

GetPort( &save );
    SetPort( mixer );

/* look at ALL mixers, unassigned ones have nil window */

/* set up new values */
    for (mix=0;mix<nMixers+1;mix++) if (w == mixes[mix].wind) {
```

```
        if (mix < mixOut) {
            mixes[mix].sRate = w->info[rate];

if (mixes[mix].sMode != w->info[mode]) {
                mixes[mix].chanFirst = w->chanFirst;
                mixes[mix].chanLast = w->chanLast;
            }
            mixes[mix].sMode = w->info[mode];
        }
    }

/* see if time to recalc */
    MixDeltoid();

for (mix=0;mix<nMixers+1;mix++) if (w == mixes[mix].wind) {
        if (mix < mixOut) {
            MixRect( mix, &r );
            r.left = 2;
            InvalRect( &r );

MixPlot( w, mix );
        }
        else {                          /* inval mix out too */
            GetItemRect( mixer, 10, &r );
            InsetRect( &r, 2, 2 );
            InvalRect( &r );
        }
        MixRenew( mix );
    }
    SetPort( save );
}

MixInvert( item )
short       item;
{
    Rect    r;

if (item > 0) {
        GetItemRect( mixer, item, &r );
        InsetRect( &r, 3, 2 );
        HiliteMode &= 0x7F;             /* use hilite mode */
        InvertRect( &r );
    }
}

MixItUp()
{
    register short  mix, j;
    Rect            r;

if (!mixer) {
        mixer = GetDialogX( 2010 );
        for (mix=0;mix<nMixers;mix++)
            for (j=2;j<=3;j++) SetUserProc( mixer, mix*2 + j, (Ptr)&MixDrawProc );
        SetUserProc( mixer, 10, (Ptr)&MixDrawProc );

SetNumItem( mixer, 13, mixMaster * 100L / 128 );
        SelIText( mixer, 13, 0, 1111 );

MixIdle();           /* force one event */
    }
    ShowWindow( mixer );
    SelectWindow( mixer );
    mixVisible = True;
}

/*
    Disassociate label from mixer and update mixer.  Renumber references to higher
    numbered labels from same window.
*/
void MixLabelKill( w, lab )
    register GWindPeek  w;
    register short      lab;
{
    register short      i;

for(i=0;i<nMixers+1;i++)
        if( mixes[i].wind == w )              /* must be same window          */
            if( mixes[i].label == lab ) {     /* label being deleted          */
                mixes[i].label = -1;          /* no label associated w/ channel */
                MixRenew( i );                /* cause re-draw w/ range instead */
            }
```

```
            else if( mixes[i].label > lab )  /* higher numbered label       */
                mixes[i].label--;             /* renumber it                */
}

/*
    Disassociate all of a window's labels from the mixer.
*/
void MixLabelsKill( w )
    register GWindPeek  w;
{
    register short      i;

for(i=0;i<nMixers+1;i++)
        if( mixes[i].wind == w )             /* must be same window         */
            mixes[i].label = -1;
}

/*
    Call MixRenew for all mixer channels that reference the specified label.
*/
void MixLabelRenew( w, lab )
    register GWindPeek  w;
    register short      lab;
{
    register short      i;

for(i=0;i<nMixers+1;i++)
        if( mixes[i].wind == w )             /* must be same window         */
            if( mixes[i].label == lab )      /* label whose text changed    */
                MixRenew( i );               /* cause re-draw w/ new text   */
}

MixPlot( w, mix )
GWindPeek   w;
short       mix;
{
    register Ptr    out;
    Handle  h;
    Ptr     in;
    short   i, j;
    char    mask;
    short   right, rightByte;
    short   locked;
    Ptr     dest;
    short   height;

h = mixes[mix].bits;
    SetHandleSize( h, mixRowBytes * 70L );
    in = *h;                                          /* Erase it */
    for (i=0;i<70*mixRowBytes;i++) *in++ = 0;

locked = SafeLock( h );

right = ((mixes[mix].end - mixes[mix].beg) * mixDelta * mixes[mix].sRate) >> (16+fudge);
    mixes[mix].wave.right = mixes[mix].wave.left + right;

dest = *h+knotIndent*mixRowBytes;
    height = 2;
    if (mixes[mix].chanFirst != mixes[mix].chanLast) height = 3;

for (i=mixes[mix].chanFirst;i<=mixes[mix].chanLast;i++) {
        PlotPixels( w->data[i], mixes[mix].beg, w->info[compress], False, mixSkip,
                    0, right, (mixDelta*mixSkip*mixes[mix].sRate) >> fudge, height,
                    dest, mixRowBytes );

dest += 32*mixRowBytes;
    } mask = 0xAA;                              /* grey out the waveform */
    in = out = *h+knotIndent*mixRowBytes;
    for (i=0;i<64;i++) {
        if (i % 4)
            for (j=0;j<mixRowBytes;j++) *out++ = *in++ & mask;
        else
            in += mixRowBytes;                /* skip every fourth row */
        mask ^= 0xFF;
    }
```

```
    for (i=0; i<knotIndent*mixRowBytes;i++) *out++ = 0;      /* add white space*/ if (right > 0) right--;
    rightByte = right >> 3;                 /* add the stripes */
    right = 0x80 >> (right & 7);
    out = *h;
    for (i=0;i<mixRealHite;i++) {
        *out |= 0x80;                       /* add left line */
        *(out+rightByte) |= right;          /* add right line */
        out += mixRowBytes;
    } if (locked) HUnlock( h );
    SetHandleSize( h, mixRowBytes * (long)mixRealHite );

MixRenew( mix );
}

MixRenew( mix )
register short mix;
{
    Rect    r;
    GrafPtr save;
    short   left;

if (mixer) {
        GetPort( &save );
        SetPort( mixer );

if (mixActive) MixInvert( mixSelect );      /* drop selection */
        mixSelect = 0;

if (mix == mixOut) {
            GetItemRect( mixer, 10, &r );
            InsetRect( &r, 1, 1 );
            InvalRect( &r );
        }
        else {
            GetItemRect( mixer, mix*2+2, &r );
            left = r.left;
            GetItemRect( mixer, mix*2+3, &r );
            r.left = left;
            InsetRect( &r, 1, 1 );
            InvalRect( &r );
        }
        SetPort( save );
    }
}

MixSetup( w, mix )
register GWindPeek  w;
register short      mix;
{
    Handle          h;
    register short  i;
    GWindPeek       destWind;

if (mix != mixOut) {
        if (!CheckMemory( mixRowBytes * 70L, 19 )) return;
        nMixed++;
    } mixes[mix].wind = w;
    mixes[mix].beg = w->reports[repSelBeg];
    mixes[mix].end = w->reports[repSelEnd];
    /*
    if (w->reports[repSelBeg] == w->reports[repSelEnd]) {
        mixes[mix].beg = 0;
        mixes[mix].end = w->reports[repLength];
    }
    */
    mixes[mix].sRate = w->info[rate];
    mixes[mix].sMode = w->info[mode];
    mixes[mix].chanFirst = w->chanFirst;
    mixes[mix].chanLast = w->chanLast;
    mixes[mix].label = w->activeLabel2B;
    if(w->activeLabel2B == -1)                                              /* <SMR 10/01/88>  */
        mixes[mix].label = LabelFindLR( w, mixes[mix].beg, mixes[mix].end); /* <SMR 10/01/88>  */
    else                                                                    /* <SMR 10/01/88>  */
        mixes[mix].label = w->activeLabel2B;

if (mix < nMixers) {
        mixes[mix].bits = ZeroHandle( mixRowBytes * 65L );
        #if beta
        if (!mixes[mix].bits) Shit("\pNo bits in mix N°30");
        #endif
```

```c
        MixRect( mix, &mixes[mix].wave );

if (!MixDeltoid()) MixPlot( w, mix );
    }

/* make sure incestuous mixes are OK (dest must be whole wave) */
    destWind = mixes[mixOut].wind;
    if (destWind) for (i=0;i<nMixed;i++) {
        if (mixes[i].wind == destWind) {
            if ((mixes[mixOut].beg > 0) || (mixes[mixOut].end < destWind->reports[repLength])) {
                if (mix != mixOut) {
                    DisposHandle( mixes[mix].bits );
                    mixes[mix].bits = NIL;
                    nMixed--;
                }
                mixes[mix].wind = NIL;
                ErrorAlert( w->name, 59 );
                return;
            } if 0
            if ((mixes[i].beg < mixes[mixOut].beg) || (mixes[i].end > mixes[mixOut].end)) {
                if (mix != mixOut) {
                    DisposHandle( mixes[mix].bits );
                    mixes[mix].bits = NIL;
                    nMixed--;
                }
                mixes[mix].wind = NIL;
                ErrorAlert( w->name, 59 );
            }
            #endif
        }
    }

MixItUp();
}

MiscRtns.c

/*
    SoundTrack source (AudioMisc.c)
    ©1987 Farallon

Written by Steve Capps with a lot of help from:
        Mike Lamoureux, Sam Roberts & Joe Sensendorf

*/
short KnotClick( list, backgnd, msg, pt )
KnotList        *list;
ProcPtr         backgnd;
short           msg;
Point           pt;
{
    Point       *p, knot1Pt, knot2Pt, ptNorm, phase;
    short       redraw;
    Rect        outer, bounds;
    BitMap      bm;
    Handle      ofs;
    GrafPtr     save;
    short       knot;
    short       inside;
    short       i, locked;

phase.h = 0; phase.v = 0;

knot = KnotFind( list, pt );
    if (knot >= 0 ) {
        inside = True;

/* calculate difference between box origin and pt */ phase = *(*list->pts + knot);
        AddPt( topLeft(list->bounds), &phase );
        SubPt( pt, &phase );
    }
    else {
        ptNorm = pt;
        SubPt( topLeft(list->bounds), &ptNorm );

knot1Pt = *(*list->pts);

knot = -1;
        for (i=1;i<list->nKnots;i++) {
            knot2Pt = *(*list->pts + i);

if (HitLine( knot1Pt, knot2Pt, ptNorm )) {
                knot = i-1;
```

```
                    inside = False;
                    break;
                }
                knot1Pt = knot2Pt;
            }
            if (knot < 0) return(False);
        }

GetPort( &save );

bm.bounds = outer = list->bounds;           /* start with given rect */
    InsetRect( &bm.bounds, 0, -2 );             /* room for knots */
    InsetRect( &outer, -1000, -8 );             /* Outset for "PullOut" deleting */    /* <SC  07/20/88> */ if 0
    /* prevent horizontal pullout for endpoints (hack) */                /* <SC  07/20/88> */
    if( (knot == 0) || (knot == (list->nKnots-1)) )                      /* <SC  07/20/88> */
        InsetRect( &outer, -1000, 0 );                                   /* <SC  07/20/88> */
endif bm.rowBytes = ((bm.bounds.right - bm.bounds.left + 15) >> 4) << 1;
    off = NewHandle( bm.rowBytes * (long)(bm.bounds.bottom - bm.bounds.top) );

while (StillDown()) {
        GetMouse( &pt );
        AddPt( phase, &pt );

redraw = False;
        if (PtInRect( pt, &outer )) { if (!inside) {
                p = *list->pts;
                *((long *)&pt) = PinRectX( &list->bounds, pt );
                ptNorm = pt;
                SubPt( topLeft(list->bounds), &ptNorm );
                for (knot=0;knot<list->nKnots-1;knot++) if (p++->h > ptNorm.h ) break;
                SafeReplace( (Handle)list->pts, knot*4, 0, (Ptr)&ptNorm, 4 );
                list->nKnots++;
                inside = True;
            } p = *list->pts + knot;              /* Pin knots with neighbors */
            if (knot > 0) {
                bounds.left = (p-1)->h + 2;
                if (knot < list->nKnots-1)
                    bounds.right = (p+1)->h   2;
                else
                    bounds.left = bounds.right = list->bounds.right - list->bounds.left;
            }
            else {
                bounds.left = bounds.right = 0;
            }
            OffsetRect( &bounds, list->bounds.left, list->bounds.left );

*((long *)&pt) = PinRectX( &list->bounds, pt ); /* pin the drag pt */
            if (pt.h < bounds.left) pt.h = bounds.left;
            if (pt.h > bounds.right) pt.h = bounds.right;

ptNorm = pt;
            SubPt( topLeft(list->bounds), &ptNorm );
            redraw = !EqualPt( *p, ptNorm);     /* redraw if changed */

*p = ptNorm;                        /* record new pt */

}
        else {
            if ((inside) && (knot > 0) && (knot < list->nKnots-1)) {
                SafeReplace( (Handle)list->pts, knot*4, 4, (Ptr)1, 0);
                list->nKnots--;

inside = False;
                redraw = True;
            }
        } /* in outer rect */ if (redraw) {
            SetPort( &offPort );
            locked = SafeLock( off );
            bm.baseAddr = *off;
            SetPortBits( &bm );

(*backgnd)( msg );

SetPort( save );
```

```
                CopyBits( &bm, &save->portBits, &bm.bounds, &bm.bounds, srcCopy, NIL );
                if (locked) HUnlock( off );
            }
        }
        DisposHandle( off );
        return(True);
    }

KnotDraw( list )
register KnotList    *list;
{
    register short   i, x;
    Point            pt;
    Rect             r;

for (i=0;i<list->nKnots;i++) {
        pt = *(*list->pts + i);
        AddPt( topLeft(list->bounds), &pt );

PenSize( 2, 2 );
        if (i)
            LineTo( pt.h, pt.v );
        else
            MoveTo( pt.h, pt.v );

x = list->bounds.left + 2;       /* pin h it inside box */
        if (pt.h < x) pt.h = x;
        x = list->bounds.right - 3;
        if (pt.h > x) pt.h = x;

#if 0
        x = list->bounds.top + 2;        /* pin v it inside box */
        if (pt.v < x) pt.v = x;
        x = list->bounds.bottom - 2;
        if (pt.v > x) pt.v = x;
        #endif SetRect( &r, -2, -2, 4, 4 );
        OffsetRect( &r, pt.h, pt.v );
        FillRect( &r, &black );
    }
} short KnotFind( list, findPt )
register KnotList    *list;
Point                findPt;
{
    short   i;
    Point   pt;
    Rect    r;

for (i=0;i<list->nKnots;i++) {
        pt = *(*list->pts + i);
        AddPt( topLeft(list->bounds), &pt );

SetRect( &r, -6, -6, 8, 8 );
        OffsetRect( &r, pt.h, pt.v );
        if (PtInRect( findPt, &r )) return(i);
    }
    return(-1);
}

KnotInit( list, r )
register KnotList    *list;
Rect                 *r;
{
    list->bounds = *r;
    list->pts = (Point **)NewHandle( 0 );
    KnotReset( list );
}

KnotKill( list )
register KnotList    *list;
{
    DisposHandle( list->pts );
}

KnotOffset( list, dh, dv )
register KnotList    *list;
short                dh, dv;
{
    OffsetRect( &list->bounds, dh, dv );
}
```

```
KnotReset( list )
register KnotList   *list;
{
    Rect    r;

list->nKnots = 2;
    SetRect( &r, 0, 0, list->bounds.right - list->bounds.left, 0 );
    PtrToXHand( &r, list->pts, 8 );
}

MixRect( mix, r )       /* <JS 5/18/88> */
short   mix;
Rect    *r;
{
    SetRect( r, 0, 0, mixWidth, mixRealHite );
    OffsetRect( r, mixH, mixV + mix*mixSpacing );
}

PlotPixels( samples, offset, comp, lines, skip, leftH, rightH, delta, scaleV, dest, destWidth )
Handle  samples;
long    offset;
short   comp;
short   lines;
short   skip;
short   leftH;
short   rightH;
Fixed   delta;
short   scaleV;
Ptr     dest;
short   destWidth;
{
    short   toggle;

#define     Pmin    3*CVSDmin        /* like Kmin in CVSD */
    #define     Pshift  CVSDdecay        /* like a */
    #define     PPshift CVSDgain         /* like aa */ if (comp == 2)        /* <JS 5/6/88> replaced entire code for compressed case */
        PlotCompPixels(samples, offset, skip, leftH, rightH, delta, scaleV, dest, destWidth);
    else if (comp == 1)
        PlotCVSD(samples, offset, skip, leftH, rightH, delta, scaleV, dest, destWidth);
    else asm {
        MOVEM.L     A2-A4/D2-D7,-(SP)   ; save regs MOVE        scaleV(A6),D2       ; get v Scale
        MOVE.L      samples(A6),A2      ; get data handle
        MOVE.L      delta(A6),D6
        MOVE.L      offset(A6),D7

MOVE        leftH(A6),D5        ; do starting H pixel
        SWAP        D5
        CLR         D5                  ; clear low order MOVE        rightH(A6),D4       ; pin right H at right edge
        SWAP        D4                  ; put in high order
        CLR         D4                  ; clear low order MOVE.L      A2,A0               ; get byte limit
        _GetHandleSize
        MOVE.L      D0,A1               ; save length CMP.L       D7,D0               ; offset past length ?
        BLT         @plotExit MOVE.L      (A2),A2             ; dereference
        ADD.L       A2,A1               ; calculate length
        ADD.L       D7,A2               ; add offset TST         lines(A6)           ; lines or dots
        BNE         @doLines @plotLoop2                              ; dot plots
        CMP.L       A2,A1               ; too far?
        BLS         @plotExit MOVEQ       #0,D1
        MOVE.B      (A2),D1             ; get the value
        ADD         skip(A6),A2

NOT.B       D1                  ; flip direction
        LSR         D2,D1               ; scale it MULU        destWidth(A6),D1    ; dest.rowBytes
```

```
          MOVE.L      dest(A6),A0         ; dest Address
          ADD.L       D1,A0

MOVE.L      D5,D0               ; get byte plus pixel
          SWAP        D0                  ; get integer
          MOVE        D0,D1               ; save for bit calc LSR         #3,D0               ; over to right byte
          ADD         D0,A0

NOT.B       D1
          BSET        D1,(A0)             ; plot that bit

ADD.L       D6,D5               ; bump h position

CMP.L       D5,D4               ; too far
          BGE.S       @plotLoop2
          BRA         @plotExit
@doLines
          MOVEQ       #0,D3
          MOVE.B      (A2),D3
          TST.L       D7                  ; from beginning?
          BEQ.S       @goPlot MOVE.L      A2,A0               ; get previous guy
          SUB         skip(A6),A0
          MOVEQ       #0,D3               ; set revious to same
          MOVE.B      (A0),D3
@goPlot
          NOT.B       D3                  ; flip it
          LSR         D2,D3               ; scale it
@plotLoop3
          CMP.L       A2,A1               ; too far?
          BLS.S       @plotExit MOVEQ       #0,D1
          MOVE.B      (A2),D1             ; get the value
          ADD         skip(A6),A2

NOT.B       D1                  ; flip direction
          LSR         D2,D1               ; scale it
          MOVE        D1,D7               ; save value MULU        destWidth(A6),D1    ; dest.rowBytes MOVE.L      dest(A6),A0         ; dest Address
          ADD.L       D1,A0

MOVE.L      D5,D0               ; get byte plus pixel
          SWAP        D0                  ; get integer
          MOVE        D0,D1               ; save for bit calc LSR         #3,D0               ; over to right byte
          ADD         D0,A0

NOT.B       D1
          BSET        D1,(A0)             ; plot that bit

SUB         D7,D3               ; get delta
          BPL.S       @up
@down
          ADDQ        #1,D3
          BGE.S       @done
          SUB         destWidth(A6),A0
          BSET        D1,(A0)             ; plot that bit
          BRA.S       @down
@up
          SUBQ        #1,D3
          BLE.S       @done
          ADD         destWidth(A6),A0
          BSET        D1,(A0)             ; plot that bit
          BRA.S       @up
@done
          MOVE        D7,D3

ADD.L       D6,D5               ; bump h position
          CMP.L       D5,D4               ; too far
          BGE.S       @plotLoop3
@plotExit
          MOVEM.L     (SP)+,A2-A4/D2-D7   ; restore regs
    }
}
```

Envelope.c

```c
/*
    Envelope sound effect

Modification History:
    --------------------

<JS 12/14/87>  Exit right away if no selection (also fixes divide by zero).
    <SC 07/20/88>  Inset knot deletion rect by (-1000, -4) instead of (-4, -4)
                   so that knots are deleted only by dragging vertically off
                   wave, not by dragging horizontally off wave. This also
                   allows end knots to track with mouse off to left or right
                   of wave.

*/
include "AudioDefs"
    _GetA4( void );
#include "SetUpA4.h"

define waveItem 3 typedef struct {
    Handle      off;            /* offscreen butmap */
    Ppint       **knots;        /* Handle of points */
    short       nKnots;         /* Number of knots */
    short       range;          /* multiplier */
} Envelope, *EnvelopePtr, **EnvelopeHandle;

pascal short    main( GWindPeek, short, long, long, EventRecord *, Effect * );

ApplyEnvelope( GWindPeek, short, EnvelopePtr, long, long );
Handle          BuildEnvelope( DialogPtr, GWindPeek );
                DragKnot( DialogPtr, EnvelopePtr, short, short );
                DragKnotInd( short, short );
pascal void     DrawEnvelope( DialogPtr, short );
                DrawKnots( EnvelopePtr );

pascal short main( w, opcode, op1, op2, evt, efx )
    register GWindPeek      w;
    short                   opcode;
    long                    op1, op2;
    EventRecord             *evt;
    Effect                  *efx;
{
    short                   x;
    register DialogPtr      dlg;
    short                   item, kind, result;
    Handle                  h;
    Rect                    r, frame, drag;
    Point                   pt, knot, knot2;
    short                   i;
    register EnvelopePtr    env;
    short                   rangeItem;
    char                    str[255];
    long                    l;

RememberA0();
    SetUpA4();

if (op2 <= op1) {
        RestoreA4();
        return (FALSE);
    } result = False;

switch (opcode) {
        case opDoIt:                                /* op1, op2 are left & right of selection */
            dlg = GetDialog( efx->id*10 );
            SetWRefCon( dlg, (long)efx );           /* salt owner away */
            SetPort( dlg );

GetDItem( dlg, waveItem, &kind, &h, &frame );
            SetDItem( dlg, waveItem, kind, &DrawEnvelope, &frame );
            drag = frame;
            InsetRect( &drag, 4, 4 );

if (!efx->h) {
                efx->h = NewHandle( sizeof(Envelope) );
                r = drag;
                /*r.top += 8;                       /* build a flat curve */
                r.bottom = r.top;
```

```
        PtrToHand( &r, &h, 8 );

env = (EnvelcpePtr)*efx->h;
    env->nKnots = 2;
    env->knots = (Point **)h;
    env->range = 1;
}
HLock( efx->h );

env = (EnvelopePtr)*efx->h;
env->off = BuildEnvelope( dlg, w );

switch (env->range) {
    case 1:
        rangeItem = 4;
        break;

case 2:
        rangeItem = 5;
        break;

default:
        rangeItem = 6;
        SetNumItem( dlg, 9, env->range );
        SelIText( dlg, 9, 0, 1111 );
        break;
}
ToggleCtlItem( dlg, rangeItem );        /* set up range stuff */ while (True) {
    ModalDialog( NIL, &item );          /* Ask the user for parameters */ if (item <= 2) break;
    else if (item == waveItem) {
        GetMouse( &pt );

for (i=0;i<env->nKnots;i++) {
            knot = *(*env->knots + i);
            SetRect( &r, -3, -3, 4, 4 );
            OffsetRect( &r, knot.h, knot.v );
            if (PtInRect( pt, &r )) {
                DragKnot( dlg, env, i, True );
                break;
            }
        }
        knot = *(*env->knots);
        for (i=1;i<env->nKnots;i++) {
            knot2 = *(*env->knots + i);
            if (HitLine( knot, knot2, pt )) {
                DragKnot( dlg, env, i-1, False );
                break;
            }
            knot = knot2;
        }
    }
    else if (item == 8) {
        DragKnot( dlg, env, i, False );
    }
    else {
        if (item == 9) item = 6;    /* override text to control */

ToggleCtlItem( dlg, rangeItem );
        rangeItem = item;
        ToggleCtlItem( dlg, rangeItem );
        switch (rangeItem) {
            case 4: {
                env->range = 1;
                break;
            }
            case 5: {
                env->range = 2;
                break;
            }
            case 6: {
                GetTextItem( dlg, 9, str );
                StringToNum( str, &l );
                env->range = 1;
                /*env->range = GetNumItem( dlg, 9, 1, 99 );*/
                break;
            }
        }
        /* redraw scale */
        GetDItem( dlg, 11, &kind, &h, &r );
        r.bottom = r.top + 16;
        InsetRect( &r, 1, 1 );
        InvalRect( & r );
    }
}
```

```
            if ((item == 1) && (rangeItem == 6)) {
                env->range = GetNumItem( dlg, 9, 1, 99 );
            }
            DisposDialog( dlg );
            UpdateWindows();
            DisposHandle( env->off );

if (item == 1) {
                if (result = UndoPrep( w, 6, op1, op2, False )) {
                    UndoModify( op1, op2-op1 );

WatchCursor();
                    ApplyEnvelope( w, drag.right - drag.left, env, op1, op2 );
                }
            }
        }

HUnlock( efx->h );

RestoreA4();
    return(result);
}

ApplyEnvelope( w, width, env, start, end )
register GWindPeek   w;
short                width;
EnvelopePtr          env;
long                 start, end;
{
    short            i, horz, x, test;
    Point            pt1, pt2, *pKnot;
    Rect             r;
    register unsigned char *lp;
    long             cnt, cntDelta, delta;
    long             amp, deltaAmp;
    short            useAmp;
    long             len, useEnd;

for (i=w->chanFirst;i<=w->chanLast;i++) {       /* do it for both tracks if there */
        len = GetHandleSize(w->data[i]);             /* JS: check for selection past end */
        if (start >= len) continue;
        useEnd = end;
        if (useEnd > len) useEnd = len;
        cnt = useEnd - start;
        delta = (((long)width) << 16) / cnt;

pKnot = *env->knots;
        pt1 = *pKnot++;
        pt2 = *pKnot++;
        while (pt2.h == pt1.h) pt2 = *pKnot++;

amp = ((long)(64 + 10 - pt1.v)) << 16 ;
        deltaAmp = (((long)(pt1.v - pt2.v)) << 16) / (pt2.h - pt1.h);
        test = env->nKnots - 2;

cntDelta = 0;
        horz = pt1.h;

lp = (unsigned char *)*w->data[i] + start;
        while (True) {
            useAmp = (amp >> 16) * env->range;

cntDelta &= 0x0000FFFF;
            while ((cntDelta < 0x00010000) && (cnt-- > 0)) {
                x = (((short)(*lp - 128) * useAmp) >> 6) + 128;
                if (x<0) x = 0;
                if (x>255) x = 255;
                *lp++ = x;

cntDelta += delta;
            } if (cnt <= 0) break;

amp += deltaAmp;
            if (horz++ > pt2.h) {
                pt1 = pt2;
                pt2 = *pKnot++;
                while (pt2.h == pt1.h) pt2 = *pKnot++;

amp = ((long)(64 + 10 - pt1.v)) << 16;
                deltaAmp = (((long)(pt1.v - pt2.v)) << 16) / (pt2.h - pt1.h);
            }
        } /* for each byte */
    } /* for each channel */
```

```
}

Handle BuildEnvelope( dlg, w )
DialogPtr         dlg;
register GWindPeek w;
{
    short    rowBytes;
    short    kind;
    Rect     frame;
    Handle   h;
    Handle   off;
    long     left, cnt, delta;
    char     *p, mask;
    short    i,j;
    long     skip;

GetDItem( dlg, waveItem, &kind, &h, &frame );
    InsetRect( &frame, 4, 4 );

left = w->reports[repSelBeg];
    cnt = w->reports[repSelEnd] - left;
    if (!cnt) {
        left = 0;
        cnt = w->reports[repLength];
    } delta = (((long)(frame.right - frame.left)) << 16) / cnt;
    skip = 1;
    while (True) {
        if (delta*skip > 0x00000400) break;
        skip <<= 1;
    } rowBytes = ((frame.right - frame.left + 16) >> 4) << 1;
    off = ZeroHandle( rowBytes * (long)(frame.bottom - frame.top + 3) );
    HLock( off );

PlotPixels( w->data[w->chanFirst], left, w->info[compress], False, skip,
                0, frame.right - frame.left, delta*skip, 1, *off+2*rowBytes, rowBytes );

if (w->chanFirst != w->chanLast)
        PlotPixels( w->data[w->chanLast], left, w->info[compress], False, skip,
                0, frame.right - frame.left, delta*skip, 1, *off+2*rowBytes, rowBytes );

mask = 0xAA;                        /* grey out the waveform */
    p = *off;
    for (i=frame.top; i<frame.bottom;i++) {
        for (j=0;j<rowBytes;j++) *p++ &= mask;
        mask ^= 0xFF;
    }

HUnlock( off );
    return( off );
}

DragKnot( dlg, env, knot, inside )
DialogPtr         dlg;
register EnvelopePtr env;
short             knot;
short             inside;
{
    Point   pt, *p;
    short   kind;
    Handle  item;
    Rect    drag, outer, bounds;
    short   draggeur;

GetDItem( dlg, waveItem, &kind, &item, &outer );
    drag = outer;
    InsetRect( &outer, -1000, -4 );       /* rect for deleting */  /* <SC 07/20/88> */
    InsetRect( &drag, 4, 4 );             /* rect for pinning */
    drag.bottom = drag.top + 65;          /* only top half    */
    bounds = drag;
    InsetRect( &bounds, 0, -3 );          /* rect for clipping */ draggeur = 0;                         /* no indicator */ while (StillDown()) {
        GetMouse( &pt );

if (PtInRect( pt, &outer )) {
            if (!inside) {
                p = *env->knots;
                *((long *)&pt) = PinRect( &drag, pt );
                for (knot=0;knot<env->nKnots-1;knot++) if (p++->h > pt.h ) break;
```

```
            Munger( env->knots, knot*4, (Ptr)1, 0, &pt, 4 );
            env->nKnots++;
        }
        inside = True;

p = *env->knots + knot;
        if (knot > 0) {
            bounds.left = (p-1)->h + 2;
            if (knot < env->nKnots-1)
                bounds.right = (p+1)->h - 2;
            else
                bounds.left = bounds.right = drag.right;
        }
        else {
            bounds.left = bounds.right = drag.left;
        }

*((long *)&pt) = PinRect( &drag, pt );
        if (pt.h < bounds.left) pt.h = bounds.left;
        if (pt.h > bounds.right) pt.h = bounds.right;

if (!EqualPt( *p, pt)) {
            if (knot == 0) {                    /* setup clip */
                bounds.left = drag.left;
                bounds.right = (p+1)->h;
            }
            if (knot == env->nKnots-1) {
                bounds.left = (p-1)->h;
                bounds.right = drag.right;
            }
            InsetRect( &bounds, -3, 0 );

if (draggeur) DragKnotInd( drag.left, draggeur );/* draw indicator */
            draggeur = pt.v;
            DragKnotInd( drag.left, draggeur );

*p = pt;
            ClipRect( &bounds );                /* draw wave */
            DrawEnvelope( dlg, waveItem );
            ClipRect( &dlg->portRect );
            }
        }
        else {
            if (draggeur) DragKnotInd( drag.left, draggeur );
            draggeur = 0;

if ((inside) && (knot > 0) && (knot < env->nKnots-1)) {
                Munger( env->knots, knot*4, NIL, 4, (Ptr)1, 0);
                env->nKnots--;
                DrawEnvelope( dlg, waveItem );
                inside = False;
            }
        }
    }
    if (draggeur) DragKnotInd( drag.left, draggeur );
}

DragKnotInd( h, v )
short   h, v;
{
    PenNormal();                        /* draw indicator */
    PenMode( patXor );
    MoveTo( h - 27, v );
    Line( 6, 0 );
    PenNormal();
}

DrawKnots( env )
register EnvelopePtr    env;
{
    short   i;
    Point   pt;
    Rect    r;

for (i=0;i<env->nKnots;i++) {
        pt = *(*env->knots + i);
        PenSize( 2, 2 );
        if (i)
            LineTo( pt.h, pt.v );
        else
            MoveTo( pt.h, pt.v );

PenSize( 3, 3 );
        SetRect( &r, -2, -2, 4, 4 );
        OffsetRect( &r, pt.h, pt.v );
        FrameRect( &r );
```

```
      }
} pascal void DrawEnvelope( dlg, item )
DialogPtr     dlg;
short         item;
{
    short             kind;
    Handle            h;
    Rect              r;
    BitMap            bm;
    Effect            *efx;
    EnvelopePtr       env;
    register short    half;
    char              str[32];

efx = (Effect *)GetWRefCon( dlg );
    env = (EnvelopePtr)*efx->h;

PenNormal();
    GetDItem( dlg, item, &kind, &h, &r );
    bm.bounds = r;
    InsetRect( &bm.bounds, 4, 4 );
    FrameRect( &r );
    InsetRect( &r, 1, 1 );
    PenMode( srcBic );
    PenSize( 3, 3 );
    FrameRect( &r );
    PenNormal();

HLock( env->off );
    bm.rowBytes = ((bm.bounds.right - bm.bounds.left + 15) >> 4) << 1;
    bm.baseAddr = *env->off;
    CopyBits( &bm, &dlg->portBits, &bm.bounds, &bm.bounds, srcCopy, NIL );
    HUnlock( env->off );

DrawKnots( env );

PenNormal();
    TextFont( 1 );
    TextSize( 9 );
    GetDItem( dlg, 11, &kind, &h, &r );
    FrameRect( &r );
    InsetRect( &r, 1, 1 );
    EraseRect( &r );
    InsetRect( &r, -1, 3 );

half = (r.bottom+r.top) / 2;

MoveTo( r.right-6, r.top );
    Line( 5, 0 );
    MoveTo( r.right-4, r.top + (r.bottom-r.top) / 8 );
    Line( 3, 0 );
    MoveTo( r.right-6, r.top + (r.bottom-r.top) / 4 );
    Line( 5, 0 );
    MoveTo( r.right-4, half - (r.bottom-r.top) / 8 );
    Line( 3, 0 );
    MoveTo( r.right-6, half );
    Line( 5, 0 );

NumToString( env->range, &str[0] );
    MoveTo( r.right-7, r.top + 5 );
    Move( -StringWidth( &str[0] ), 0 );
    DrawString( &str[0]);

MoveTo( r.right-7, half + 4 );
    Move( -CharWidth( '0' ), 0 );
    DrawChar( '0' );

TextFont( 0 );
    TextSize( 0 );
}
```

Bender.c

```
/*
    Bender sound effect

Modification History:
    --------------------

<JS 12/14/87>  exit right away if no selection (also fixes divide by zero).
    <SC 07/20/88>  Inset knot deletion rect by (-1000, -4) instead of (-4, -4)
                   so that knots are deleted only by draging vertically off
                   wave, not by dragging horizontally off wave. This also
                   allows end knots to track with mouse off to left or right
                   of wave.
```

```
*/ include "AudioDefs"                                                            /* <SMR 07/19/88> */
__GetA4( void );                                                                /* <SMR 07/19/88> */
#include "SetUpA4.h"

define waveItem 3 typedef struct {
    Handle      off;          /* offscreen bitmap */
    Point       **knots;      /* Handle of points */
    short       nKnots;       /* Number of knots */
    short       range;        /* multiplier */
} Envelope, *EnvelopePtr, **EnvelopeHandle;

pascal short    main( GWindPeek, short, long, long, EventRecord *, Effect * );

long            ApplyEnvelope( GWindPeek, short, EnvelopePtr, long, long, short, Handle );
Handle          BuildEnvelope( DialogPtr, GWindPeek );
                DragKnot( DialogPtr, EnvelopePtr, short, short );
                DragKnotInd( short, short );
pascal void     DrawEnvelope( DialogPtr, short );
                DrawKnots( EnvelopePtr );

pascal short main( w, opcode, op1, op2, evt, efx )
register GWindPeek  w;
short               opcode;
long                op1, op2;
EventRecord         *evt;
Effect              *efx;
{
    short               x;
    register DialogPtr  dlg;
    short               item, kind, result;
    Handle              h;
    Rect                r, frame, drag;
    Point               pt, knot, knot2;
    short               i;
    register EnvelopePtr env;
    Handle              buffer;
    long                len;

RememberA0();
    SetUpA4();

if ( op2 <= op1 ) {
        RestoreA4();                                                            /* <SMR 07/19/88> */
        return (FALSE);      /* JS */
    } result = False;

switch (opcode) {
        case opDoIt: {                         /* op1, op2 are left & right of selection */
            dlg = GetDialog( efx->id*10 );
            SetWRefCon( dlg, (long)efx );      /* salt owner away */
            SetPort( dlg );

GetDItem( dlg, waveItem, &kind, &h, &frame );
            SetDItem( dlg, waveItem, kind, &DrawEnvelope, &frame );
            drag = frame;
            InsetRect( &drag, 4, 4 );

if (!efx->h) {
                efx->h = NewHandle( sizeof(Envelope) );
                r = drag;
                r.top = (r.top+r.bottom) >> 1;    /* build a flat curve */
                r.bottom = r.top;

PtrToHand( &r, &h, 8 );

env = (EnvelopePtr)*efx->h;
                env->nKnots = 2;
                env->knots = (Point **)h;
                env->range = 1;                   /* one octave */
            }
            HLock( efx->h );

env = (EnvelopePtr)*efx->h;
            env->off = BuildEnvelope( dlg, w );

ToggleCtlItem( dlg, env->range+3 );   /* set up range stuff */
```

```
            while (True) {
                ModalDialog( NIL, &item );        /* Ask the user for parameters */ if (item <= 2) break;
                else if (item == waveItem) {
                    GetMouse( &pt );

for (i=0;i<env->nKnots;i++) {
                        knot = *(*env->knots + i);
                        SetRect( &r, -3, -3, 4, 4 );
                        OffsetRect( &r, knot.h, knot.v );
                        if (PtInRect( pt, &r )) {
                            DragKnot( dlg, env, i, True );
                            break;
                        }
                    }
                    knot = *(*env->knots);
                    for (i=1;i<env->nKnots;i++) {
                        knot2 = *(*env->knots + i);
                        if (HitLine( knot, knot2, pt )) {
                            DragKnot( dlg, env, i-1, False );
                            break;
                        }
                        knot = knot2;
                    }
                }
                else if (item == 6) {
                    DragKnot( dlg, env, i, False );
                }
                else {
                    ToggleCtlItem( dlg, env->range+3 );
                    ToggleCtlItem( dlg, item );
                    env->range = item-3;

/* redraw scale */
                    GetDItem( dlg, 7, &kind, &h, &r );
                    r.bottom = r.top + 12;
                    InsetRect( &r, 1, 1 );
                    InvalRect( & r );
                    GetDItem( dlg, 7, &kind, &h, &r );
                    r.top = r.bottom - 12;
                    InsetRect( &r, 1, 1 );
                    InvalRect( & r );
                }
            }
            DisposDialog( dlg );
            UpdateWindows();
            DisposHandle( env->off );

if (item == 1) {
                WatchCursor();
                len = ApplyEnvelope( w, drag.right - drag.left, env, op1, op2, False, NIL );

if (CheckMemory( len, 17 )) {
                    buffer = NewHandle( len );        /* allocated specified amt of temp buffer */
                    if (result = UndoPrep( w, 6, op1, op2, False )) {
                        WatchCursor();
                        ApplyEnvelope( w, drag.right - drag.left, env, op1, op2, True, buffer );
                    }
                    DisposHandle( buffer );
                }
            }
        }
    }

HUnlock( efx->h );

RestoreA4();                                                      /* <SMR 07/19/88> */
    return(result);
} long ApplyEnvelope( w, width, env, start, end, forReal, tempBuf )
GWindPeek       w;
short           width;
EnvelopePtr     env;
long            start, end;
short           forReal;
Handle          tempBuf;
{
    short           i, horz, x;
    Point           pt1, pt2, *pKnot;
    register unsigned char  *lp;
    unsigned char   *beginP, *endP, *newP;
    long            cntDelta, useDelta, delta;
    Fixed           inc, deltaInc, useInc;
    Fixed           offset;
```

```
long            insert;
long            master;
long            len, useEnd;

master = 0;
for (i=w->chanFirst;i<=w->chanLast;i++) {          /* do it for both tracks if there */ len = GetHandleSize(w->data[i]);               /* JS: check for selection past end */
    if (start >= len) continue;

useEnd = end;
    if (useEnd > len) useEnd = len;
    delta = (((long)width) << 16) / (useEnd - start);

pKnot = *env->knots;
    pt1 = *pKnot++;
    pt2 = *pKnot++;
    while (pt2.h == pt1.h) pt2 = *pKnot++;

inc = (((long)(64 + 10) - pt1.v)) << 16;
    deltaInc = (((long)(pt1.v - pt2.v)) << 16) / (pt2.h - pt1.h);

cntDelta = 0;
    horz = pt1.h;

offset = 0;

beginP = (unsigned char *)*w->data[i] + start;
    endP = (unsigned char *)*w->data[i] + useEnd;

lp = beginP;
    newP = 0;
    insert = 0;
    if (forReal) newP = (unsigned char *)*tempBuf;

while (True) {
        useInc = GetLog( (env->range * inc) >> 16 );
        useDelta = FixMul( delta, useInc );

cntDelta &= 0x0000FFFF;
        while ((cntDelta < 0x00010000) && (lp < endP)) {
            asm {
                MOVE.L    offset(A6),D0
                ADD.L     useInc(A6),D0
                SWAP      D0
                ADD       D0,lp
                CLR       D0
                SWAP      D0
                MOVE.L    D0,offset(A6)

TST       forReal(A6)
                BEQ.S     @1

ASR.L     #1,D0

MOVEQ     #0,D1
                MOVE.B    1(lp),D1
                MULU      D0,D1         ; times fraction MOVEQ     #0,D2
                MOVE.B    (lp),D2       ; get this half's value SUB.L     #0x00008000,D0
                NEG.L     D0
                MULU      D0,D2         ; times 10000-fraction
                ADD.L     D1,D2
                LSL.L     #1,D2
                SWAP      D2            ; percentage of left sample MOVE.L    newP,A1       ; get dest
                MOVE.B    D2,(A1)
            @1
                ADDQ.L    #1,newP(A6)   ; one new byte
                ADDQ.L    #1,insert(A6) ; count one new byte

} cntDelta += useDelta;
        } if (lp >= endP) {
            if (insert > master) master = insert;
            if (forReal) {
                HLock( tempBuf );
                SafeReplace( w->data[i], start, useEnd-start, *tempBuf, insert );
                HUnlock( tempBuf );
```

```
                    }
                    break;
                } inc += deltaInc;
                if (horz++ > pt2.h) {
                    pt1 = pt2;
                    pt2 = *pKnot++;
                    while (pt2.h == pt1.h) pt2 = *pKnot++;

inc = (((long)(64 + 10) - pt1.v)) << 16;
                    deltaInc = (((long)(pt1.v - pt2.v)) << 16) / (pt2.h - pt1.h);
                }
            } /* for each byte */

} /* for each channel */ if (forReal) {
            UndoInsert( start, master );
            SetSelection( w, start, start + master, w->chanFirst, w->chanLast );
        } return(master);            /* return buffer needed */
    }

Handle BuildEnvelope( dlg, w )
DialogPtr          dlg;
register GWindPeek w;
{
    short      rowBytes;
    short      kind;
    Rect       frame;
    Handle     h;
    Handle     off;
    long       left, cnt, delta;
    char       *p, mask;
    short      i,j;
    long       skip;

GetDItem( dlg, waveItem, &kind, &h, &frame );
    InsetRect( &frame, 4, 4 );

left = w->reports[repSelBeg];
    cnt = w->reports[repSelEnd] - left;
    if (!cnt) {
        left = 0;
        cnt = w->reports[repLength];
    } skip = 1;
    delta = (((long)(frame.right - frame.left)) << 16) / cnt;
    while (True) {
        if (delta*skip > 0x00000400) break;
        skip <<= 1;
    } rowBytes = ((frame.right - frame.left + 16) >> 4) << 1;
    off = ZeroHandle( rowBytes * (long)(frame.bottom - frame.top + 3) );
    HLock( off );

PlotPixels( w->data[w->chanFirst], left, w->info[compress], False, skip,
                0, frame.right - frame.left, delta*skip, 1, *off+2*rowBytes, rowBytes );

if (w->chanFirst != w->chanLast)
        PlotPixels( w->data[w->chanLast], left, w->info[compress], False, skip,
                0, frame.right - frame.left, delta*skip, 1, *off+2*rowBytes, rowBytes );

mask = 0xAA;                            /* grey out the waveform */
    p = *off;
    for (i=frame.top; i<frame.bottom;i++) {
        for (j=0;j<rowBytes;j++) *p++ &= mask;
        mask ^= 0xFF;
    }

HUnlock( off );
    return( off );
}

DragKnot( dlg, env, knot, inside )
DialogPtr           dlg;
register EnvelopePtr env;
short               knot;
short               inside;
{
    Point   pt, *p;
    short   kind;
```

```
    Handle  item;
    Rect    drag, outer, bounds;
    short   draggeur;

GetDItem( dlg, waveItem, &kind, &item, &outer );
    drag = outer;
    InsetRect( &outer, -1000, -4 );      /* rect for deleting  */ /* <SC 07/20/88> */
    InsetRect( &drag, 4, 4 );            /* rect for pinning   */
    drag.bottom = drag.top + 128;        /* only top half      */
    bounds = drag;
    InsetRect( &bounds, 0, -3 );         /* rect for clipping  */ draggeur = 0;                        /* no indicator       */ while (StillDown()) {
        GetMouse( &pt );

if (PtInRect( pt, &outer )) {
            if (!inside) {
                p = *env->knots;
                *((long *)&pt) = PinRect( &drag, pt );
                for (knot=0;knot<env->nKnots-1;knot++) if (p++->h > pt.h ) break;
                Munger( env->knots, knot*4, (Ptr)1, 0, &pt, 4 );
                env->nKnots++;
            }
            inside = True;

p = *env->knots + knot;
            if (knot > 0) {
                bounds.left = (p-1)->h + 2;
                if (knot < env->nKnots-1)
                    bounds.right = (p+1)->h - 2;
                else
                    bounds.left = bounds.right = drag.right;
            }
            else {
                bounds.left = bounds.right = drag.left;
            }

*((long *)&pt) = PinRect( &drag, pt );
            if (pt.h < bounds.left) pt.h = bounds.left;
            if (pt.h > bounds.right) pt.h = bounds.right;

if (!EqualPt( *p, pt)) {
                if (knot == 0) {            /* setup clip */
                    bounds.left = drag.left;
                    bounds.right = (p+1)->h;
                }
                if (knot == env->nKnots-1) {
                    bounds.left = (p-1)->h;
                    bounds.right = drag.right;
                }
                InsetRect( &bounds, -3, 0 );

if (draggeur) DragKnotInd( drag.left, draggeur );/* draw indicator */
                draggeur = pt.v;
                DragKnotInd( drag.left, draggeur );

*p = pt;

ClipRect( &bounds );        /* draw wave */
                DrawEnvelope( dlg, waveItem );
                ClipRect( &dlg->portRect );
            }
        }
        else {
            if (draggeur) DragKnotInd( drag.left, draggeur );
            draggeur = 0;

if ((inside) && (knot > 0) && (knot < env->nKnots-1)) {
                Munger( env->knots, knot*4, NIL, 4, (Ptr)1, 0);
                env->nKnots--;
                DrawEnvelope( dlg, waveItem );
                inside = False;
            }
        }
    }
    if (draggeur) DragKnotInd( drag.left, draggeur );
}

DragKnotInd( h, v )
short  h, v;
{
    PenNormal();                    /* draw indicator */
    PenMode( patXor );
    MoveTo( h - 27, v );
    Line( 6, 0 );
    PenNormal();
}
```

```
DrawKnots( env )
register EnvelopePtr   env;
{
    short   i;
    Point   pt;
    Rect    r;

for (i=0;i<env->nKnots;i++) {
        pt = *(*env->knots + i);
        PenSize( 2, 2 );
        if (i)
            LineTo( pt.h, pt.v );
        else
            MoveTo( pt.h, pt.v );

PenSize( 3, 3 );
        SetRect( &r, -2, -2, 4, 4 );
        OffsetRect( &r, pt.h, pt.v );
        FrameRect( &r );
    }
} pascal void DrawEnvelope( dlg, item )
DialogPtr   dlg;
short       item;
{
    short           kind;
    Handle          h;
    Rect            r;
    BitMap          bm;
    Effect          *efx;
    EnvelopePtr     env;
    register short  half;
    char            str[32];

efx = (Effect *)GetWRefCon( dlg );
    env = (EnvelopePtr)*efx->h;

PenNormal();
    GetDItem( dlg, item, &kind, &h, &r );
    bm.bounds = r;
    InsetRect( &bm.bounds, 4, 4 );
    FrameRect( &r );
    InsetRect( &r, 1, 1 );
    PenMode( srcBic );
    PenSize( 3, 3 );
    FrameRect( &r );
    PenNormal();

HLock( env->off );
    bm.rowBytes = ((bm.bounds.right - bm.bounds.left + 15) >> 4) << 1;
    bm.baseAddr = *env->off;
    CopyBits( &bm, &dlg->portBits, &bm.bounds, &bm.bounds, srcCopy, NIL );
    HUnlock( env->off );

DrawKnots( env );

PenNormal();
    TextFont( 1 );
    TextSize( 9 );
    GetDItem( dlg, 7, &kind, &h, &r );
    FrameRect( &r );
    InsetRect( &r, 1, 1 );
    EraseRect( &r );
    InsetRect( &r, -1, 3 );

half = (r.bottom+r.top) / 2/* -1*/;

MoveTo( r.right-6, r.top );
    Line( 5, 0 );
    MoveTo( r.right-4, r.top + (r.bottom-r.top) / 8 );
    Line( 3, 0 );
    MoveTo( r.right-6, r.top + (r.bottom-r.top) / 4 );
    Line( 5, 0 );
    MoveTo( r.right-4, half - (r.bottom-r.top) / 8 );
    Line( 3, 0 );
    MoveTo( r.right-6, half );
    Line( 5, 0 );
    MoveTo( r.right-4, half + (r.bottom-r.top) / 8 );
    Line( 3, 0 );
    MoveTo( r.right-6, r.bottom - (r.bottom-r.top) / 4 );
    Line( 5, 0 );
    MoveTo( r.right-4, r.bottom - (r.bottom-r.top) / 8 );
    Line( 3, 0 );
    MoveTo( r.right-6, r.bottom );
    Line( 5, 0 );
```

```
    NumToString( env->range, &str[0] );
    MoveTo( r.right-7, r.top + 5 );
    Move( -StringWidth( &str[0] ), 0 );
    DrawString( &str[0]);

MoveTo( r.right-7, half + 4 );
    Move( -CharWidth( '0' ), 0 );
    DrawChar( '0' );

NumToString( -env->range, &str[0] );
    MoveTo( r.right-7, r.bottom+2 );
    Move( -StringWidth( &str[0] ), 0 );
    DrawString( &str[0]);

TextFont( 0 );
    TextSize( 0 );
}
                                MiscTools.c
/*
    MiscTools.c
    ©1987 Steve Capps Modification History:
    ---------------------

<JS  12/06/87>  Put handle in A0 before HGetState in SafeLock.
    <JS  12/10/87>  Remove trailing zeroes in FixedToString.

-------------------------------------------------------------------------

<SC  02/05/88>  Fix sloppy code in OpenResFileV which was catching a spurious nonzero
                    ResError from Andy's GetResource patch in the Radius Accelerator ROM.
    <SC  05/15/88>  handle negative numbers in FixedToString.
    <JS  06/01/88>  Don't let file/dir search fall into PMSP.
    <JS  06/02/88>  Use FSFCBLen instead of ROM85 to test for HFS.
    <SMR 06/22/88>  Handle color dialogs in GetDialog.
    <SMR 06/24/88>  correct color grafport checks; improved CheapCompare; make sure there's
                    a frontmost window before deactivating it in GetDialog.
    <SMR 09/27/88>  Check for overflow from StringToFixed before pinning num in StringToFixedX.
    <SMR 09/28/88>  Don't round numbers larger than 0x7FFFFFFC in FixedToString because
                    the rounding overflows and the number becomes negative.
    <SMR 10/01/88>  Added IO error string for accessDenied (access privilege error) in
                    IOAlert.
    <SMR 10/05/88>  Cast 0x7FFFFFFC to a long int before comparing it to num in
                    FixedToString (otherwise num will be converted to an unsigned long
                    int and the comparison will fail for negative values).

*/
#include <MacHeaders>
#include "Color.h"
#include "MiscDefs.c"
#include "FixedFract.h"         /* JS - 12/15/87 */

/* exported by users of this package */ extern          UpdateWindows( void );

extern short    errorBase;      /* index of first IO error string in STR# 100 */
extern short    rangeBase;      /* index of first range error string in STR# 100 */
extern char     decimalPoint;   /* decimal point character */
extern char     minusSign;      /* minus sign character */

/* private stuff */ short           AlertGuts( char *, short, short );

short   Abs( x )
short   x;
{
    if (x > 0) return(x);
    return(-x);
}

/* does a cheap distance calc between two points */
short   ABSPoint( pt1, pt2 )
Point   pt1, pt2;
{
    asm {
        MOVEM   pt1(A6),D0-D1   ; get first point into D1 D0
        SUB.W   pt2(A6),D0      ; get delta V
        BPL.S   @0
        NEG     D0
```

```
@0
        SUB.W       pt2+2(A6),D1        ; get delta H
        BPL.S       @1
        NEG         D1
@1
        CMP         D1,D0               ; is dv > dh
        BGT.S       @2
        EXG         D1,D0               ; flip the two
@2
        ASR         #1,D1               ; shift the lesser of the two ADD         D1, D0              ; get total -- sqrt
    }
}

/* adds character to end of str */
AddChar( str, c )
char *str, c;
{
    *(str + (++(*str)) ) = c;
}

/* concatenates right to left string */
AddStr ( strLeft, strRight )
char    *strLeft, *strRight;
{
    register short x;

x = *strRight++;
    BlockMove( strRight, strLeft+*strLeft+1, x );
    *strLeft += x;
}

/* used by IOAlert, ErrorAlert, et al. */
short AlertGuts( str, strID, id )
char    *str;
short   strID;
short   id;
{
    char    holder[256];
    short   x;

InitCursor();

if (strID) GetIndString( &holder[0], 100, strID );

if (holder[1] != '*' ) {
        ParamText( &holder[0], str, 0, 0 );

x = AlertX( id );
        UpdateWindows();
        return( x );
    }
    else {
        return (0x01);
    }
}

/* Cover of alert which centers alert on screen */
AlertX( id )
short   id;
{
    Rect    **h, save;
    short   item;

h = (Rect **)GetResource( 'ALRT', id );
    save = **h;
    OffsetRect( *h, (screenBits.bounds.right - save.right - save.left) / 2, 0 );

item = Alert( id, NIL );

**h = save;
    return( item );
}

/* Draws the picture id at given location of current port */
BlastPic( id, h, v )
short   id,h,v;
{
    register PicHandle  pict;
    Rect                r;
    short               locked;
    pict = GetPicture(id);
    if (pict) {
```

```c
        HNoPurge( pict );
        r = (*pict)->picFrame;
        OffsetRect( &r, h-r.left, v-r.top );
        DrawPicture( pict, &r );
        HPurge( pict );
    }
}

/* cheap, simple version of textBox */
BoxString( str, h, v, just )
char    *str;
short   h;
short   v;
short   just;
{
    register short  w;
    Rect            r;
    FontInfo        inf;

GetFontInfo( &inf );

w = StringWidth( str );
    SetRect( &r, 0, 0, w, inf.ascent+inf.descent );

if (just == teJustLeft) w = 0;
    else if (just == teJustCenter) w >>= 1;

OffsetRect( &r, h-w, v );
    EraseRect( &r );
    MoveTo( r.left, v+inf.ascent );
    DrawString( str );
}

/* Not INTL compare à la StdFile */
short CheapCompare( a, b )
    register char   *a;
    register char   *b;
{
    register short  i, j;
    short           aLen, bLen;
    register char   c1, c2;
    static char     uCase[256] = { 0x00, 0x01, 0x02, 0x03, 0x04, 0x05, 0x06, 0x07, 0x08, 0x09, 0x0A, 0x0B, 0x0C, 0x0D, 0x0E,
                    0x10, 0x11, 0x12, 0x13, 0x14, 0x15, 0x16, 0x17, 0x18, 0x19, 0x1A, 0x1B, 0x1C, 0x1D, 0x1E, 0x1F,
                    0x20, 0x21, 0x22, 0x23, 0x24, 0x25, 0x26, 0x27, 0x28, 0x29, 0x2A, 0x2B, 0x2C, 0x2D, 0x2E, 0x2F,
                    0x30, 0x31, 0x32, 0x33, 0x34, 0x35, 0x36, 0x37, 0x38, 0x39, 0x3A, 0x3B, 0x3C, 0x3D, 0x3E, 0x3F,
                    0x40, 0x41, 0x42, 0x43, 0x44, 0x45, 0x46, 0x47, 0x48, 0x49, 0x4A, 0x4B, 0x4C, 0x4D, 0x4E, 0x4F,
                    0x50, 0x51, 0x52, 0x53, 0x54, 0x55, 0x56, 0x57, 0x58, 0x59, 0x5A, 0x5B, 0x5C, 0x5D, 0x5E, 0x5F,
                    0x60, 0x41, 0x42, 0x43, 0x44, 0x45, 0x46, 0x47, 0x48, 0x49, 0x4A, 0x4B, 0x4C, 0x4D, 0x4E, 0x4F,
                    0x50, 0x51, 0x52, 0x53, 0x54, 0x55, 0x56, 0x57, 0x58, 0x59, 0x5A, 0x7B, 0x7C, 0x7D, 0x7E, 0x7F,
                    0x80, 0x81, 0x82, 0x83, 0x84, 0x85, 0x86, 0x87, 0x88, 0x89, 0x8A, 0x8B, 0x8C, 0x8D, 0x8E, 0x8F,
                    0x90, 0x91, 0x92, 0x93, 0x94, 0x95, 0x96, 0x97, 0x98, 0x99, 0x9A, 0x9B, 0x9C, 0x9D, 0x9E, 0x9F,
                    0xA0, 0xA1, 0xA2, 0xA3, 0xA4, 0xA5, 0xA6, 0xA7, 0xA8, 0xA9, 0xAA, 0xAB, 0xAC, 0xAD, 0xAE, 0xAF,
                    0xB0, 0xB1, 0xB2, 0xB3, 0xB4, 0xB5, 0xB6, 0xB7, 0xB8, 0xB9, 0xBA, 0xBB, 0xBC, 0xBD, 0xBE, 0xBF,
                    0xC0, 0xC1, 0xC2, 0xC3, 0xC4, 0xC5, 0xC6, 0xC7, 0xC8, 0xC9, 0xCA, 0xCB, 0xCC, 0xCD, 0xCE, 0xCF,
                    0xD0, 0xD1, 0xD2, 0xD3, 0xD4, 0xD5, 0xD6, 0xD7, 0xD8, 0xD9, 0xDA, 0xDB, 0xDC, 0xDD, 0xDE, 0xDF,
                    0xE0, 0xE1, 0xE2, 0xE3, 0xE4, 0xE5, 0xE6, 0xE7, 0xE8, 0xE9, 0xEA, 0xEB, 0xEC, 0xED, 0xEE, 0xEF,
                    0xF0, 0xF1, 0xF2, 0xF3, 0xF4, 0xF5, 0xF6, 0xF7, 0xF8, 0xF9, 0xFA, 0xFB, 0xFC, 0xFD, 0xFE, 0xFF };

i = 0;
    aLen = *a++;
    bLen = *b++;
    j = (aLen < bLen) ? aLen : bLen;
    while ( i < j ) {
        c1 = uCase[*a++];
        c2 = uCase[*b++];
        if (c1 < c2) return(-1);
        if (c1 > c2) return(1);
        i++;
    }
    if (aLen < bLen) return(-1);
    if (aLen > bLen) return(1);
    return(0);
}

/* clears given range */
ClearBytes( p, l )
Ptr p;
long    l;
{
    asm {
        MOVE.L  p(A6),A0
        MOVE.L  l(A6),D0

MOVE.L  A0,D1           ; see if odd
        BTST    #0,D1
        BNE.S   @3
```

```
@0
        SUBQ.L   #4,D0          ; do long at a time
        BLE.S    @1
        CLR.L    (A0)+
        BRA.S    @0
@1
        ADDQ     #3,D0          ; residue
@2
        CLR.B    (A0)+
@3
        DBRA     D0,@2
    }
}

/* Zeroes out contents of handle */
ClearHandle( h )
Handle  h;
{
    ClearBytes( *h, GetHandleSize( h ) );
}

/* does a 2way alert with OK/cancel */
short ConfirmAlert( str, strID )
char    *str;
short   strID;
{
    return( AlertGuts( str, strID, 100 ) == 1);
}

/* does a 3 way alert w/Yes,No and cancel */
short Confirm3Alert( str, strID )
char    *str;
short   strID;
{
    return( AlertGuts( str, strID, 101 ) );
} short CoolDigit( c )
char    c;
{
    if (c == decimalPoint) return(True);
    if (c == minusSign) return(True);
    return ((c >= '0') && (c <= '9') );
}

/* deletes n chars at off from str, if off is negative, starts at right */
DeleteChars( str, off, n )
register char * str;
register short  off;
register short  n;
{
    if (off < 0) off += *str + 1;
    if ((off <= *str) && (off > 0)) {
        BlockMove( str+off+n, str+off, *str - (off + n) + 1 );
        (*str)-=n;
    }
}

/* given h and v, it derives the nearest byte address from thePort of that screen location*/

Ptr DeriveAddress( h, v )
short   h, v;
{
    register BitMap    *bm;
    short              depth;

if ((thePort->portBits.rowBytes & 0xC000) == 0xC000) {         /* <SMR 06/24/88> */
        bm = (BitMap *)*(PixMapHandle)thePort->portBits.baseAddr;
        depth = ((PixMapPtr)bm)->pixelSize;
    }
    else {
        bm = &thePort->portBits;
        depth = 1;
    }
    return( bm->baseAddr +
            (v - bm->bounds.top) * (long)(bm->rowBytes & 0x1FFF) +
            (((h-bm->bounds.left) >> 3)) * depth );
}

DumpHandle( h, pb )
register Handle   h;
ParmBlkPtr        pb;
```

```
{
    short    locked;

locked = SafeLock( h );
    DumpPointer( *h, GetHandleSize( h ), pb );
    if (locked) HUnlock( h );
}

DumpPointer( p, l, pb )
Ptr         p;
long        l;
ParmBlkPtr  pb;
{
    short    x;

pb->ioParam.ioBuffer = p;
    pb->ioParam.ioReqCount = l;
    pb->ioParam.ioPosMode = 0;
    x = PBWrite( pb, 0 );
}

/* returns true if passed vRefNum is ejectable or not */
short Ejectable( vRefNum )
short   vRefNum;
{
    register Ptr    dqe;

dqe = (Ptr)GetDQE( GetDriveNum( vRefNum) );
    if (dqe) {
        if (*(dqe-3) < 8) return(True);        /* strange DQDip field */
    }
    return(False);
}

/* Enables/disables a dialog control item */
EnableCtlItem( dlg, item, enable )
DialogPtr   dlg;
short       item;
short       enable;
{
    Rect            r;
    ControlHandle   h;

enable = enable ? 0 : 255;
    GetDItem( dlg, item, &r, &h, &r );
    if ((*h)->contrlHilite != enable) HiliteControl( h, enable );
}

/* Brings up an alert with a simple OK button */
ErrorAlert( str, strID )
char    *str;
short   strID;
{
    AlertGuts( str, strID, 102 );
}

/* extracts length bytes at offset from h and puts into new at offset */
/* if newOff < 0 it assumes newOff = GetHandleSize( new) which means concatenate */
/* Note, this requires < 50 bytes free in heap (but it'll be slow) */ short ExtractHandle( h, offset, length, new, newOff )
Handle  h;
long    offset;
long    length;
Handle  *new;
long    newOff;
{
    long             x;
    register long    result;
    short            locked;

if (!GetHandleSize(*new)) {
        DisposHandle( *new );
        *new = NewHandle( CompactMem(0x7FFFFFFF) );
        SetHandleSize( *new, 0 );
    }

/* clean up parameters */
    result = GetHandleSize( *new );
    if (newOff > result) newOff = result;
    if (newOff < 0) newOff = result;

result = GetHandleSize( h ) - offset;
    if (result < length) length = result;
```

```
    result = 0;
    while (length > 0) {
        x = CompactMem(0x7FFFFFFF);
        if (x > length) x = length;

locked = SafeLock( h );
        result = MungerX( *new, newOff, NIL, 0, *h + offset, x );
        if (locked) HUnlock( h );
        if (result < 0) break;

if ((result = MungerX( h, offset, NIL, x, (Ptr)1, NIL )) < 0) break;

/* turn on the watch if we didn't make it cleanly */
        if (x < (length >> 2) ) WatchCursor();

length -= x;
        newOff += x;

}
    if (result < 0) return(result);
    return( 0 );
}

/* Fills the given pointer-len pretty quickly */

Filler( p, len, byte )
Ptr     p;
long    len;
char    byte;
{
    asm {
        MOVE.B      byte(A6),D1
        MOVE.L      len(A6),D0
        MOVE.L      p(A6),A0

TST.B       0x012F          ; is there an 020 ?
        BGT.S       @0

BTST        #0,p+3(A6)
        BNE.S       @loop2          ; if odd, we must go byte by byte
    @0
        LSL         #8,D1           ; build up a long
        MOVE.B      byte(A6),D1
        MOVE        D1,A1
        SWAP        D1
        MOVE        A1,D1           ; long of magic byte MOVE.L      len(A6),D0
        LSR.L       #2,D0
        BEQ.S       @almost
    @loop
        MOVE.L      D1,(A0)+
        SUBQ.L      #1,D0
        BNE.S       @loop
    @almost
        MOVEQ       #3,D0
        AND         len+2(A6),D0
        BEQ.S       @done
    @loop2
        MOVE.B      D1,(A0)+
        SUBQ.L      #1,D0
        BNE.S       @loop2
    @done
    }
}

FixedToString( num, str )
    Fixed       num;
    char        *str;
{
    char            temp[16];
    unsigned short  x;
    long            save;                                                   /* <SC  05/15/88>  */
    Fixed           frac;                                                   /* <SC  05/15/88>  */ if(num <= (long)0x7FFFFFFC) /* don't turn large positive into negative */  /* <SMR 10/05/88>  */
        num+=3;                 /* round off to 4 DECIMAL places   */
    x = num;
    save = num;                                 /* handle negative case    */ /* <SC  05/15/88>  */
    num >>= 16;                                                               /* <SC  05/15/88>  */
    NumToString( num, str );                                                  /* <SC  05/15/88>  */ if ( (frac = x*10000L >> 16) != 0 ) {       /* no trailing zeroes */      /* <JS  12/10/87>  */
        if (save < 0) {                         /* handle negative case */    /* <SC  05/15/88>  */
            num++;                                                            /* <SC  05/15/88>  */
```

```c
            if (num)                                              /* <SC  05/15/88> */
                NumToString( num, str );                          /* <SC  05/15/88> */
            else {                                                /* <SC  05/15/88> */
                str[0] = 1;                                       /* <SC  05/15/88> */
                str[1] = '-';                                     /* <SC  05/15/88> */
            }                                                     /* <SC  05/15/88> */
                                                                  /* <SC  05/15/88> */
            frac = 10000 - frac;                                  /* <SC  05/15/88> */
        }                                                         /* <SC  05/15/88> */
        AddChar( str, decimalPoint );

NumToString( frac, temp );                                /* <SC  05/15/88> */
        x = 4 - temp[0];
        while (x--) AddChar(str, '0');
        while (temp[temp[0]] == '0') temp[0]--;
        AddStr( str, temp );
    }
}

/* returns depth of thePort */
Ptr GetBase()
{
    register PixMapPtr  pm;

if ((thePort->portBits.rowBytes & 0xC000) == 0xC000) {
        pm = *(PixMapHandle)thePort->portBits.baseAddr;
        return( pm->baseAddr );
    }
    else
        return( thePort->portBits.baseAddr );
}

/* returns ptr to bounds rect (can be to handle) */
Rect *GetBounds( )
{
    register BitMap     *bm;

if ((thePort->portBits.rowBytes & 0xC000) == 0xC000)          /* <SMR 06/24/88> */
        bm = (BitMap *)*(PixMapHandle)thePort->portBits.baseAddr;
    else
        bm = &thePort->portBits;
    return( &bm->bounds );
}

/* Gets the value of the control item */
short GetCtlItem( dlg, item )
DialogPtr   dlg;
short       item;
{
    Rect            r;
    ControlHandle   h;
    char            text[32];

GetDItem( dlg, item, &r, &h, &r);
    return( GetCtlValue(h) );
}

/* returns depth of thePort */
short GetDepth()
{
    register PixMapPtr  pm;

if ((thePort->portBits.rowBytes & 0xC000) == 0xC000) {        /* <SMR 06/24/88> */
        pm = *(PixMapHandle)thePort->portBits.baseAddr;
        return( pm->pixelSize );
    }
    else
        return( 1 );
}

/* Gets the INVISIBLE dialog, centers it, then shows it */
DialogPtr GetDialog( id )
    short       id;
{
    DialogPtr   dlg;
    GrafPtr     port;                                             /* <SMR 06/23/88> */
    Rect        *br;                                              /* <SMR 06/23/88> */
    short       vGlobal;                                          /* <SMR 06/23/88> */ dlg = GetNewDialog( id, 0L, -1L );
    GetPort( &port );                                             /* <SMR 06/23/88> */
    SetPort( dlg );                                               /* <SMR 06/23/88> */
    br = GetBounds();                                             /* <SMR 06/23/88> */
```

```c
    SetPort( port );                                                            /* <SMR 06/23/88> */
    vGlobal = -br->top;                                                         /* <SMR 06/23/88> */

MoveWindow( dlg,
        (screenBits.bounds.right-(dlg->portRect.right-dlg->portRect.left)) / 2,
        vGlobal, 1 );                                                           /* <SMR 06/23/88> */
    ShowWindow( dlg );

return( dlg );
}

/* Gets drive queue element for passed drive number */
DrvQElPtr GetDQE(drive)
short   drive;
{
    register DrvQElPtr  dqe;

dqe = (DrvQElPtr)DrvQHdr.qHead;
    while (dqe) {
        if (dqe->dQDrive == drive) break;
        dqe = (DrvQElPtr)dqe->qLink;
    }
    return(dqe);
}

/* returns real drive if disk online, -1 if offline or error */
short GetDriveNum( vRefNum )
short   vRefNum;
{
    register VCB    *vcb;

vcb = GetVCB( GetRealVRef( vRefNum ) );
    if (vcb) {
        if (vcb->vcbDrvNum) return(vcb->vcbDrvNum);
        if (vcb->vcbDRefNum < 0) return(-vcb->vcbDRefNum);
    }
    return( -1 );
}

/* Gets the text item from dialog, converts to number and pins it in range */
Fixed GetFixedItem( dlg, item, low, hi )
DialogPtr   dlg;
short       item;
Fixed       low, hi;
{
    Rect        r;
    Handle      h;
    char        text[256];

GetDItem( dlg, item, &r, &h, &r);
    GetIText( h, text);
    return (StringToFixedX( text, low, hi ) );
}

/* Like GetIndString, but for REC# rect lists */
GetIndRect( r, id, n )
register Rect   *r;
short           id;
short           n;
{
    Handle          h;
    register Rect   *p;

r->top = 0;
    r->left = 0;
    r->bottom = 0;
    r->right = 0;

h = GetResource( 'REC#', id );
    p = (Rect *) (*h);
    if ((h) && (n <= *((short *)p)) ) {
        p = (Rect *)(((char *)p)+2);
        *r = *(p+n-1);
    }
}

/* Gets text item from dialog */
Handle GetItemHand( dlg, item )
DialogPtr   dlg;
short       item;
{
    short   kind;
```

```
    Handle  h;
    Rect    r;

GetDItem( dlg, item, &kind, &h, &r );
    return( h );
}

/* Gets text item from dialog */
GetItemRect( dlg, item, r )
DialogPtr   dlg;
short       item;
Rect        *r;
{
    short   kind;
    Handle  h;

GetDItem( dlg, item, &kind, &h, r );
}

/* Gets the text item from dialog, converts to number and pins it in range */
long GetNumItem( dlg, item, low, hi )
DialogPtr   dlg;
short       item;
long        low, hi;
{
    Rect        r;
    Handle      h;
    char        text[256];

GetDItem( dlg, item, &r, &h, &r );
    GetIText( h, text );
    return( StringToNumX( text, low, hi ) );
}

/* Returns real vRefNum from WDRefNum, etc. (Can't accept drive numbers) */
short GetRealVRef(vRefNum)
short   vRefNum;
{
    WDPBRec         wd;

if (vRefNum < 0) {
        if ((vRefNum < 0x8FFF) && (FSFCBLen > 0)) {
            wd.ioNamePtr = 0;
            wd.ioVRefNum = vRefNum;
            wd.ioWDDirID = 0;
            PBGetWDInfo(&wd, False);
            return( wd.ioWDVRefNum );
        }
        return( vRefNum );
    }
    return(-1);

}

/* returns rowBytes of thePort */
short GetRowBytes()
{
    register BitMap  *bm;

if ((thePort->portBits.rowBytes & 0xC000) == 0xC000)       /* <SMR 06/24/88> */
        bm = (BitMap *)*(PixMapHandle)thePort->portBits.baseAddr;
    else
        bm = &thePort->portBits;
    return( bm->rowBytes & 0x1FFF );
}

/* Gets text item from dialog */
GetTextItem( dlg, item, str )
DialogPtr   dlg;
short       item;
char        *str;
{
    Rect            r;
    ControlHandle   h;

GetDItem( dlg, item, &r, &h, &r );
    GetIText( h, str );
}

/* get vcb queue element for passed vRefNum or WDRefNum */
VCB *GetVCB(vRefNum)
short   vRefNum;
{
    register VCB    *vcb;
```

```
    vcb = (VCB *)VCBQHdr.qHead;
    while (vcb) {
        if (vcb->vcbVRefNum == vRefNum) break;
        vcb = (VCB *)vcb->qLink;
    }
    return(vcb);
} short HitLine( pt1, pt2, test )
Point   pt1, pt2, test;
{
    #define selectGrav 5 short           try;
    register short  dv, dh;

dv = pt2.v - pt1.v;
    dh = pt2.h - pt1.h;
    if (Abs(dv) > Abs(dh)) {
        if ( ((test.v >= pt1.v-selectGrav) && (test.v <= pt2.v+selectGrav)) ||
             ((test.v <= pt1.v+selectGrav) && (test.v >= pt2.v-selectGrav)) )
        {
            try = pt1.h + HiWord( (test.v - pt1.v) * FixRatio( dh, dv ) );
            if (Abs(try-test.h) < selectGrav) return(True);
        }
    }
    else {
        if ( ((test.h >= pt1.h-selectGrav) && (test.h <= pt2.h+selectGrav)) ||
             ((test.h <= pt1.h+selectGrav) && (test.h >= pt2.h-selectGrav)) )
        {
            try = pt1.v + HiWord( (test.h - pt1.h) * FixRatio( dv, dh ) );
            if (Abs(try-test.v) < selectGrav) return(True);
        }
    }
    return(False);
}

/* cover of HomeResFile which fixes anomoly with system (0 vs. 2) */
short HomeResFileX( h )
Handle h;
{
    register short  x;

x = HomeResFile( h );
    if (!x) x = SysMap;
    return( x );
}

/* fill the handle h at offset off with len bytes of byte.  If off = -1 add to end */
short InsertFill( h, off, len, byte )
Handle  h;
long    off;
long    len;
char    byte;
{
    long    x;

x = GetHandleSize( h );
    if ((off < 0) || (off > x)) off = x;

x = SafeReplace( h, off, 0, (Ptr)1, len );      /* insert len bytes of garbage */ if (x < 0) return( x );
    Filler( *h + off, len, byte );
    return( 0 );
}

/* if error != 0, brings up a mildly intelligable alert */
IOAlert( str, error )
char    *str;
short   error;
{
    char    num[20];
    num[0] = 0;
    switch (error) {
        case 0: return;
        case dskFulErr: {
            error = 1;
            break;
        }
        case wPrErr: {
            error = 2;
            break;
        }
```

```
        case fLckdErr: {
            error = 3;
            break;
        }
        case dupFNErr: {
            error = 4;
            break;
        }
        case fBsyErr: {
            error = 5;
            break;
        }
        case fnfErr: {
            error = 6;
            break;
        }
        case opWrErr: {
            error = 7;
            break;
        }
        case accessDenied: {
            error = 8;
            break;
        }
        default: {
            NumToString( error, &num[0] );
            ParamText( NIL, NIL, &num[0], NIL );
            error = 0;
            break;
        }
    }
    ErrorAlert( str, error + errorBase );       /* IO errors start at errorBase */
}

/* inserts the character at offset into str, if negative from right */
InsertChar( str, c, off )
register char * str;
char         c;
register short  off;
{
    if (off < 0) off = *str + off + 1;
    if (off > *str) off = *str + 1;

BlockMove( str+off, str+off+1, *str - off + 1 );
    *(str+off) = c;
    (*str)++;
} short max( x, y )
short   x,y;
{
    if (x > y) return(x);
    return(y);
} short MaxPixels()
{
    register short     x;
    register GDHandle  gd;

x = 1;                          /* assume max depth is 1 */

/* is color quickdraw there? */
    if (ROM85 > 0) if (NGetTrapAddress(0x200,ToolTrap) != NGetTrapAddress(0x9F,ToolTrap)) {
        gd = GetDeviceList();
        while (gd) {
            x = max( (*(*gd)->gdPMap)->pixelSize, x );
            gd = GetNextDevice( gd );
        }
    }
    return(x);
} short min( x, y )
short   x,y;
{
    if (x < y) return(x);
    return(y);
} long MungerX( h, offset, p1, len1, p2, len2 )
Handle  h;
long    offset;
Ptr     p1;
```

```
long    len1;
Ptr     p2;
long    len2;
{
    asm {

SUBQ    #4,SP
        MOVE.L  h,-(SP)
        MOVE.L  offset,-(SP)
        MOVE.L  p1,-(SP)
        MOVE.L  len1,-(SP)
        MOVE.L  p2,-(SP)
        MOVE.L  len2,-(SP)
        _Munger
        MOVE.L  (SP)+,D1

TST.L   D0              ; is there an error code ?
        BMI.S   @0
        MOVE.L  D1,D0
    ;   BRA.S   @1
    @0
    ;   DC.W    0xa9ff
    ;@1
    }
} short FileExists( name, vRefNum )
    char        *name;
    short       vRefNum;
{
    FInfo       inf;
    CInfoPBRec  pb;                                                                 /* <JS 06/01/88> */
    short       x;
    char        str[256];                                                           /* <JS 06/01/88> */ if (FSFCBLen > 0) {             /* use proper test for HFS */                   /* <JS 06/02/88> */
        pb.hFileInfo.ioVRefNum = vRefNum;                                           /* <JS 06/01/88> */
        pb.hFileInfo.ioNamePtr = (StringPtr)str;                                    /* <JS 06/01/88> */
        /*pb.ioParam.ioVersNum = 0;*/                                               /* <JS 06/01/88> */
        pb.hFileInfo.ioFDirIndex = -1;  /* get DirID for vRefNum */                 /* <JS 06/01/88> */
        pb.hFileInfo.ioDirID = 0;                                                   /* <JS 06/01/88> */
        x = PBGetCatInfo( &pb, False );                                             /* <JS 06/01/88> */ pb.hFileInfo.ioNamePtr = (StringPtr)name;                                   /* <JS 06/01/88> */
        pb.hFileInfo.ioFDirIndex = 0;                                               /* <JS 06/01/88> */
        x = PBGetCatInfo( &pb, False );
        if (!x && pb.hFileInfo.ioFlAttrib & 0x0010) x = bdNamErr;                   /* <JS 06/01/88> */
    }
    else
        x = GetFInfo( name, vRefNum, &inf );

return( x );
}

/* Returns true if passed vRefNum or WDRefNum is online (returns error on drive #'s( > 0))*/
short Online (vRefNum)
short   vRefNum;
{
    register VCB    *vcb;

if (vRefNum < 0) {
        vcb = GetVCB( GetRealVRef(vRefNum) );
        if (vcb) return( (vcb->vcbDrvNum) || (vcb->vcbDRefNum < 0) );
    }
    return (-1);                        /* return error */
}

/* Expanded open resfile for volumes, optionally creates */
short OpenResFileV( name, vRefNum, createOK )
char    *name;
short   vRefNum;
short   createOK;
{
    short saveVol, ref;

GetVol( 0, &saveVol );
    SetVol( 0, vRefNum );
                                /* Fix sloppy code which caught nonzero */          /* <SC 02/05/88> */
    if (createOK) {             /* ResError left by Andy's GetResource */           /* <SC 02/05/88> */
        CreateResFile( name );  /* patch in the Radius Accelerator ROM */           /* <SC 02/05/88> */
        ref = ResError();                                                           /* <SC 02/05/88> */
    }                                                                               /* <SC 02/05/88> */
    else                                                                            /* <SC 02/05/88> */
        ref = 0;                                                                    /* <SC 02/05/88> */ if (!ref || (ref == dupFNErr) || (ref == opWrErr)) ref = OpenResFile( name );
```

```
    SetVol( 0, saveVol );
    return( ref );
} long PinRectX( r, pt )
Rect    *r;
Point   pt;
{
    asm {
        MOVE    pt(A6),D0
        MOVE    pt+2(A6),D1

MOVE.L  r(A6),A0
        CMP     (A0)+,D0    ; top
        BGE.S   @0
        MOVE    -2(A0),D0
    @0

CMP     (A0)+,D1    ; left
        BGE.S   @1
        MOVE    -2(A0),D1
    @1

CMP     (A0)+,D0    ; bottom
        BLE.S   @2
        MOVE    -2(A0),D0
    @2

CMP     (A0),D1     ; right
        BLE.S   @3
        MOVE    (A0),D1
    @3
        SWAP    D0
        MOVE    D1,D0       ; return point
    }
}

/* Returns random number betwwen 0 and x-1*/
short Rand( x )
short x;
{
    short   y;
    y = Random() % x;
    if (y < 0) y = -y;
    return(y);
}

/* SafeOpenRes opens the given resource file à la OpenResFileV, but w/o preload */
short SafeOpenRes( name, vRefNum, createOK, topRes )
char    *name;
short   vRefNum;
short   createOK;
short   *topRes;
{
    short   res;

*topRes = CurResFile();
    SetResLoad(False);
    res = OpenResFileV( name, vRefNum, createOK );

if (res > 0) UseResFile( res );

SetResLoad(True);
    return( res );
}

/* SafeCloseRes closes resource file opened w/SafeOpenRes and correctly maintains search list */
short SafeCloseRes( res, topRes )
short   res;
short   topRes;
{
    UpdateResFile( res );
    if (res > topRes) CloseResFile( res );
    UseResFile( topRes );
}

/* does a protected munger call in won't delete parts outside handle */
short SafeReplace( h, offset, outLen, in, inLen )
Handle      h;
long        offset;
long        outLen;
Ptr         in;
long        inLen;
{
```

```c
    register long    l;

l = GetHandleSize( h );
    if (offset > l) offset = l;                            /* pin offset */
    if ((offset+outLen) > l) outLen = l - offset;          /* pin cut amt */
    if (in == (Ptr)l) in = (Ptr)GetZone();                 /* safer address */

/*MoveHHi( h );                                        /* cause we're cool */ l = MungerX( h, offset, NIL, outLen, in, inLen );
    if (l < 0) return( l );
    return( 0 );
}

/* locks the handle after moving hi and returns lock state before lock */ short SafeLock( h )
register Handle h;
{
extern MoveHHi();

asm {

MOVE.B      (h),D0          ; assume old rom's

TST         ROM85           ; new rom's ?
        BMI.S       @0
        MOVE.L      h,A0            ;           JS: 12/06/87
        _HGetState
    @0
        TST.B       D0              ; test lock bit
        SMI         -(SP)           ; TRUE if not locked
        ADDQ.B      #1,(SP)         ; return it
        BEQ.S       @1              ; if already locked, can't move anyway
        MOVE.L      h,-(SP)
        JSR         MoveHHi
    @1
        MOVE.L      h,A0
        _HLock                      ; finally lock it

MOVE.B      (SP)+,D0
        EXT         D0
    }
}

RestoreUnder( r, offBits )
Rect    *r;
Handle  offBits;
{
    short           depth;
    BitMap          off;
    PixMapHandle    offPix;

depth = GetDepth();

off.bounds = *r;
    off.rowBytes = ((off.bounds.right - off.bounds.left + 15) >> 4) << 1;

if (depth > 1) {
        offPix = (PixMapHandle)*((long *)*offBits);       /* retrieve pixmap handle here */

(*offPix)->bounds = off.bounds;
        (*offPix)->rowBytes = off.rowBytes;
        (*offPix)->baseAddr = *offBits + 4;

CopyBits( offPix, &thePort->portBits, &off.bounds, &off.bounds, srcCopy, NIL );

DisposPixMap( offPix );
    }
    else {
        off.baseAddr = *offBits;
        CopyBits( &off, &thePort->portBits, &off.bounds, &off.bounds, srcCopy, NIL );
    }

DisposHandle( (Handle)offBits );
}

Handle SaveUnder( r )
Rect    *r;
{
    short           depth;
    BitMap          off;
    Handle          offBits;
    PixMapHandle    offPix;

depth = GetDepth();
```

```
    off.bounds = *r;
    off.rowBytes = ((off.bounds.right - off.bounds.left + 15) >> 4) << 1;
    offBits = NewHandle( 4 + (off.bounds.bottom - off.bounds.top) * ((long)off.rowBytes) * depth);

if (depth > 1) {
        offPix = NewPixMap();
        *((long *)*offBits) = (long)offPix;        /* save pixmap handle here */

(*offPix)->bounds = off.bounds;
        (*offPix)->rowBytes = off.rowBytes;
        (*offPix)->baseAddr = *offBits + 4;

CopyBits( &thePort->portBits, offPix, &off.bounds, &off.bounds, srcCopy, NIL );
        return( offBits );
    }
    else {
        off.baseAddr = *offBits;
        CopyBits( &thePort->portBits, &off, &off.bounds, &off.bounds, srcCopy, NIL );

return( offBits );
    }
}

/*Sets the control item to given num if different(minimizes flashing) */
SetCtlItem( dlg, item, num )
DialogPtr   dlg;
short       item;
short       num;
{
    Rect            r;
    ControlHandle   h;

GetDItem( dlg, item, &r, &h, &r);
    if ((*h)->contrlValue != num) SetCtlValue( h, num );
}

/* sets the text item to ascii version of given num */
SetNumItem( dlg, item, num )
DialogPtr   dlg;
short       item;
long        num;
{
    char    text[32];

NumToString( num, text);
    SetTextItem( dlg, item, text );
}

/* Sets text item if different (minimizes flashing)*/
SetTextItem( dlg, item, str )
DialogPtr   dlg;
short       item;
char        *str;
{
    Rect            r;
    ControlHandle   h;
    char            existing[256];

GetDItem( dlg, item, &r, &h, &r);
    GetIText( h, &existing[0] );
    if (!EqualString( str, &existing[0], False, False )) SetIText( h, str );
}

/* Sets user item proc */
SetUserProc( dlg, item, proc )
DialogPtr   dlg;
short       item;
Ptr         proc;
{
    short           kind;
    Rect            r;
    ControlHandle   h;

GetDItem( dlg, item, &kind, &h, &r);
    SetDItem( dlg, item, kind, proc, &r);
}

/* returns long version of integer as result */ long StringToFixed( str, num )
register char   *str;
Fixed           *num;
{
    register long   top, bot, factor;
```

```
    register short    len;
    char              c;
    long              temp;

top = 0;

len = *str++;
    while (len-- > 0) {
        c = *str++;
        if (c == decimalPoint) break;
        top = top*10 + (c - '0');
        if (top < 0) top = 0x7FFFFFFF;
    } factor = 1;
    bot = 0;
    while ((len-- > 0) && (factor <= 10000)) {
        temp = bot * 10 + (*str++ - '0');
        if (temp >= 0x00008000) break;
        bot = temp;
        factor = factor*10;
    }
    *num = (top << 16) + (bot << 16) / factor;

return (top);
}

Fixed StringToFixedX( str, low, hi )
register char   *str;
Fixed           low, hi;
{
    char      text[32];
    Fixed     num;
    long      overflow;
    short     bad, i;

BlockMove( str, text, 32 );
    if (((unsigned char)text[0]) > 31) text[0] = 31;

bad = 0;
    for (i=1;i<=text[0];i++) {
        if (!CoolDigit( text[i])) {
            bad = 1;
            DeleteChars( text, i, 1 );
            i--;
        }
    }
    overflow = StringToFixed( text, &num );
    if (overflow > 32767) { if (!bad) bad = 2; num = hi; }   /* check this first    */  /* <SMR 09/27/88> */
    if (num < low) { if (!bad) bad = 2; num = low; }
    if (num > hi)  { if (!bad) bad = 2; num = hi; }
    /*if (overflow > 32767) { if (!bad) bad = 2; num = hi; }*/ if (bad) {
        FixedToString( num, text );
        ParamText( NIL, NIL, text, NIL );          /* pass the fixed up one */

ErrorAlert( str, rangeBase + bad - 1 );    /* bad is 1 or 2 */
    } return (num);
}

/* converts string to number and pins it in range */
long StringToNumX( str, low, hi )
char    *str;
long    low, hi;
{
    char     text[32];
    long     num;
    short    bad, i;

BlockMove( str, text, 32 );
    if (((unsigned char)text[0]) > 31) text[0] = 31;
    bad = 0;
    for (i=1;i<=text[0];i++) {
        /* escape on first occurence of period */
        if (text[i] == decimalPoint) {
            text[0] = i-1;
            break;
        }
        if (!CoolDigit(text[i])) {
            bad = 1;
            DeleteChars( text, i, 1 );
            i--;
        }
    }
```

```
    StringToNum( text, &num );
    if (num < low) { if (!bad) bad = 2; num = low;}
    if (num > hi) { if (!bad) bad = 2; num = hi; } if (bad) {
        NumToString( num, text );
        ParamText( NIL, NIL, text, NIL );          /* pass the fixed up one */

ErrorAlert( str, rangeBase + bad - 1 );    /* bad is 1 or 2 */
    } return (num);
} short SuckHandle( h, pb )
register Handle   h;
ParmBlkPtr        pb;
{
    short  x, locked;

locked = SafeLock( h );
    x = SuckPointer( *h, GetHandleSize( h ), pb );
    if (locked) HUnlock( h );
    return( x );
} short SuckPointer( p, l, pb )
Ptr        p;
long       l;
ParmBlkPtr pb;
{ pb->ioParam.ioBuffer = p;
    pb->ioParam.ioReqCount = l;
    pb->ioParam.ioPosMode = 0;
    return( PBRead( pb, 0 ) );
}

/* Toggles state of control item */
ToggleCtlItem( dlg, item )
DialogPtr  dlg;
short      item;
{
    Rect           r;
    ControlHandle  h;

GetDItem( dlg, item, &r, &h, &r);
    SetCtlValue( h, !GetCtlValue( h ) );
}

WatchCursor()
{
    SetCursor( *GetCursor( 4 ) );
}

/* allocates a zero-filled handle */
Handle  ZeroHandle( size )
long    size;
{
    asm {
        MOVE.L  size(A6),D0
        DC.W    0xA322
        MOVE.L  A0,D0
    }
}

/* allocates a zero-filled pointer */
Ptr ZeroPointer( size )
long    size;
{
    asm {
        MOVE.L  size(A6),D0
        DC.W    0xA31E
        MOVE.L  A0,D0
    }
}
```

MiscDefs.c

```c
/* MiscDefs.c ©1987 Steve Capps

/* prototypes for MiscTools.c */ ifndef True
define True    1
#endif
#ifndef False
#define False   0
endif
#ifndef NIL
#define NIL     0L
endif ifndef accessDenied                                            /* <SMR 10/01/88> */
define accessDenied    (-5000)    /* missing from FileMgr.h */ /* <SMR 10/01/88> */
endif                                                          /* <SMR 10/01/88> */ short       Abs( short );
short       ABSPoint( Point, Point );
            AddChar( char *, char );
            AddStr ( char *,char * );
short       AlertX( short );
            BlastPic( short, short, short );
            BoxString( char *, short, short, short );
short       CheapCompare( char *, char * );
            ClearBytes( Ptr, long );
            ClearHandle( Handle );
short       ConfirmAlert( char *, short );
short       Confirm3Alert( char *, short );
short       CoolDigit( char );
            DeleteChars( char *, short, short );
Ptr         DeriveAddress( short, short );
            DumpHandle( Handle, ParmBlkPtr );
            DumpPointer( Ptr, long, ParmBlkPtr );
            EnableCtlItem( DialogPtr, short, short );
            ErrorAlert( char *, short );
short       ExtractHandle( Handle, long, long, Handle *, long );
            Filler( Ptr, long, char );
            FixedToString( Fixed, char * );
Ptr         GetBase( void );
Rect *      GetBounds( void );
short       GetCtlItem( DialogPtr, short );
short       GetDepth( void );
Fixed       GetFixedItem( DialogPtr, short, Fixed, Fixed );
DialogPtr   GetDialog( short );
            GetIndRect( Rect *, short, short );
Handle      GetItemHand( DialogPtr, short );
            GetItemRect( DialogPtr, short, Rect * );
long        GetNumItem( DialogPtr, short, long, long );
short       GetRowBytes( void );
            GetTextItem( DialogPtr, short, char * );
short       HitLine( Point, Point, Point );
short       HomeResFileX( Handle );
short       InsertFill( Handle, long, long, char );
            InsertChar( char *, char, short );
            IOAlert( char *, short );
short       max( short, short );
short       MaxPixels( void );
short       min( short, short );
long        MungerX( Handle, long, Ptr, long, Ptr, long );
short       FileExists( char *, short );
short       OpenResFileV( char *, short, short );
long        PinRectX( Rect *, Point );
short       Rand( short );
            RestoreUnder( Rect *, Handle );
short       SafeLock( Handle );
short       SafeOpenRes( char *, short, short, short * );
short       SafeCloseRes( short, short );
short       SafeReplace( Handle, long, long, Ptr, long );
Handle      SaveUnder( Rect * );
            SetCtlItem( DialogPtr, short, short );
            SetNumItem( DialogPtr, short, long );
            SetTextItem( DialogPtr, short, char * );
            SetUserProc( DialogPtr, short, Ptr );
long        StringToFixed( char *, Fixed * );
Fixed       StringToFixedX( char *, Fixed, Fixed );
long        StringToNumX( char *, long, long );
short       SuckHandle( Handle, ParmBlkPtr );
short       SuckPointer( Ptr, long, ParmBlkPtr );
            ToggleCtlItem( DialogPtr, short );
            WatchCursor( void );
Handle      ZeroHandle( long );
Ptr         ZeroPointer( long );
```

```
short      Ejectable( short );
short      GetDriveNum( short );
DrvQElPtr  GetDQE( short );
VCB        *GetVCB( short );
short      GetRealVRef( short );
short      Online( short );
```

AudioDefs.c

```
/*
    SoundTrack source (AudioDefs.c)
    Copyright ©1987-88 Farallon Computing, Inc.

Written by Steve Capps with a lot of help from:
        Mike Lameraux, Sam Roberts & Joe Sensendorf Modification History:
    --------------------

<JS  12/10/87>  Added task ptr to VBL record for Juggler background stuff

-----------------------------------------------------------------------------

<SMR 01/23/88>  Added undoEffect global to hold ID of last successful effect to fix bad
                    undo menu item text bug.
    <SMR 01/24/88>  Corrected dimension of rateTable which should have been maxPitch+1, not
                    maxPitch (AudioInit assigns a value to rateTable[maxPitch]).  Corrected
                    definition of maxKey which should have been 95, not 96.  Added inBkgnd
                    global to indicate whether we are in background.
    <SMR 01/27/88>  bracket prototype for Shit in conditional compilation directives.
    <JS  05/11/88>  Put VBL stuff in separate include file
    <JS  05/18/88>  Put Mixer defines stuff in separate include file
    <SMR 07/19/88>  Changed maxFactor from 22257 to 22255 based on call from Brian McGhie.

22Khz on the Macintosh is actually 22,254.54.  Added maxFactorFixed
                    equate which is maxFactor with the repeating fraction as a Fixed.
    <SC  08/26/88>  Add selFirst and selLast fields to UndoState for saving chanFirst and
                    chanLast of selection.
    <SMR 09/15/88>  Added curTool field to GWindow to keep track of currently selected tool
                    so that we can highlight it properly.
    <SMR 10/02/88>  Added mixerLabels array to UndoState for saving mixer labels.

*/

/*
    Macintosh Include Files
*/
#include "Color.h"
#include "ColorToolbox.h"
#include "ControlMgr.h"
#include "DeskMgr.h"
#include "DialogMgr.h"
#include "EventMgr.h"
#include "FileMgr.h"
#include "FontMgr.h"
#include "HFS.h"
#include "ListMgr.h"
#include "MacTypes.h"
#include "MemoryMgr.h"
#include "MenuMgr.h"
#include "OSUtil.h"
#include "Quickdraw.h"
#include "ResourceMgr.h"
#include "ScrapMgr.h"
#include "SoundDvr.h"
#include "SoundMgr.h"
#include "StdFilePkg.h"
#include "TextEdit.h"
#include "ToolboxUtil.h"
#include "VRetraceMgr.h"
#include "WindowMgr.h"
#include "asm.h"
#include "pascal.h"

#include "MiscDefs.c"
#include "FixedFract.h"                      /* <JS  12/14/87> */
#include "VBLstuff.h"                        /* <JS  05/11/88> */
include "Mixer.h"                           /* <JS  05/18/88> */ ifndef NIL
define NIL      0L
#endif
#ifndef nil
#define nil      0L
#endif
```

```
#ifndef True
define True    1
#endif
#ifndef False
#define False   0
endif typedef double   Extended;                              /* <SMR 11/05/88> */

/* debug messages */
#define beta 1

/* Nominal sampling rate */
#define maxFactor       22257L                          /* <SMR 07/19/88> */
#define maxFactorFixed  0x56EE8BA3L                     /* <SMR 07/19/88> */

/* pitch of middle C for us and studio session */
#define midC 60
#define midCSS 37

/* Max pitch, 10 octaves, spread of dialog keyboard */
#define maxPitch 119
#define minKey -24
#define maxKey 95                                       /* <SMR 01/24/88> */

/* number of scales in zoom box */
#define numZoom 12

/* Wave window Kind */
#define waveKind 13
#define clipKind 14
#define efxKind 15

/* Minimum memory overhead required */
#define slopFactor 16384

/* heights of various pieces */
#define waveHeight 128
#define labelHeight 15
#define windowHeight (waveHeight+labelHeight+53)

/* Palette */
#define paletteH 0
#define paletteV (waveHeight+labelHeight+16)

/* Tool boxes */
#define toolsH 8
#define toolsV (waveHeight+labelHeight+22)

/* density meter */
#define densityH (toolsH+80)
#define densityV (waveHeight+labelHeight+21)

/* Report Shell */
#define reportH 298
#define reportV (waveHeight+labelHeight+16)

/* Tool boxes */
#define toolNone (-1)                                   /* <SMR 09/15/88> */
#define toolRec 0
#define toolPlay 1
#define toolDensity 2
#define toolMeter 3
#define toolSpectrum 4
#define maxTools 5

/* Report boxes */
#define repCursor 0
#define repLength 1
#define repSelBeg 2
#define repSelEnd 3
#define repLoopBeg 4
#define repLoopEnd 5
#define maxReps 6

/* defines for info */
#define hScale 0
#define vScale 1
#define recFreq 2
#define playFreq 3
#define compress 4
#define mode 5
#define windPos 6
#define rate 7
#define leftLength 8
#define rightLength 9
```

```c
/* defs for user prefs record from prefs file */
#define prefDisplay 0      /* default display resolution */
#define prefLines   1      /* default dot vs lines */
#define prefExtent  2      /* default left-length vs left-right */
#define prefRate    3      /* default sampling rate */
#define prefComp    4      /* default compression */
#define prefMode    5      /* mono/stereo */
#define prefPort    6      /* True for port A (Modem) */
#define prefLoud    7      /* preferred volume */
define prefUser    8      /* misc style (bits defined below) */ define userPlaySel 1      /* play from selection */
define userRecSel  2      /* record at selection */
#define userEfxSel  4      /* True if effects disabled on null selection */

/* opcodes for sound effects */ define opDoIt  0
define opEvt   1
#define opClose 3

/* Indexes into the jump table for external procs */ define iUndoModify    0
define iDeNumber      1
#define iNumber        2
#define iH2Sample      3
#define iSample2H      4
#define iUpdateWindows 5
#define iGetDialog     6
#define iGetNumItem    7
#define iSetNumItem    8
#define iWatchCursor   9
#define iStringToFixed 10
#define iFixedToString 11
#define iBlastPic      12
#define iZeroHandle    13
#define iPlotPixels    14
#define iToggleCtlItem 15
#define iUndoInsert    16
#define iUndoNone      17
#define iUndoPrep      18
#define iHitLine       19
#define iClearBits     20
#define iGetLog        21
#define iSetSelection  22
#define iGetTextItem   23
#define iSetTextItem   24
#define idB2Lin        25
#define iMBFilter      26
#define iCheckMemory   27
#define iGetCtlItem    28
#define iSetCtlItem    29
#define iEnableCtlItem 30
#define iExtractHandle 31
#define iDrawFR        32
#define iSetUserProc   33
#define iMyFix2X       34
#define iMyFrac2X      35
#define iFixATan2      36
#define iFixDiv        37
#define iFixMul        38
#define iFixRatio      39
#define iFrac2Fix      40
#define iX2Fix         41
#define iFix2Frac      42
#define iFracCos       43
#define iFracDiv       44
#define iFracMul       45
#define iFracSin       46
#define iFracSqrt      47
#define iX2Frac        48
#define iFixRound      49
#define iMungerX       50
#define iGetFixedItem  51
#define iStringToNumX  52
#define iStringToFixedX 53
#define iSafeReplace   54
#define iSafeLock      55
#define iSelSpace      56
#define iFitZoom       57
#define iDHT           58
#define iDHTinit       59
#define iDHTwindow     60
#define iPower         61
#define iFlipper       62
#define numJumps       63
```

```
/* our friend the mouse button */
define VIA 0x1D4 define maxLabText  32

/* enable bits stored in effect names */ define efxGen     1          /* effect can generate samples         */
define efxComp    2          /* effect can operate on compressed    */
#define efxStereo  4          /* effect can operate on stereo only   */
define efxColor   8          /* effect requires Color Quickdraw     */ /* <SMR 07/19/88> */ extern Ptr SoundPtr : 0x0262;
extern Ptr ApplScratch : 0xA78;    /* pointer to jump table */
/*extern Ptr CurrentA5 : 0x904;*/                                        /* <SMR 07/19/88> */
/*extern char HiliteMode : 0x938;*/                                      /* <SMR 07/19/88> */
extern char pRamVol : 0x208;

/*
    new SysEnvirons constants
*/
#define envMacIIx   5         /* Macintosh IIx   */
define env68030    4         /* 68030 processor */ typedef struct {              /* studio session header */
    short   loopStart;
    short   loopEnd;
    char    flags[2];
    short   length;
    /* samples: ARRAY [1..1] OF SignedByte; */
} Zound, *ZoundPtr, **ZoundHandle;

typedef struct {
    short   id;
    long    any;
    Handle  h;
} Effect;

/* same structure but for 4 channel mixed one */
typedef struct {
    long    count;
    long    delta[4];
    Ptr     wave[4];
    long    ticks[4];
    long    delay[4];
    long    delta2B[4];
    Ptr     wave2B[4];
    short   null;
} Play4List;

#define pl4count    0
#define pl4delta    4
#define pl4wave     20
#define pl4ticks    36
#define pl4delay    52
#define pl4delta2B  68
#define pl4wave2B   84
#define pl4null     100
define pl4rec      102 typedef long Report[maxReps];
typedef Report  *ReportPtr;
typedef ReportPtr  *ReportHandle;

typedef long EditInfo[16];
typedef EditInfo *EditInfoPtr;
typedef EditInfoPtr *EditInfoHandle;

typedef struct {
    long    sampLeft, sampRight;
    short   color;
    char    text[maxLabText];
} Label, *LabelPtr, **LabelHandle;

typedef struct {
    long    sample;
    short   color;
} Color, *ColorPtr, **ColorHandle;
```

```
typedef struct {
    Point       **pts;          /* Handle of points */
    short       nKnots;         /* Number of knots */
    Rect        bounds;         /* bounds of knots */
} KnotList;

/* SoundTrack window */
typedef struct {
    DialogRecord    wind;
    char            name[64];           /* Name, possibly Untitled */
    char            resName[64];        /* file name for resources */
    short           vRefNum;
    short           untitled;           /* True if untitled */
    short           readOnly;           /* True if readOnly */
    short           dirty;              /* true if file dirty */
    short           active;             /* true if window is active */ long            fileType;           /* file type */
    short           resource;           /* true if resource not file */
    short           resKind;            /* snd 1 or 2 or ?? */

TEHandle        te;                 /* shared text edit record */ long            display;            /* division factor for display */
    short           lines;              /* True if dot vs lines */
    short           extent;             /* true if left-length vs left-right */
    short           port;               /* true if A port */ short           chanFirst;          /* first channel to display */
    short           chanLast;           /* last channel to display */

Rect            dataBox;            /* box containing graphics */
    Rect            labelBox;           /* box containing labels */
    Rect            scrollBox;          /* scroll bar's box */
    ControlHandle   scroll;             /* scroll bar itself */
    short           scrollScale;        /* multiplier fi-or scroll bar */

BitMap          offBM;              /* bitmap for above */
    short           activeRep;          /* which report is active */
    short           activeLabel;        /* active Label */
    short           activeLabel2B;      /* active Label-to-be */
    Report          reports;            /* user display values */

Handle          data[2];            /* stereo wave data itself */
    Handle          leftovers;          /* balance of snd resources */

Handle          bits;               /* offscreen bitmap */ long            selAnchor;          /* selection pivot point */
    short           caretOn;            /* True if cursor drawn */
    long            caretTime;          /* cursor time */ long            info[16];           /* info */

LabelHandle     labels;             /* handle to Labels */
    short           nLabels;            /* number of Labels */

ColorHandle     colors;             /* handle to color list */
    short           nColors;            /* 4 colors */
    short           baseColor;          /* color of whole wave if none */

WindowPtr       nextAlpha;          /* next window in alpha list */ short           curTool;            /* currently selected tool (or -1 if none) */   /* <SMR 09/15/88> */
} GWindow, *GWindPeek;

typedef struct {
    GWindPeek   wind;           /* which window's in mix */
    long        beg;            /* left limit in each window */
    long        end;            /* right limit in each window */
    short       chanFirst;      /* for left, right or stereo */
    short       chanLast;
    short       sRate;          /* sample rate */
    short       sMode;          /* stereo mode? */
    short       label;          /* label from window if any */
    Rect        wave;           /* boxes containing wave displays */
    Handle      bits;           /* handle to bitmaps */
    KnotList    knots;          /* list of envelopes */
} MixTrack;

typedef struct {
    GWindPeek   wind;           /* window that was undone */
    short       msg;            /* str# id for operations description */
    short       chanFirst;      /* saved chanFirst */                   /* <SC 08/26/88> */
    short       chanLast;       /* saved chanLast */                    /* <SC 08/26/88> */
```

```c
    short           selFirst;           /* saved selection's chanFirst */    /* <SC 08/26/88> */
    short           selLast;            /* saved selection's chanLast */     /* <SC 08/26/88> */
    long            delBeg;             /* beginning of selection */
    long            delete;             /* deleted length */
    long            insBeg;             /* location of insertion */
    long            insert;             /* new insertion length */
    long            lengths[2];         /* real lengths before operation */
    long            delBegs[2];         /* real delete begins */
    long            insBegs[2];         /* real insert begins */
    short           simpleMod;          /* true if delete and insert represent a simple mod*/
    short           info;               /* saved info etc. */
    Handle          data[2];            /* saved data's */
    Handle          scrap;              /* scrap if saved */
    Handle          labels;             /* labels if saved */
    short           nLabels;            /* number of labels */
    Handle          colors;             /* labels if saved */
    short           nColors;            /* number of labels */
    Report          rep;                /* saved report */
    EditInfo        inf;                /* saved info */
    short           typing;             /* in typing mode */
    long            mixerBegs[nMixers+1];   /* start of selection in mixer */
    long            mixerEnds[nMixers+1];   /* end   of selection in mixer */
    short           mixerLabels[nMixers+1]; /* associated label         */   /* <SMR 10/02/88> */
} UndoState;

/* Globals */ extern  EventRecord     evt;                /* event record et al */
extern  short           evtShift, evtOption, evtCommand;
extern  Point           evtPt;
extern  long            click2Time;
extern  short           click2X;
extern  Point           clickLoc;

extern  GWindPeek       playWindow;         /* window currently playing */
extern  short           playing;

extern  Boolean         showing;            /* true if playback marker visible */
extern  long            oldPosn;

extern  short           byebye;             /* True when time to exit */ extern  short           inBkgnd;            /* True if in background */    /* <SMR 01/24/88> */ extern  GWindPeek       front;              /* frontmost window */
extern  GWindPeek       firstAlpha;         /* first window in alpha list */
extern  short           curDepth;           /* current screen depth */
extern  MenuHandle      menus[8];           /* our menus */ extern  Fixed           scales[numZoom];    /* density stuff */
extern  short           skips[numZoom];
extern  short           scalesX[numZoom];

extern  short           keys[12];           /* keyboard selector offsets */ extern  VBLBlock        soundVBL;           /* our VBL block */
extern  PlayList        soundTrack;         /* Info for what's playing */ extern  long            rateTable[maxPitch+1];  /* pitch # to DDA rate */    /* <SMR 01/24/88> */ extern  Effect          effects[50];        /* Effects area */
extern  char            efxBits[50];        /* style of effects */
extern  short           curEffect;          /* ID of current effect */
extern  short           undoEffect;         /* ID of last successful effect */   /* <SMR 01/23/88> */
extern  short           numEfx;             /* number of effects */
extern  Ptr             jumpTable[numJumps];    /* jump table for run-time call back */ extern  Point           sfOrg;              /* std file location */
extern  short           updateLock;         /* updatewindows lock */ extern  short           reportOffset;       /* horz offset of report boxes */ extern  long            prefs[16];          /* user prefs */ extern  UndoState       undone;             /* undo state */
extern  short           unclean;            /* true from undoprep to cleanup */ extern  short           errorBase;          /* export for IOAlert */
extern  short           rangeBase;          /* export for GetNumItem, et al. */
extern  char            decimalPoint;       /* export for GetFixedItem, FixedToString */
extern  char            minusSign;          /* export for GetFixedItem, FixedToString */ extern  GWindPeek       clipboard;          /* clipboard window */
extern  DialogPtr       mixer;              /* Mixer window */
extern  short           mixVisible;         /* mixer visible */
```

```
extern   short        macII;              /* true if Mac II */
extern   short        fastCPU;            /* true if 020 around */
extern   short        colorCPU;           /* true if color around */
extern   short        waitOK;             /* true if multifinder */
extern   short        stereoOK;           /* true if stereo driver OK */ extern   long         maxSpace, maxLeft;  /* used by gas meter */
extern   Ptr          maxLoc;             /* pointer to place on screen */
extern   long         maxRow;             /* row bytes */
extern   short        maxWords;           /* # words to blit */ extern   RGBColor     palette[16];        /* colors available */
extern   short        nMenuColors;        /* number of colors in menu */
extern   RGBColor     blackHole;          /* black RGB */
extern   Handle       oldProc,menuProc;   /* our menu proc */ extern   Fixed        logs[128];          /* log2(1)..log2(4) in 128 steps */ extern   long         memorySlop;         /* dynamic slopFactor */ extern   GrafPort     offPort;            /* 1 bit offscreen port */
extern   MixTrack     mixes[nMixers+1];   /* mix info 4 channels + dest */
extern   short        nMixed;             /* how many mix so far */
extern   Fixed        mixDelta;           /* display delta  pixels/sample */
extern   short        mixSkip;            /* amount to skip */
extern   short        mixMaster;          /* master gain vs. 100 */
extern   short        mixSelect;          /* item selected */
extern   short        mixActive;          /* mixer active */ extern   short        origVolume;         /* saved volume setting */ extern   Ptr          patchArea;          /* sys heap patch jumps */
extern   Ptr          saveSetHSize;       /* real setHandleSize */
extern   Ptr          saveSysBeep;        /* real sys beep */ extern   short        portUsed[2];        /* set true when port inited */ extern   short        defResource;        /* true if resource files */ extern   short        CVSDStatus[16];     /* for cvsd conversion */ extern   short        failSafe;           /* lock out for shit */ extern   short        compRatio[];        /* compression ratios corresponding to w->info[compress]  */ extern   short        compID[];           /* corresponding compression IDs           */ extern   long         nextUntitled;       /* next untitled window sequence number   */  /* <SC 07/20/88> */

/* Procedures from Audio.c
 */
              ActivateWindow( GWindPeek, short );
              AlphaInsert( GWindPeek );
              AlphaInval( void );
              AlphaKill( GWindPeek );
              CaretHide( GWindPeek );
              CleanCut( GWindPeek, long * );
              ClearBits( GWindPeek );
long          DeNumber( GWindPeek, char * );
              DirtyDocument( GWindPeek );
              FitZoom( GWindPeek );
short         FrontClose( void );                              /* <JS 04/05/88> */
              HidePlayPoint( void );                           /* <SC 07/20/88> */
void          GetNextName( char * );
long          H2Sample( GWindPeek, short );
              InvalDoc( GWindPeek );
              InvertSample( GWindPeek, long, long, short, short );
              KillDocument( GWindPeek );
              KillSound( void );
GWindPeek     NewDocument( char *, short, char * );
              Number( GWindPeek, long, char * );
long          NumberRep( GWindPeek, short, char * );
              NumBox( GWindPeek, short );
long          PinLength( GWindPeek );
long          PinSample( GWindPeek, long );
short         Sample2H( GWindPeek, long );
              Scroll2Label( GWindPeek, short );                /* <SMR 01/28/88> */
              SelectXOR( GWindPeek );
long          SelSpace( GWindPeek );
              SetSelection( GWindPeek, long, long, short, short );
              UndoInsert( long, long );
              UndoModify( long, long );
              UndoNone( void );
short         UndoPrep( GWindPeek, short, long, long, short );
              UpdateWindows( void );
```

```
/* Procedures from AudioIO.c
*/
                FileDelete( void );
                FileOpen( void );
short           FileRead( GWindPeek );
short           FileSave( GWindPeek, short );

/* Procedures from AudioInit.c
*/
                InitMain( void );

/* Procedures from AudioMix.c
*/
                KillMixer( void );
                MixActivate( short );
                MixDisconnect( short );
                MixEvent( short, EventRecord *);
                MixIdle( void );
                MixInval( GWindPeek );
                MixItUp( void );
short           MixLabel( GWindPeek, short );
void            MixLabelKill( GWindPeek, short );
void            MixLabelsKill( GWindPeek );                  /* <SMR 10/01/88> */
void            MixLabelRenew( GWindPeek, short );           /* <SMR 10/01/88> */
                MixRect( short, Rect * );
                MixRenew( short );
                MixSetup( GWindPeek, short );

/* Procedures from AudioReports.c
*/
                ReportAll( GWindPeek );
                ReportCheck( GWindPeek );
                ReportClick( GWindPeek, short );
                ReportClose( void );
                ReportCursor( GWindPeek );
                ReportDensity( GWindPeek );
                ReportJam( GWindPeek );
                ReportLength( GWindPeek );
                ReportLoop( GWindPeek );
                ReportOpen( GWindPeek, short );
                ReportRecord( GWindPeek, short );            /* <JS 08/04/88> */
                ReportRect( short, Rect * );
                ReportSelect( GWindPeek );
                ReportUpdate( GWindPeek, short, long, short );

/* Procedures from AudioSCC.c
*/
                BuildFlip( Ptr );
long            ConvertRate( Ptr, Ptr, short, short, long );
short           Flip( short );
                Interrupts( short );
long            Mono5Khz( Ptr, Ptr, long, Ptr );
long            Mono7Khz( Ptr, Ptr, long, Ptr );
long            Mono11Khz( Ptr, Ptr, long, Ptr );
long            Mono22Khz( Ptr, Ptr, long, Ptr );
short           Sample22Khz(Ptr, Rect *, Ptr, short, short );
short           SampleS22Khz(Ptr, Ptr, Rect *, Ptr, short, short );
                SCCClose( Ptr );
                SCCInit( Ptr );
                SCCPoke( Ptr, short, short );
                SCCPort( short, Ptr *, Ptr * );
long            Stereo5Khz( Ptr, Ptr, Ptr, Ptr, long, Ptr );
long            Stereo7Khz( Ptr, Ptr, Ptr, Ptr, long, Ptr );
long            Stereo11Khz( Ptr, Ptr, Ptr, Ptr, long, Ptr );
long            Stereo22Khz( Ptr, Ptr, Ptr, Ptr, long, Ptr );

Mixer.h

/* Mixer stuff */
#define nMixers 4
#define mixRowBytes 26
#define mixWidth 198
#define mixHeight 48
#define mixRealHite (mixHeight + 2*knotIndent)
#define mixSpacing 55
#define mixH 131
#define mixV 11
#define mixOut nMixers
#define knotIndent 2
```

We claim:

1. A device for editing sounds comprising:
   a memory for storing a sound waveform;
   a display for visually displaying the stored waveform;
   an editor for editing the appearance of a predetermined portion of the visually displayed waveform by manipulation of said visually displayed waveform; and
   means for changing the sound waveform stored in the means for storing in accordance with changes made in the visually displayed waveform by the editor;
   wherein the memory stores a digital representation of the waveform, and the display displays an analog representation of the waveform; and
   wherein the display comprises a display displaying the amplitude of the waveform along a first associated axis and time along a second associated axis;
   wherein the editor comprises:
   means for displaying a sound characteristics control line adjacent to the displayed waveform; and
   means for displacing at least one segment of the sound characteristics control line adjacent to the portion of the displayed waveform;
   wherein the editor comprises mean for altering a specified characteristic of a portion of the stored waveform corresponding to the portion of the displayed waveform adjacent to the displaced line segment.

2. The device of claim 1, wherein each of the means comprise a portion of a computer.

3. The device of claim 2, wherein the computer comprises a Macintosh computer and a computer program installed in the Macintosh computer.

4. The device of claim 1, wherein the display simultaneously displays a plurality of independent waveforms.

5. The device of claim 4, wherein the means for editing comprises means for mixing the independent waveforms.

6. The device of claim 5, wherein the means for mixing comprises:
   means for moving each independent displayed waveform relative to the associated time axis; and
   means for combining the independently displayed waveforms wherein a stored waveform the visual representation of which has been moved relative to the associated time axis is correspondingly shifted in time relative to the other independent waveforms by the means for editing.

7. The device of claim 5, wherein the display displays four independent waveforms.

8. The device of claim 1, wherein the amount of alteration of the specified characteristic is a function of the amount of displacement of the line segment.

9. The device of claim 1, wherein the means for displacing comprises means for indicating a specific point on the sound characteristics control line, which specific point denotes one end of the line segment.

10. The device of claim 1, wherein the means for editing comprises:
    means for selecting a portion of the waveform; and
    means for moving the selected portion to a position on the waveform other than an original position of the selected portion.

11. The device of claim 1, wherein the means for editing comprises:
    means for selecting a portion of the waveform; and
    means for copying the selected portion and inserting the copied portion in the waveform.

12. The device of claim 1, wherein the means for editing comprises:
    means for selecting a portion of the waveform; and
    means for deleting the selected portion from the waveform.

13. The device of claim 1, wherein the sounds are multichannel sounds.

14. The device of claim 13, wherein the display simultaneously displays a separate waveform for each channel of a multichannel sound.

15. The device of claim 13, wherein the means for editing independently edits each channel of a multichannel sound.

16. A device for editing sounds comprising:
    a memory for storing a sound waveform;
    a display for visually displaying the stored waveform;
    an editor for editing the appearance of a predetermined portion of the visually displayed waveform by manipulation of said visually displayed waveform; and
    means for changing the sound waveform stored in the memory in accordance with changes made in the visually displayed waveform by the editor;
    wherein the memory stores a digital representation of the waveform, and the display displays an analog representation of the waveform; and
    wherein the display comprises a display displaying the amplitude of the waveform along a first associated axis and time along a second associated axis; and
    wherein the editor comprises:
    means for displaying an amplitude control line substantially parallel to the time axis; and
    means for displacing at least one segment of the line adjacent to a portion of the displayed amplitude peaks;
    wherein the editor comprises means for altering the amplitude of a portion of the amplitude peaks of the stored waveform corresponding to the portion of the displayed amplitude peaks adjacent to the displaced line segment, the amount of alteration of the amplitude being a function of the amount of displacement of the line segment.

17. A device for editing sounds comprising:
    a memory for storing a sound waveform;
    a display for visually displaying the stored waveform;
    an editor for editing the appearance of a predetermined portion of the visually displayed waveform by manipulation of said visually displayed waveform; and
    means for changing the sound waveform stored in the memory in accordance with changes made in the visually displayed waveform by the editor;
    wherein the memory stores a digital representation of the waveform, and the display displays an analog representation of the waveform; and
    wherein the display comprises a display displaying the amplitude of the waveform along a first associated axis and time along a second associated axis; and wherein the editor comprises:

means for displaying a pitch control line substantially parallel to the time axis;

means for displacing at least one segment of the line adjacent to a portion of the display amplitude peaks; and wherein the editor comprises means for altering the pitch of a portion of the stored waveform corresponding to the portion of the displayed amplitude peaks adjacent to the displaced line segment, the amount of alteration of the pitch being a function of the amount of displacement of the line segment.

18. A method for editing sounds comprising the steps of:

storing a waveform representing a sound;

displaying the waveform on a display;

editing the appearance of the displayed waveform by manipulation of said displayed waveform; and changing the stored waveform in accordance with changes made in the displayed waveform by the step of editing;

wherein the step of storing comprises storing a digital representation of the waveform, and the step of displaying comprises displaying an analog representation of the waveform; and wherein the step of displaying comprises displaying the amplitude of the waveform along a first associated axis and time along a second associated axis;

wherein the step of editing comprises:

displaying a sound characteristics control line adjacent to the displayed waveform; and displacing at least one segment of the sound characteristics control line adjacent to a portion of the displayed waveform;

wherein the step of editing comprises altering a specified characteristic of portion of the stored waveform corresponding to the portion of the displayed waveform adjacent to the displaced line segment.

19. The method of claim 18, wherein the step of displaying comprises displaying the amplitude of the waveform along a first associated axis and time along a second associated axis.

20. The method of claim 18, wherein the step of displaying comprises simultaneously displaying a plurality of independent waveforms.

21. The method of claim 20, wherein the step of editing comprises mixing the independent waveforms.

22. The method of claim 21, wherein the step of mixing comprises:

moving each independent displayed waveform relative to the associated time axis;

combining the independently displayed waveforms wherein a stored waveform the visual representation of which has been moved relative to the associated time axis is correspondingly shifted in time relative to the other independent waveforms by the step of editing.

23. The method of claim 21, wherein the step of displaying comprises displaying four independent waveforms.

24. The method of claim 18, wherein the sounds are multichannel sounds.

25. The method of claim 24, wherein the step of displaying simultaneously displays a separate waveform for each channel of a multichannel round.

26. The method of claim 24, wherein the step of editing independently changes each channel of a multichannel sound.

27. The method of claim 18, wherein the amount of alteration of the specified characteristic is a function of the amount of displacement of the line segment.

28. The method of claim 18, wherein the step of displacing comprises indicating a specific point on the sound characteristics control line, with specific point denotes one end of the line segment.

29. A method for editing sounds comprising the steps of:

storing a waveform representing a sound;

displaying the waveform on a display;

editing the appearance of the displayed waveform by manipulation of said displayed waveform; and changing the stored waveform in accordance with changes made in the displayed waveform by the step of editing; and wherein the step of storing comprises storing a digital representation of the waveform, and the step of displaying comprises displaying an analog representation of the waveform; and wherein the step of displaying comprises displaying the amplitude of the waveform along a first associated axis and time along a second associated axis;

wherein the step of editing comprises:

displaying an amplitude control line substantially parallel to the time axis; and displacing at least one segment of the line adjacent to a portion of the displayed amplitude peaks;

wherein the step of editing comprises altering the amplitude of a portion of the amplitude peaks of the stored waveform corresponding to the portion of the displayed amplitude peaks adjacent to the displaced line segment, the amount of alteration of the amplitude being a function of the amount of displacement of the line segment.

30. A method for editing sounds comprising the steps of:

storing a waveform representing a sound;

displaying the waveform on a display;

editing the appearance of the displayed waveform by manipulation of said visually displayed waveform; and changing the stored waveform in accordance with changes made in the displayed waveform by the step of editing;

wherein the step of storing comprises storing a digital representation of the waveform, and the step of displaying comprises displaying an analog representation of the waveform; and wherein the step of displaying comprises displaying the amplitude of the waveform along a first associated axis and time along a second associated axis;

wherein the step of editing comprises:

displaying a pitch control line substantially parallel to the time axis; and displacing at least one segment of the line adjacent to a portion of the display amplitude peaks;

wherein the step of editing comprises altering the pitch of a portion of the stored waveform corresponding to the portion of the displayed amplitude peaks adjacent to the displaced line segment, the amount of alteration of the pitch being a function of the amount of displacement of the line segment.

31. A method for editing sounds comprising the steps of:

storing a waveform representing a sound;
displaying the waveform on a display;
editing the appearance of the displayed waveform by manipulation of said displayed waveform; and
changing the stored waveform in accordance with changes made in the displayed waveform by the step of editing;
wherein the step of editing comprises:
selecting a portion of the waveform; and
moving the selected portion to a position in the waveform other than an original position of the selected portion.

32. A method for editing sounds comprising the steps of:
storing a waveform representing a sound;
displaying the waveform on a display;
editing the appearance of the displayed waveform by manipulation of said displayed waveform; and
changing the stored waveform in accordance with changes made in the displayed waveform by the step of editing;
wherein the step of editing comprises:
selecting a portion of the waveform; and
copying the selected portion and inserting the copied portion in the waveform.

33. A method for editing sounds comprising the steps of:
storing a waveform representing a sound;
displaying the waveform on a display;
editing the appearance of the displayed waveform by manipulation of said displayed waveform; and
changing the stored waveform in accordance with changes made in the displayed waveform by the step of editing;
wherein the step of editing comprises:
selecting a portion of the waveform; and
deleting the selected portion from the waveform.

34. A device for editing sounds comprising:
a memory for storing a sound waveform;
a display for visually displaying the stored waveform;
an editor for editing the appearance of a predetermined portion of the visually displayed waveform by manipulation of said visually displayed waveform; and
means for changing the stored sound waveform in accordance with changes made in the displayed waveform by the editor;
wherein the editor comprises:
means for displaying a sound characteristics control line adjacent to the displayed waveform; and
means for displacing at least one segment of the sound characteristics control line adjacent to a portion of the displayed waveform;
wherein the editor comprises means for altering a specified characteristic of a portion of the stored waveform corresponding to the portion of the displayed waveform adjacent to the displaced line segment.

35. A method for editing sounds comprising the steps of:
storing a waveform representing a sound;
displaying the waveform on a display;
editing the appearance of the displayed waveform by manipulation of said displayed waveform; and
changing the stored waveform in accordance with changes made in the displayed waveform by the step of editing;
wherein the step of editing comprises:
displaying a sound characteristics control line adjacent to the displayed waveform; and
displacing at least one segment of the sound characteristics control line adjacent to a portion of the displayed waveform;
wherein the step of altering comprises altering a specified characteristic of a portion of the stored waveform corresponding to the portion of the displayed waveform adjacent to the displaced line segment.

* * * * *